(12) United States Patent
Yamasaki

(10) Patent No.: US 7,903,529 B2
(45) Date of Patent: Mar. 8, 2011

(54) OPTICAL HEAD AND OPTICAL DISC DEVICE

(75) Inventor: Fumitomo Yamasaki, Nara (JP)

(73) Assignee: Panasonic Corporation, Osaka (JP)

( * ) Notice: Subject to any disclaimer, the term of this patent is extended or adjusted under 35 U.S.C. 154(b) by 679 days.

(21) Appl. No.: 11/905,597

(22) Filed: Oct. 2, 2007

(65) Prior Publication Data

US 2008/0101195 A1 May 1, 2008

Related U.S. Application Data

(60) Provisional application No. 60/877,614, filed on Dec. 29, 2006.

(30) Foreign Application Priority Data

Oct. 5, 2006 (JP) .................................. 2006-273818

(51) Int. Cl.
 *G11B 7/00* (2006.01)
(52) U.S. Cl. ............. 369/112.09; 369/112.24; 369/44.23
(58) Field of Classification Search ........................ None
 See application file for complete search history.

(56) References Cited

U.S. PATENT DOCUMENTS

| | | | |
|---|---|---|---|
| 5,999,509 A | 12/1999 | Sugiura et al. | |
| 6,031,667 A * | 2/2000 | Sugiura et al. | 359/618 |
| 6,084,845 A | 7/2000 | Mizuno | |
| 6,496,453 B2 * | 12/2002 | Asada et al. | 369/44.23 |
| 6,611,383 B1 * | 8/2003 | Lee | 359/629 |
| 2003/0227839 A1 * | 12/2003 | Yamamoto | 369/44.29 |
| 2005/0207316 A1 | 9/2005 | Ohyama | |
| 2006/0007812 A1 * | 1/2006 | Nishi et al. | 369/44.37 |
| 2006/0193217 A1 | 8/2006 | Mori et al. | |
| 2006/0193234 A1 | 8/2006 | Tanioka | |
| 2006/0239169 A1 * | 10/2006 | Marumo et al. | 369/100 |

FOREIGN PATENT DOCUMENTS

| | | |
|---|---|---|
| JP | 10-269607 | 10/1998 |
| JP | 10-269608 | 10/1998 |
| JP | 2000-195085 | 7/2000 |
| JP | 2001-110081 | 4/2001 |

(Continued)

OTHER PUBLICATIONS

Patent Cooperation Treaty (PCT) International Preliminary Report on Patentability, issued May 13, 2008. International Search Report issued Oct. 23, 2007.

*Primary Examiner* — Daniell L Negrón
*Assistant Examiner* — Henok Heyi
(74) *Attorney, Agent, or Firm* — Wenderoth, Lind & Ponack, L.L.P.

(57) ABSTRACT

A transmitting/reflecting member for transmitting a laser beam of a first wavelength emitted from a first light source includes a first surface on which the laser beam of the first wavelength emitted from the first light source is incident and a second surface which faces the first surface and from which the laser beam of the first wavelength emerges, an angle $\alpha$ defined between the first and second surfaces satisfies a condition of $\alpha \neq 0$, and a third-order astigmatism and a third-order coma aberration occurring when the laser beam of the first wavelength passes through the transmitting/reflecting member are both 5 m$\lambda$ or smaller. In this way, good recording performance or reproduction performance for various optical discs can be realized by focusing laser beams having different wavelengths on information recording surfaces of optical discs whose protective substrates differ in thicknesses.

19 Claims, 41 Drawing Sheets

FOREIGN PATENT DOCUMENTS

| | | |
|---|---|---|
| JP | 3304053 | 7/2002 |
| JP | 2003-317308 | 11/2003 |
| JP | 2006-209933 | 8/2006 |
| JP | 2006-236513 | 9/2006 |
| JP | 2006-244580 | 9/2006 |
| WO | 2004/003901 | 1/2004 |

* cited by examiner

OPTICAL HEAD AND OPTICAL DISC DEVICE

This application claims benefit of U.S. Provisional Application No. 60/877,614, filed Dec. 29, 2006.

BACKGROUND OF THE INVENTION

1. Field of the Invention

The present invention relates to an optical head including a plurality of light sources having different wavelengths and adapted to optically record or reproduce information in or from information recording media such as a plurality of kinds of optical discs, an optical disc device including such the optical head, and a computer, an optical disc player and an optical disc recorder including such the optical disc device.

2. Description of the Background Art

In recent years, Blu-ray discs (hereinafter, BDs) which are high-density and large capacity optical information recording media (hereinafter, also referred to as "optical discs") having the same size as CDs (Compact Discs) and DVDs (Digital Versatile Discs) have been put to practical use as blue-violet semiconductor lasers have been put to practical use. This BD is an optical disc whose protective substrate is about 0.1 mm in thickness and in or from which information is recorded or reproduced using a blue-violet semiconductor laser light source having a wavelength of about 400 nm and an objective lens whose numerical aperture (NA) is increased to 0.85.

HD DVDs whose protective substrate is about 0.6 mm in thickness and in or from which information is recorded or reproduced similarly using a blue-violet semiconductor laser light source having a wavelength of about 400 nm and an objective lens whose numerical aperture is 0.65 have been also put to practical use. These optical discs in or from which information is recorded or reproduced using blue-violet light sources are collectively called high-density optical discs.

Accordingly, there has been proposed an optical head compatible with optical discs whose protective substrates differ in thickness and capable of recording or reproducing information in or from information recording surfaces of these optical discs by focusing laser lights having different wavelengths using one objective lens.

A construction example of such an optical head is shown in FIG. 38. In FIG. 38, identified by 101 is a light source for emitting a blue-violet laser beam, by 102 a beam splitter, by 103 a relay lens, by 104 a dichroic prism, by 105 a collimator lens, by 106 an objective lens, by 107 a light receiving element, by 111 a light emitting and receiving element for emitting and receiving a red laser beam and an infrared laser beam. These parts construct an optical head 130. Further, identified by 60 is a BD which is an optical disc whose protective substrate is 0.1 mm in thickness.

An operation of the optical head 130 to record or reproduce information in or from the BD 60 is described. A blue-violet laser beam emitted from the light source 101 is reflected by the beam splitter 102 and passes through the relay lens 103 to be converted into a divergent beam having a larger divergence angle. The converted divergent beam is converted into a substantially parallel beam by the collimator lens 105 after being reflected by the dichroic prism 104, and is focused as a light spot on an information recording surface of the BD 60 through the protective substrate by the objective lens 106. The laser beam reflected by the information recording surface of the BD 60 passes through the objective lens 106 and the collimator lens 105 again to be reflected by the dichroic prism 104, and passes through the beam splitter 102 to be introduced to the light receiving element 107 after passing through the relay lens 103.

Next, an operation of the optical head 130 in the case of recording or reproduction in or from a DVD 70 which is an optical disc whose protective substrate is 0.6 mm in thickness (or a CD which is an optical disc whose protective substrate is 1.2 mm in thickness) is described with reference to FIG. 39. A red laser beam having a wavelength of 655 nm (or infrared laser beam having a wavelength of 785 nm) emitted from the light emitting and receiving element 111 passes through the dichroic prism 104, is converted into a substantially parallel beam by the collimator lens 105, and is focused as a light spot on an information recording surface of the DVD 70 (or CD 80) through the protective substrate by the objective lens 106. The laser beam reflected by the information recording surface of the DVD 70 (or CD 80) passes through the objective lens 106, the collimator lens 105 and the dichroic prism 104 again to be returned to the light emitting and receiving element 111.

Here, the objective lens 106 has a diffraction structure for focusing a blue-violet laser beam for recording or reproduction in or from the BD 60, a red laser beam for recording or reproduction in or from the DVD 70 and an infrared laser beam for recording or reproduction in or from the CD 80 as minute light spots utilizing wavelength differences.

Accordingly, by using such an optical head 130, information can be recorded or reproduced by focusing laser beams having different wavelengths on different kinds of optical discs by means of one objective lens 106.

Japanese Unexamined Patent Publication No. H10-269607 discloses the use of a wedge-shaped prism to simplify the construction of an optical system in an optical head using a plurality of light sources having different wavelengths. In Japanese Unexamined Patent Publication No. H10-269607 is proposed to arrange an incident surface and an emergent surface of a flat prism at an angle to each other in order to avoid an astigmatism when a convergent beam having a wavelength of 780 nm passes through the prism.

Another prior art is disclosed in Japanese Patent No. 3304053. The schematic construction of an optical head 131 shown in Japanese Patent No. 3304053 is shown in FIG. 40. In FIG. 40, identified by 112 is a first light emitting and receiving element for emitting and receiving a red laser beam (wavelength of 650 nm), by 113 a second light emitting and receiving element for emitting and receiving an infrared laser beam (wavelength of 780 nm), by 114 a wedge-shaped prism, by 115 a collimator lens and by 116 an objective lens.

Here, the objective lens 116 can focus a red laser beam and an infrared laser beam as minute light spots respectively on the DVD 70, which is an optical disc whose protective substrate is 0.6 mm in thickness, and on the CD 80, which is an optical disc whose protective substrate is 1.2 mm in thickness.

In Japanese Patent No. 3304053, an angle (apex angle $\alpha$) between the incident surface and the emergent surface of the wedge-shaped prism 114, incident angles $\theta 1$, $\theta 2$ of the red laser beam and the infrared laser beam on the wedge-shaped prism 114 and the like are specified as below (see FIG. 41).

Apex angle $\alpha$ of the wedge-shaped prism 114=2.05°

Thickness T of a middle part of the wedge-shaped prism 114=1.5 mm.

Incident angle $\theta 1$ of the infrared laser beam=42.85°

Incident angle $\theta 2$ of the red laser beam=39°

Numerical aperture (NA) of the objective lens 116=0.45

At this time, a wavefront aberration when the infrared laser beam having passed through the wedge-shaped prism 114 is gathered by the objective lens 116 is 15 m$\lambda$rms, and a light spot can be satisfactorily focused.

In the above conventional optical head, the beam that passes through the wedge-shaped prism 114 is the infrared laser beam having a smaller NA and used for CDs, and the laser beam having a larger NA and used for DVDs is reflected by the wedge-shaped prism 114 to be incident on the collimator lens 115.

On the other hand, in the case of constructing a three wavelength compatible optical head for recording or reproduction in or from high-density optical discs such as BDs, and DVDs and CDs, a blue-violet laser beam used for high-density optical discs is preferably reflected by a prism and both a red laser beam used for DVDs and an infrared laser beam used for CDs are emitted from the same light source and passes through the prism as shown in FIGS. 38 and 39. This is because a light source capable of emitting lights of two wavelengths are generally used and advantageous costwise.

However, in the case of using a wedge-shaped prism in a three wavelength compatible optical head for recording or reproduction in or from high-density optical discs such as BDs, and DVDs and CDs, a blue-violet laser beam for recording or reproduction in or from a BD required to have a more strict wavefront aberration characteristic can be reflected by the wedge-shaped prism, thereby substantially avoiding aberration. However, in the case of an optical system for DVDs having a large NA, even if the wedge-shaped prism is designed to minimize only the astigmatism, coma aberration and other aberrations remain to affect a recording or reproduction performance.

This coma aberration and other aberrations are not considered in Japanese Patent No. 3304053. If the disclosed content of Japanese Patent No. 3304053 is used as it is, the coma aberration and other aberrations remain in optical systems for DVDs having a large NA. Therefore, the wedge-shaped prism cannot be used in the three wavelength compatible optical head for recording or reproducing in or from high-density optical discs such as BDs, DVDs and CDs.

SUMMARY OF THE INVENTION

An object of the present invention is to inexpensively realize an optical head and an optical disc device having good recording or reproduction performance for various optical discs by focusing laser beams having different wavelengths on information recording surfaces of optical discs whose protective substrates differ in thickness in an optical system having a large numerical aperture.

One aspect of the present invention is directed to an optical head, comprising a first light source for emitting a laser beam having a first wavelength; a transmitting/reflecting member for transmitting the laser beam of the first wavelength emitted from the first light source; and an objective lens for focusing the laser beam of the first wavelength having passed through the transmitting/reflecting member on a first information recording medium with a numerical aperture $NA \geq 0.60$, wherein the transmitting/reflecting member includes a first surface on which the laser beam of the first wavelength emitted from the first light source is incident and a second surface which faces the first surface and from which the laser beam of the first wavelength emerges; an angle $\alpha$ defined between the first and second surfaces satisfies a condition of $\alpha \neq 0$; and a third-order astigmatism and a third-order coma aberration occurring when the laser beam of the first wavelength passes through the transmitting/reflecting member are both 5 m$\lambda$ or smaller.

By the above construction, laser beams having different wavelengths can be focused on information recording surfaces of optical discs, whose protective substrates differ in thickness, using an object lens for focusing beams with an numerical aperture $NA \geq 0.60$. Therefore, an optical head and an optical disc device can be inexpensively realized which have good recording performance or reproduction performance for various optical discs.

These and other objects, features and advantages of the present invention will become more apparent upon reading of the following detailed description along with the accompanied drawings.

BEST MODES FOR EMBODYING THE INVENTION

Hereinafter, optical heads, optical disc device, computer, optical disc player and optical disc recorder according to embodiments of the present invention are described with reference to the accompanying drawings.

First Embodiment

Figure 1:
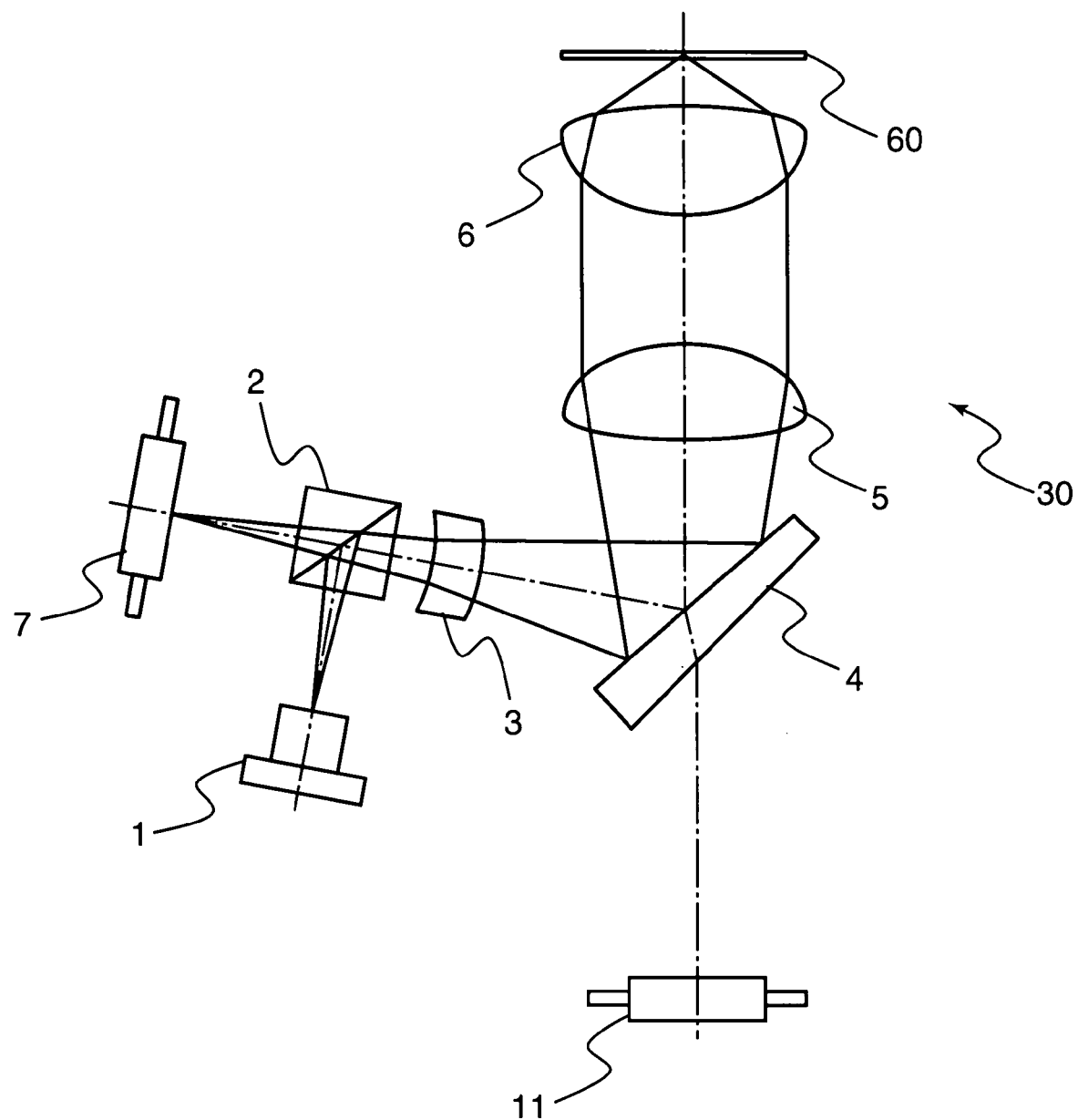
FIG. 1 is a schematic construction diagram in the case of recording or reproduction in or from a BD using an optical head according to a first embodiment of the invention.
Figure 2:
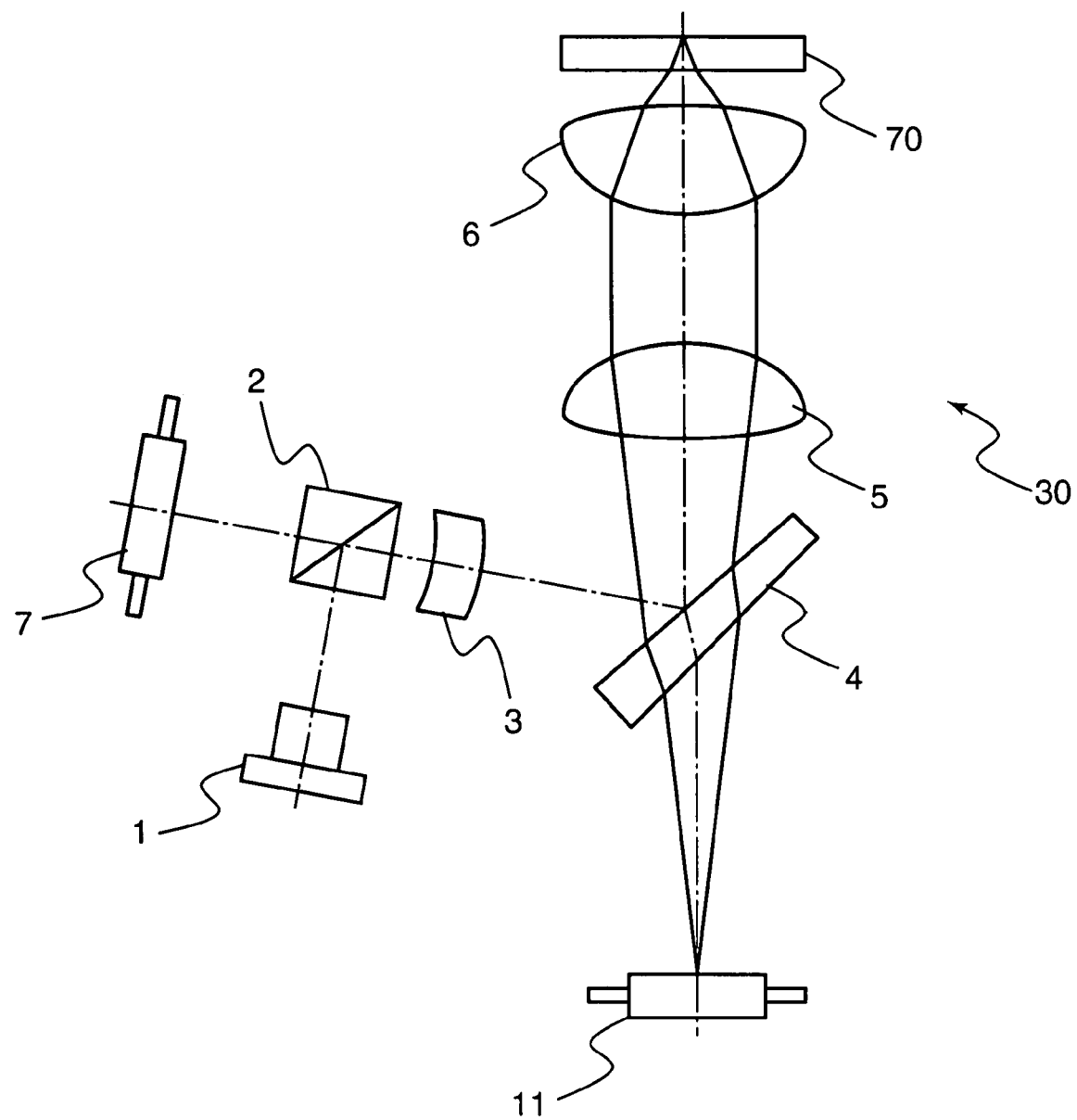
FIG. 2 is a schematic construction diagram in the case of recording or reproduction in or from a DVD using the optical head shown in FIG. 1.
Figure 3:
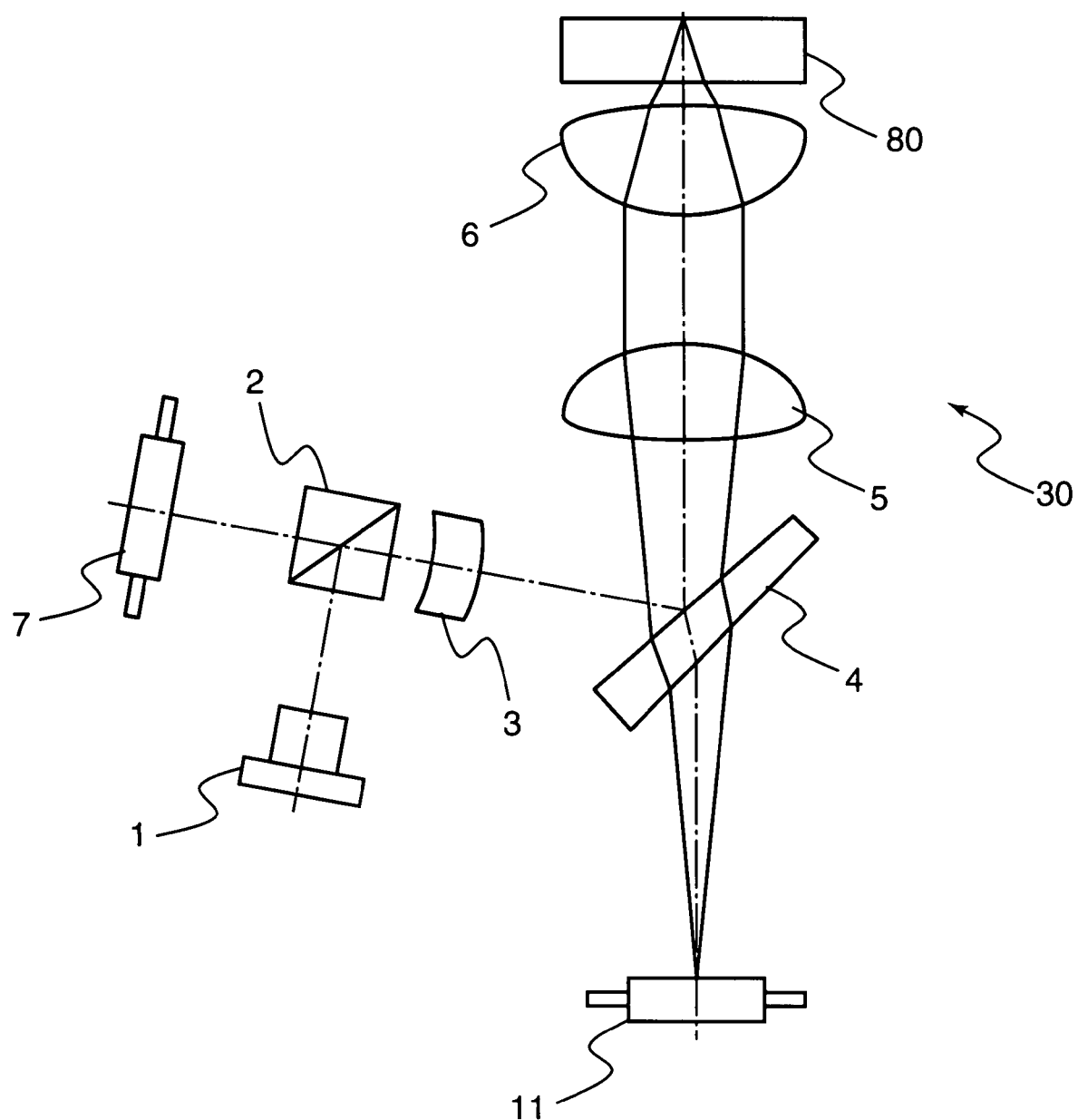
FIG. 3 is a schematic construction diagram in the case of recording or reproduction in or from a CD using the optical head shown in FIG. 1.
Figure 4:
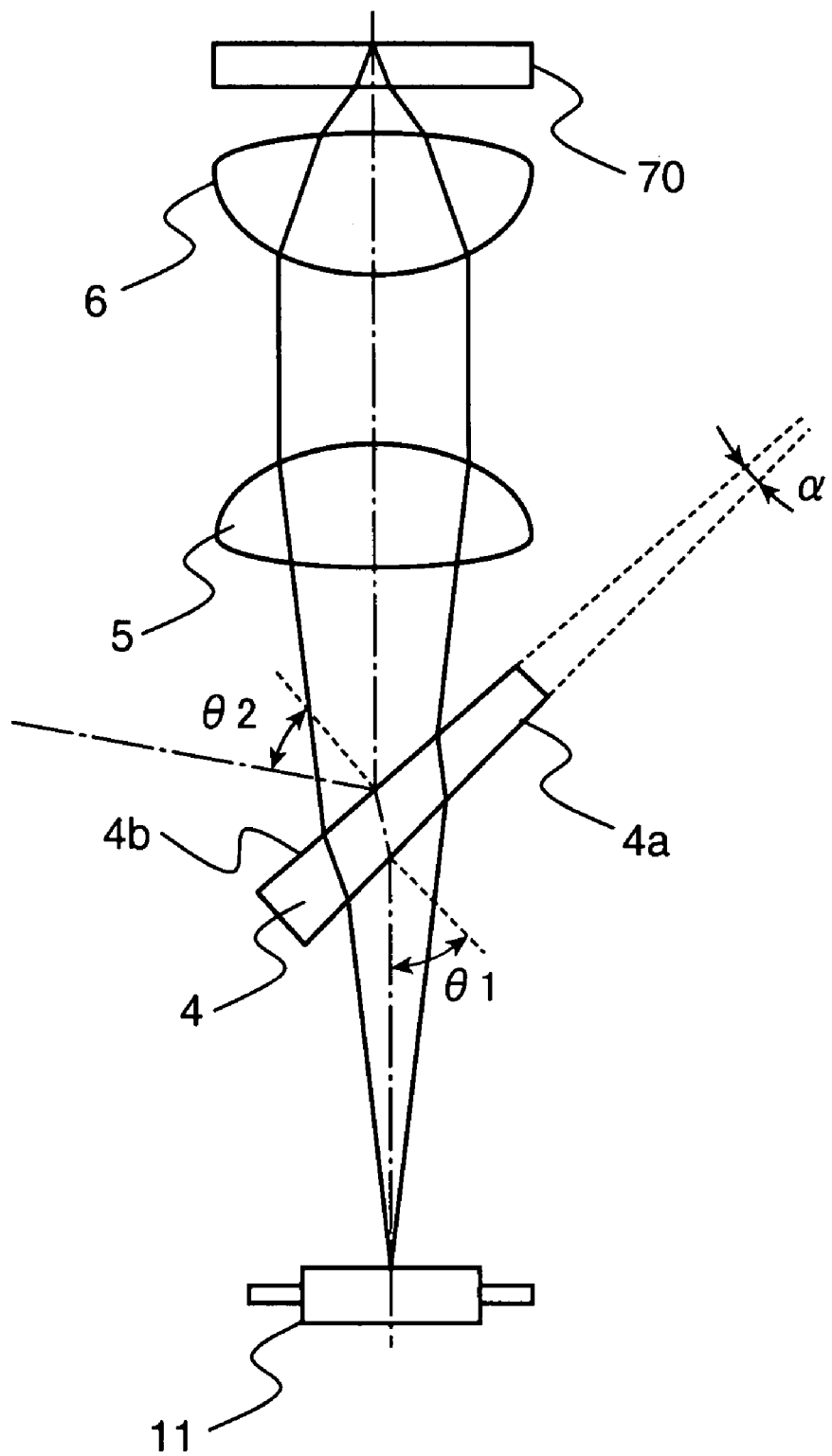
FIG. 4 is a schematic construction diagram of the optical head showing the construction of a wedge-shaped dichroic prism shown in FIG. 1.

FIGS. 1 to 3 are schematic construction diagrams of an optical head according to a first embodiment of the present invention. FIG. 1 is a schematic construction diagram in the case of recording or reproduction in or from a BD using the optical head according to the first embodiment of the invention, FIG. 2 is a schematic construction diagram in the case of recording or reproduction in or from a DVD using the optical head shown in FIG. 1, and FIG. 3 is a schematic construction diagram in the case of recording or reproduction in or from a CD using the optical head shown in FIG. 1. Further, FIG. 4 is a schematic construction diagram of the optical head showing the construction of a wedge-shaped dichroic prism shown in FIG. 1.

In FIG. 1, identified by 1 a light source for emitting a blue-violet laser beam, by 2 a beam splitter, by 3 a relay lens, by 4 a wedge-shaped dichroic prism for reflecting lights having wavelengths below a specified value, by 5 a collimator lens, by 6 an objective lens, by 7 a light receiving element for receiving the blue-violet laser beam, by 11 a light emitting and receiving element for emitting and receiving a red laser beam and an infrared laser beam. These parts construct an optical head 30.

It is assumed that light-emitting points of light sources for emitting a red laser beam and a infrared laser beam substantially coincide in the light emitting and receiving element 11. Identified by 60 is a BD which is an optical disc whose protective substrate has a thickness of 0.075 mm to 0.1 mm.

First, an operation of the optical head 30 to record or reproduce information in or from a BD 60 is described. A blue-violet laser beam having a wavelength of 405 nm and emitted from the light source 1 is reflected by the beam splitter 2 and passes through the relay lens 3 to be converted into a divergent beam having a different NA. The converted divergent beam is converted into a substantially parallel beam by the collimator lens 5 after being reflected by the wedge-shaped dichroic prism 4, and is focused as a light spot on an information recording surface of the BD 60 through the protective substrate by the objective lens 6. The laser beam reflected by the information recording surface of the BD 60 passes through the objective lens 6 and the collimator lens 5 again, is reflected by the wedge-shaped dichroic prism 4 and passes through the relay lens 3 and the beam splitter 2 to be introduced to the light receiving element 7.

Next, operations of the optical head 30 in the case of recording or reproduction in or from a DVD 70 which is an optical disc whose protective substrate is 0.6 mm in thickness and in the case of recording or reproduction in or from a CD 70 which is an optical disc whose protective substrate is 1.2 mm in thickness are described with reference to FIGS. 2 and 3.

In FIG. 2, a red laser beam having a wavelength of 655 nm and emitted from the light emitting and receiving element 11 passes through the wedge-shaped dichroic prism 4, is converted into a substantially parallel beam by the collimator lens 5, and is focused as a light spot on an information recording surface of the DVD 70 through the protective substrate by the objective lens 6. The laser beam reflected by the information recording surface of the DVD 70 passes through the objective lens 6, the collimator lens 5 and the wedge-shaped dichroic prism 4 again and returns to the light emitting and receiving element 11 to be received.

Similarly, in FIG. 3, an infrared laser beam having a wavelength of 785 nm and emitted from the light emitting and receiving element 11 passes through the wedge-shaped dichroic prism 4, is converted into a substantially parallel beam by the collimator lens 5, and is focused as a light spot on an information recording surface of the CD 80 through the protective substrate by the objective lens 6. The laser beam reflected by the information recording surface of the CD 80 passes through the objective lens 6, the collimator lens 5 and the wedge-shaped dichroic prism 4 again and returns to the light emitting and receiving element 11 to be received.

Here, the objective lens 6 has a diffraction structure for focusing a blue-violet laser beam for recording or reproduction in or from the BD 60, a red laser beam for recording or reproduction in or from the DVD 70 and an infrared laser beam for recording or reproduction in or from the CD 80 as minute light spots utilizing wavelength differences. If it is assumed that a focal length fol of the objective lens 6 is 2.3 mm and a focal length fcl of the collimator lens 5 is 16.1 mm, the optical magnification $\beta$ as a ratio of the focal length fcl to the focal length fol is 7.0.

Next, the wedge-shaped dichroic prism 4 is described in detail with reference to FIG. 4. Since the red laser beam and the infrared laser beam emitted from the light emitting and receiving element 11 are divergent beams, an astigmatism occurs when they pass through a parallel plate inclined with respect to the optical axis, and the light spots on the optical discs focused by the objective lens 6 cannot have a sufficient convergence performance. For example, if a red laser beam is caused to be incident at an angle of 45° on a parallel plate having a thickness of 2.0 mm instead of on the wedge-shaped dichroic prism 4 of this embodiment in the above optical system, a third-order astigmatism of about 500 m$\lambda$ and a third-order coma aberration of about 30 m$\lambda$ occur when this light is converged on the DVD 70.

As shown in FIG. 4, the wedge-shaped dichroic prism 4 of this embodiment solves this problem by defining a specified angle (apex angle $\alpha$) between an incident surface 4a and an emergent surface 4b and setting this apex angle $\alpha$ and the incident angles of the respective laser beams on the wedge-shaped dichroic prism 4 to specified angles, thereby correcting the third-order astigmatism and the third-order coma aberration of the divergent beams passing through the wedge-shaped dichroic prism 4. An incident angle of a laser beam is an angle defined between the optical axis of the laser beam and a normal to a surface (e.g. incident surface 4a or emergent surface 4b) on which the laser beam is incident, an emergent angle of a laser beam is an angle defined between the optical axis of the emerging laser beam and a normal to a surface (e.g. emergent surface 4b) from which the laser beam emerges.

As an example, if it is assumed:
apex angle $\alpha$ of the wedge-shaped dichroic prism 4=0.89°,
thickness T of the middle part of the wedge-shaped dichroic prism 4=1.5 mm,
incident angle $\theta 1$ of the red laser beam=42.24°,
emergent angle $\theta 2$ of the red laser beam (incident angle of the blue-violet laser beam)=40.62°,
numerical aperture NA of the objective lens 6=0.60, and
glass material of the wedge-shaped dichroic prism 4: BK7,
the third-order astigmatism and the third-order coma aberration when the red laser beam having passed through the wedge-shaped dichroic prism 4 is converged by the collimator lens 5 and the objective lens 6 both become substantially zero.

Figure 5:
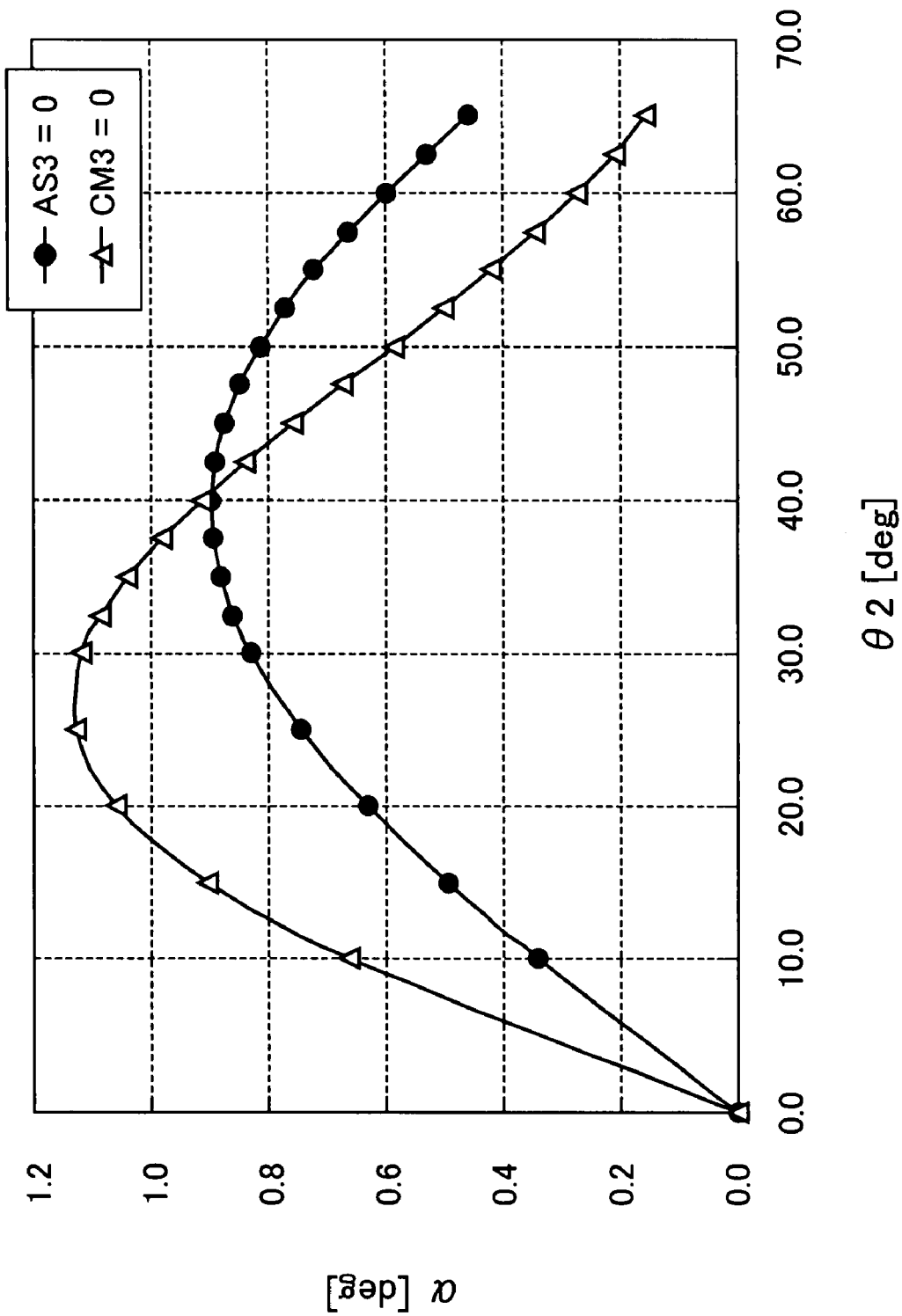
FIG. 5 is a graph showing a value of an apex angle $\alpha$ to minimize a third-order astigmatism and a third-order coma aberration in the case of changing an incident angle $\theta 2$ in the first embodiment of the invention.

FIG. 5 plots the value of the apex angle $\alpha$ when the third-order astigmatism (AS3) and the third-order coma aberration (CM3) are respectively minimized (substantially zeroed) in the case of changing the incident angle $\theta 2$ in the wedge-shaped dichroic prism 4 whose middle part has a thickness T=1.5 mm. The third-order astigmatism and the third-order coma aberration are naturally zero when the incident angle $\theta 2$=0° and the apex angle $\alpha$=0°. As the incident angle $\theta 2$ is increased, the third-order astigmatism and the third-order coma aberration coincide again when the apex $\alpha$ is about 0.9° at the incident angle $\theta 2$ of about 41°. This indicates that a point where the third-order astigmatism and the third-order coma aberration simultaneously become substantially zero is present at the incident angle $\theta 2 \approx 41°$ and at the apex angle $\alpha \approx 0.9°$ and such a point is present only here except at the incident angle $\theta 2$=0. In other words, by designing the wedge-shaped dichroic prism 4 in this way, the third-order astigmatism and the third-order coma aberration can be minimized (substantially zeroed).

Here, in order to solve the above conventional problem, the inventors of the present application keenly examined aberrations in the case where a red laser beam used for recording or reproduction in or from a DVD was caused to pass through a wedge-shaped dichroic prism and a blue-violet laser beam used for recording or reproduction in or from a BD required to have a stricter wavefront aberration performance was reflected by the wedge-shaped dichroic prism using an optical system whose numerical aperture NA$\geqq$0.60, and found out that not only an astigmatism but also a coma aberration were affected and a trefoil aberration was largely affected in this case, with the result that they completed the present invention.

Thus, even if the third-order astigmatism and the third-order coma aberration are minimized (substantially zeroed) as described above, other higher-order aberrations, mainly the trefoil aberration, remain. On the other hand, since aberrations occurring in the optical head, mainly in the objective lens 6 are spherical aberrations, astigmatisms and coma aberrations, the influence on the total wavefront difference (RMS) is small even if other aberrations occur.

For example, the specification of the third-order astigmatism and the third-order coma aberration required for the objective lens 6 are substantially about 20 to 30 m$\lambda$ in considering various margins. Accordingly, it is substantially not necessary to consider superfluous margins for the conventional optical head if the third-order astigmatism and the third-order coma aberration occurring in the wedge-shaped dichroic prism 4 of this embodiment can be substantially zeroed and the remaining trefoil aberration can be suppressed to 15 mλ or below.

If the above are specifically shown using numerical values, the total wavefront aberration is 35.4 mλ (RMS), for example, if the third-order astigmatism is 25 mλ and the third-order coma aberration is 25 mλ. Even if the trefoil aberration of 15 mλ is added to this, the total wavefront aberration is about 38.4 mλ.

However, in an actual optical head, even if the third-order astigmatism and the third-order coma aberration occurring in the wedge-shaped dichroic prism 4 are designed to be substantially zeroed, there are cases where the third-order astigmatism and the third-order coma aberration of about 5 mλ respectively occur due to shape errors, mounting errors and like errors of the respective optical components. Similarly, even if the trefoil aberration is designed to be 15 mλ or below, there are cases where the trefoil aberration of about 5 mλ further occurs.

Thus, if the apex angle α satisfies α≠0°, the third-order astigmatism and the third-order coma aberration occurring when a red laser beam used for recording or reproduction in or from a DVD passes through the wedge-shaped dichroic prism 4 are preferably 5 mλ or below, more preferably 1 mλ or below, and even more preferably substantially zero. Similarly, the trefoil aberration occurring when a red laser beam used for recording or reproduction in or from a DVD passes through the wedge-shaped dichroic prism 4 is preferably 20 mλ or below, and more preferably 15 mλ.

Here, the remaining trefoil aberration depends on the optical magnification β. In other words, the remaining trefoil aberration becomes smaller as the optical magnification β becomes larger and the divergence angle of the laser beam incident on the wedge-shaped dichroic prism 4 becomes smaller.

Generally, rim intensity in a tangential direction (disc tangential direction) at the time of recording or reproduction in or from a DVD presumably needs to be about 60%. If it is assumed that the NA of an objective lens is 0.60 and a divergence angle in vertical direction of a red semiconductor laser in a light emitting and receiving element is 16.0°, the optical magnification β needs to be 5.0 or larger in order to ensure the rim intensity of 60%. In other words, if the optical magnification β is smaller than 5.0, the rim intensity of 60% cannot be ensured regardless of how the semiconductor laser is rotated about the optical axis. Since the divergence angle of the semiconductor laser varies, it can be said that optical systems having an optical magnification β smaller than 5.0 substantially need not be considered.

On the other hand, if it is assumed that a divergence angle in vertical direction of a red semiconductor laser is 16.0° and a divergence angle in horizontal direction is 9.0°, the rim intensity of 60% can be ensured regardless of how the semiconductor laser is rotated about the optical axis (in a range from 0° to 45°) by setting the optical magnification β to 7.0 or larger.

If the optical magnification β increases, light utilization efficiency conversely decreases. For example, if the focal length of the objective lens is short, it can be thought to increase the optical magnification β to make the entire optical system larger, thereby facilitating the assembling and adjustment of the optical system.

Figure 6:
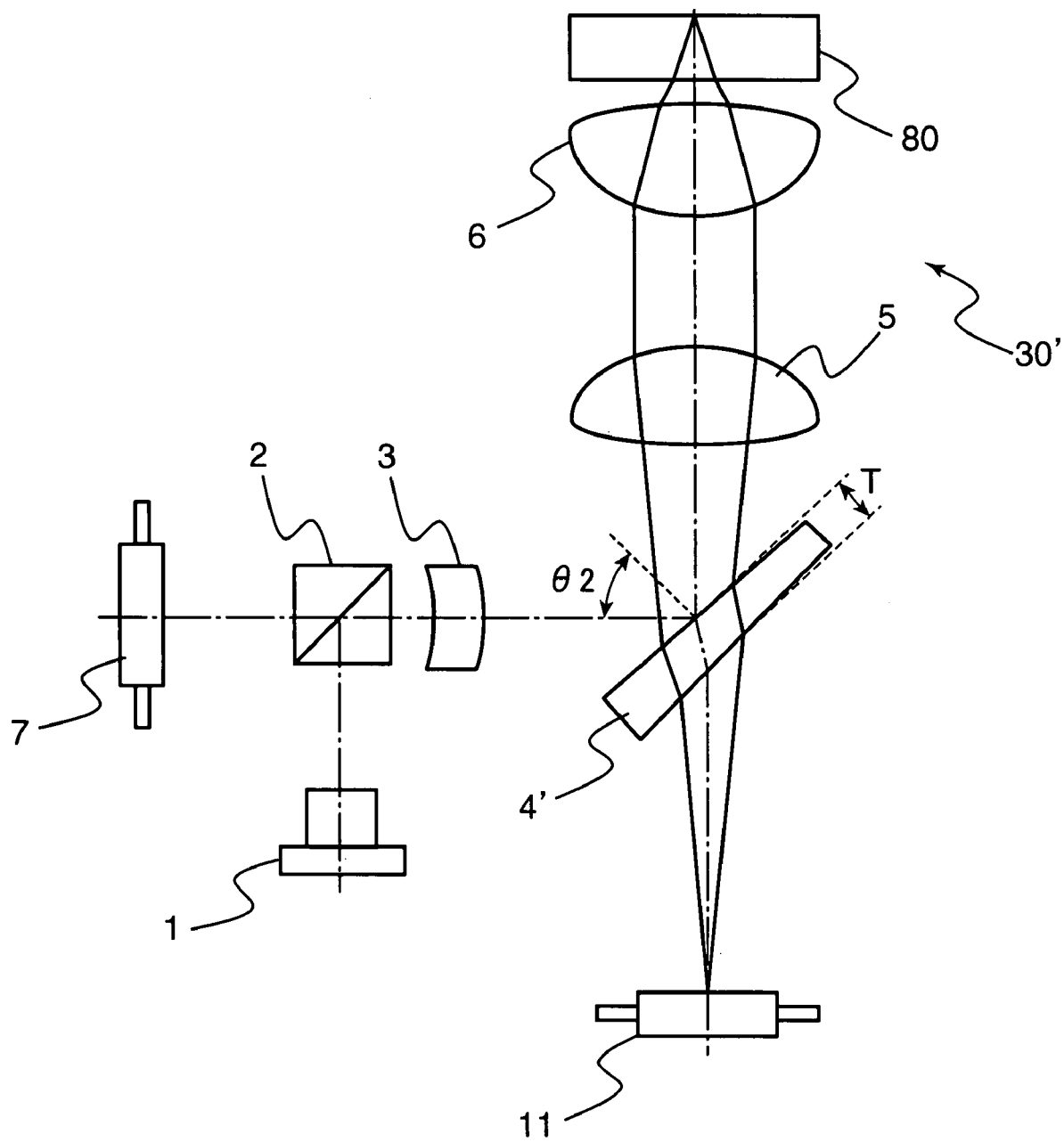
FIG. 6 is a schematic construction diagram of an optical head using a wedge-shaped dichroic prism having an incident angle $\theta 2=45°$ and a middle part with a thickness T=2.0 mm.

As the optical magnification β increases, the third-order coma aberration occurring in the wedge-shaped dichroic prism decreases. If the optical magnification β exceeds 12.0, the third-order coma aberration remaining in a wedge-shaped dichroic prism 4' having an incident angle θ2=45° and a middle part with a thickness T=2.0 mm, for example, as shown in FIG. 6 becomes 1 mλ or smaller. Accordingly, the wedge-shaped dichroic prism of the present invention for correcting both the third-order astigmatism and the third-order coma aberration needs not be applied.

From the above, the optical magnification β of the wedge-shaped dichroic prism of the present invention applicable to optical heads for recording or reproduction in or from DVDs may be considered to lie within a range of 5.0 to 12.0.

Figure 7:
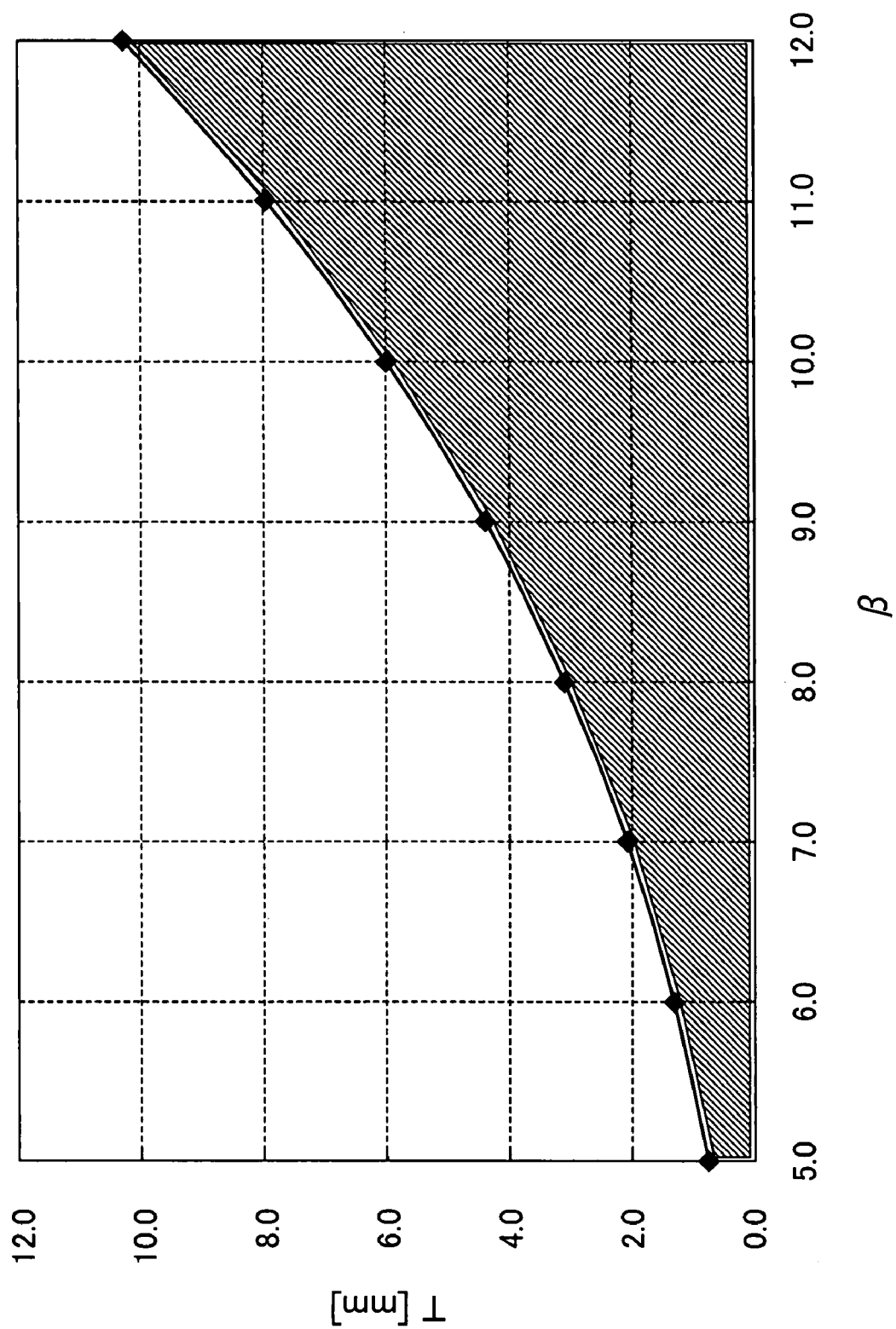
FIG. 7 is a graph plotting the thickness T of the middle part of the wedge-shaped dichroic prism at which trefoil aberration is 15 m$\lambda$ when an optical magnification $\beta$ is changed in the wedge-shaped dichroic prism according to the first embodiment of the invention.

Next, the shape of the wedge-shaped dichroic prism 4 of this embodiment is described in detail. FIG. 7 is a graph plotting the thickness T of the middle part of the wedge-shaped dichroic prism 4 having a trefoil aberration of 15 mλ in relation to the optical magnification β represented by a horizontal axis in the wedge-shaped dichroic prism 4 of this embodiment. It can be understood from FIG. 7 that the thickness T of the prism middle part having a trefoil aberration of 15 mλ increases as the optical magnification β increases.

Figure 8A:
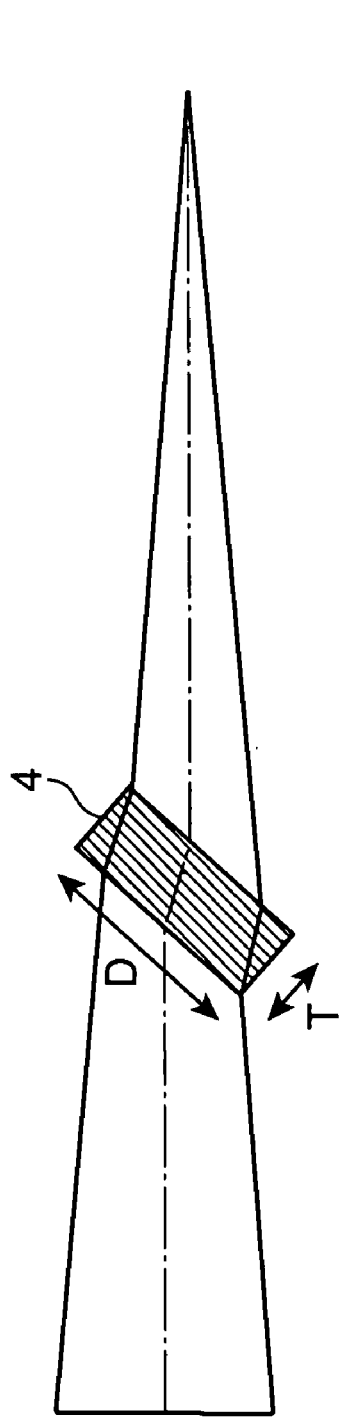
FIGS. 8A and 8B are diagrams showing light paths of laser beams in the cases where the thickness T of the middle part of the wedge-shaped dichroic prism is small and large in optical systems having the same optical magnifications.
Figure 8B:
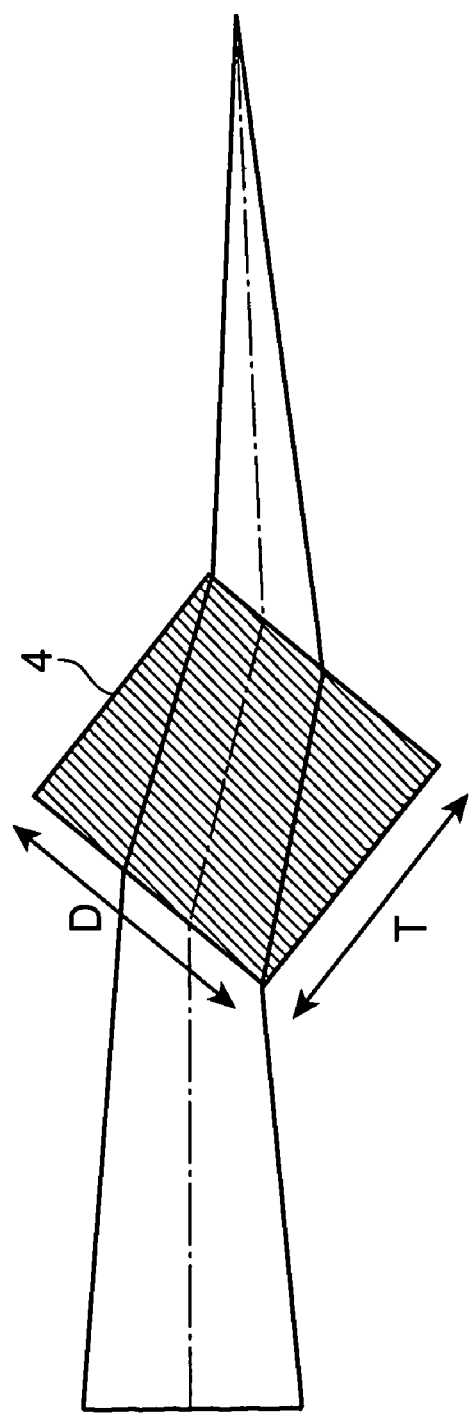

FIGS. 8A and 8B are diagrams showing light paths of laser beams in a case FIG. 8A where the thickness T of the middle part of the wedge-shaped dichroic prism 4 is small and a case FIG. 8B where this thickness T is large. As is clear from FIGS. 8A and 8B, necessary width D of the incident and emergent surfaces of the wedge-shaped dichroic prism 4 increases as the thickness T of the middle part of the prism 4 increase, whereby the wedge-shaped dichroic prism 4 suddenly becomes larger.

Figure 9:
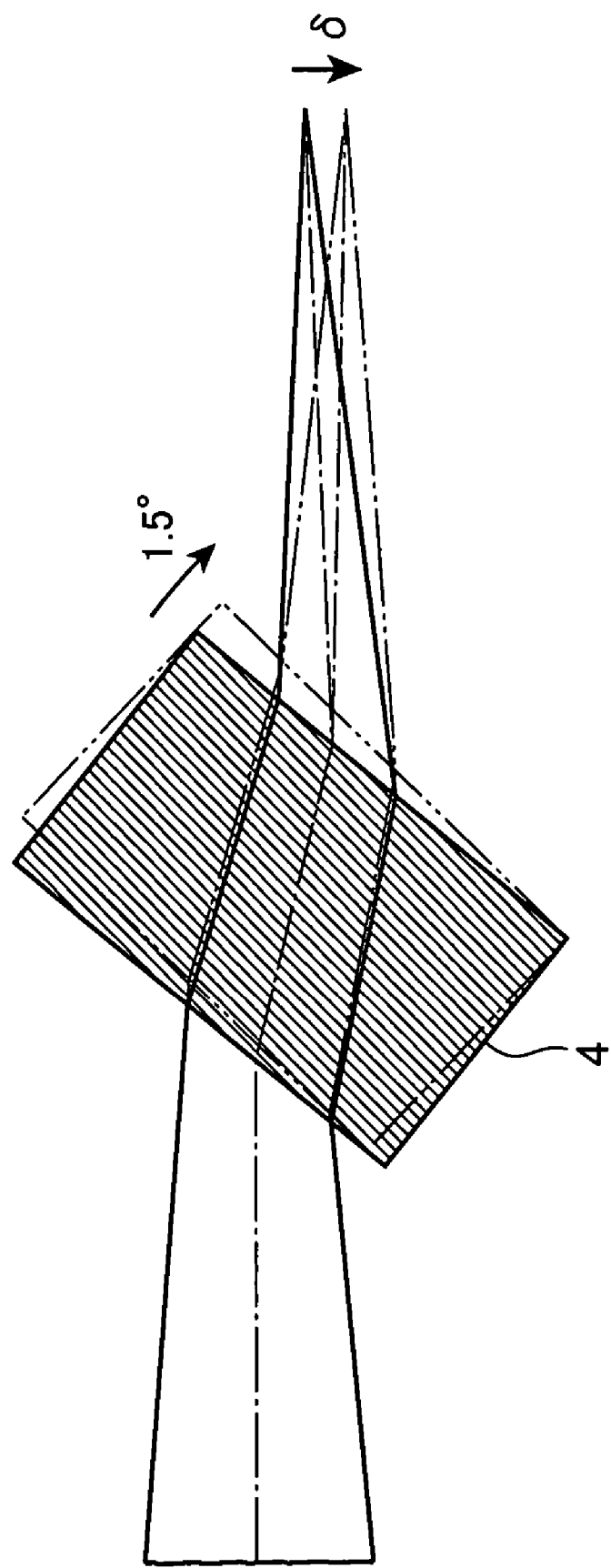
FIG. 9 is a diagram showing an occurrence of a displacement $\delta$ of a light-emitting point when the wedge-shaped dichroic prism is rotated by about 1.5°.

Further, it is, for example, assumed that the width of the incident surface of the wedge-shaped dichroic prism 4 is 2.0 mm and a prism mounting surface has a shape error of 50 μm, the wedge-shaped dichroic prism 4 rotates by about 1.5° and a light-emitting point displacement δ occurs as shown in FIG. 9. The light-emitting point displacement δ needs to be suppressed since it leads to the inclination of the optical axis of the incident beam on the objective lens 6, the enlargement of an adjustment range of the light detector (light emitting and receiving element 11) and the like.

Figure 10:
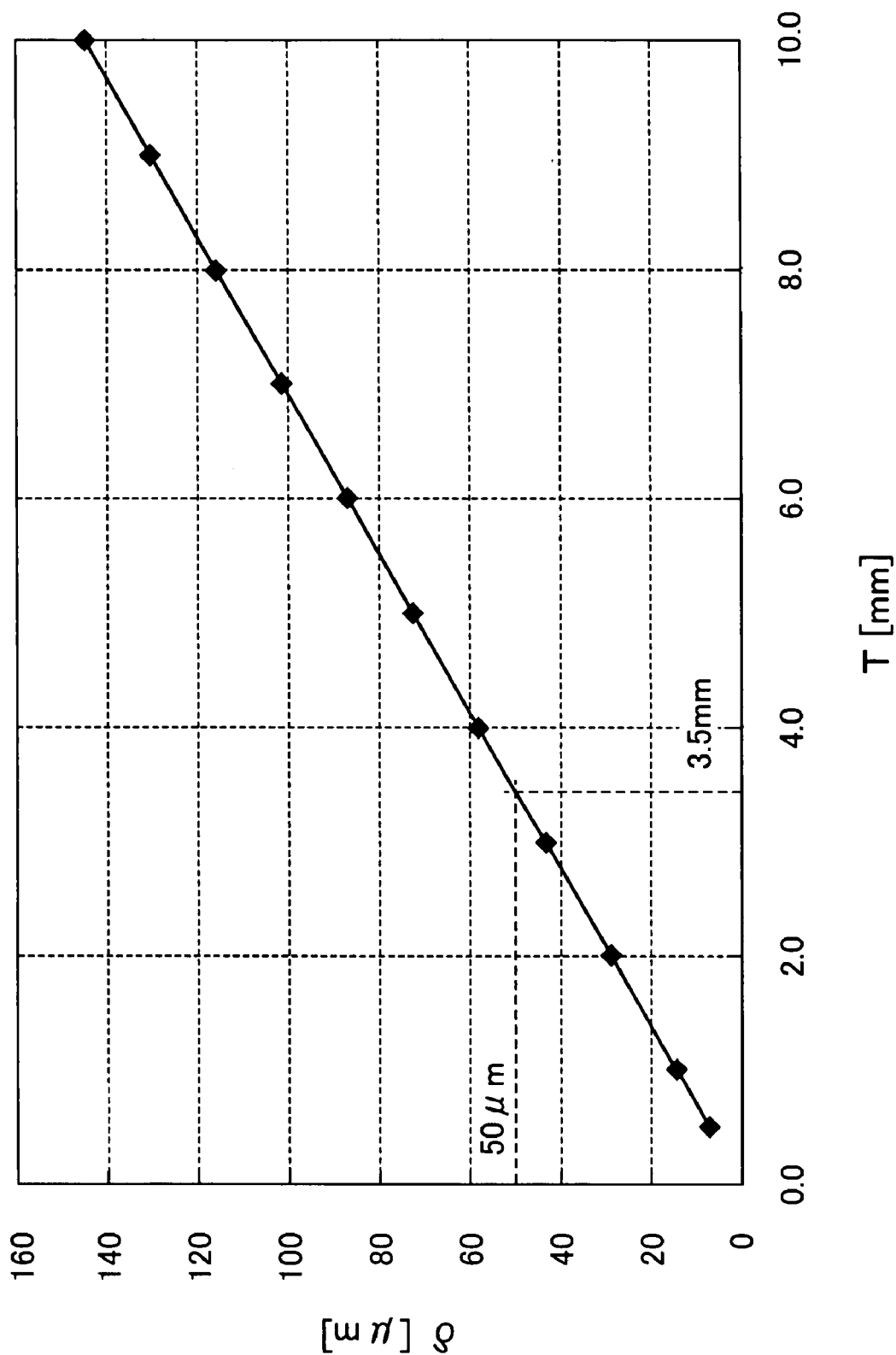
FIG. 10 is a graph plotting a relationship between the thickness T of the middle part of the wedge-shaped dichroic prism and the displacement $\delta$ of the light-emitting point when the wedge-shaped dichroic prism is rotated by about 1.5°.

FIG. 10 is a graph plotting the light-emitting point displacement δ represented by vertical axis represents in the case of rotating the wedge-shaped dichroic prism 4 by 1.5° in relation to the thickness T of the middle part of the wedge-shaped dichroic prism 4 represented by a horizontal axis. It can be understood from FIG. 10 that the light-emitting point displacement δ increases in proportion to the thickness T of the prism middle part and, if the thickness T of the prism middle part exceeds 3.5 mm, the light-emitting point displacement δ becomes larger than 50 μm presumed to a mechanical mounting error of the light source, i.e. the light emitting and receiving element 11 to make the light-emitting point displacement δ extremely larger as compared to conventional optical heads.

Here, the reason why the width of the incident surface of the wedge-shaped dichroic prism 4 was set to 2.0 mm is described below. Since the wedge-shaped dichroic prism 4 has to combine two light paths (one for transmission and the other for reflection), the wedge-shaped dichroic prism 4 has to be arranged at specified distances from the light source 1 and the light emitting and receiving element 11 shown in FIG. 2, for example, in order to avoid the interference of the light source 1 and the light emitting and receiving element 11, wherefore the necessary effective diameter of the wedge-shaped dichroic prism 4 cannot be decreased very much. Further, in view of "chipping" of the edges of the elements, the outer shape of the wedge-shaped dichroic prism 4 is one size larger than the necessary effective diameter (area where laser beams passes or are reflected) of the wedge-shaped dichroic prism 4. Further, the wedge-shaped dichroic prism 4 has to be arranged at a specified angle in an optical base (base for mounting the respective optical elements, not shown). If the elements are too small, it becomes very difficult to handle the elements. In view of the above three points, the minimum size is presumed to be 2.0 mm.

Next, the reason why the mechanical error was set to 50 μm is described below. As a measuring stick of the permissible dimensional deviation of working accuracy, JIS B 0405 specifies that "tolerance is normally ±0.05 mm if a dimension is 0.5 mm to 6.0 mm". Accordingly, if a permissible dimensional deviation is not particularly designated, the shape error of the mounting surface of the wedge-shaped dichroic prism 4 and that of the mounting surface of the light source (=mounting position error of the light source) might be possibly up to 50 μm.

As described above, the condition when the light-emitting point displacement δ caused by the rotation of the wedge-shaped dichroic prism 4 by up to 1.5° on the worst conditions of the width of the incident surface of the wedge-shaped dichroic prism 4 and the mechanical error of the light source is made smaller than the shape error of 50 μm of the mounting surface of the light source is that T=3.5 mm or smaller.

Figure 11:
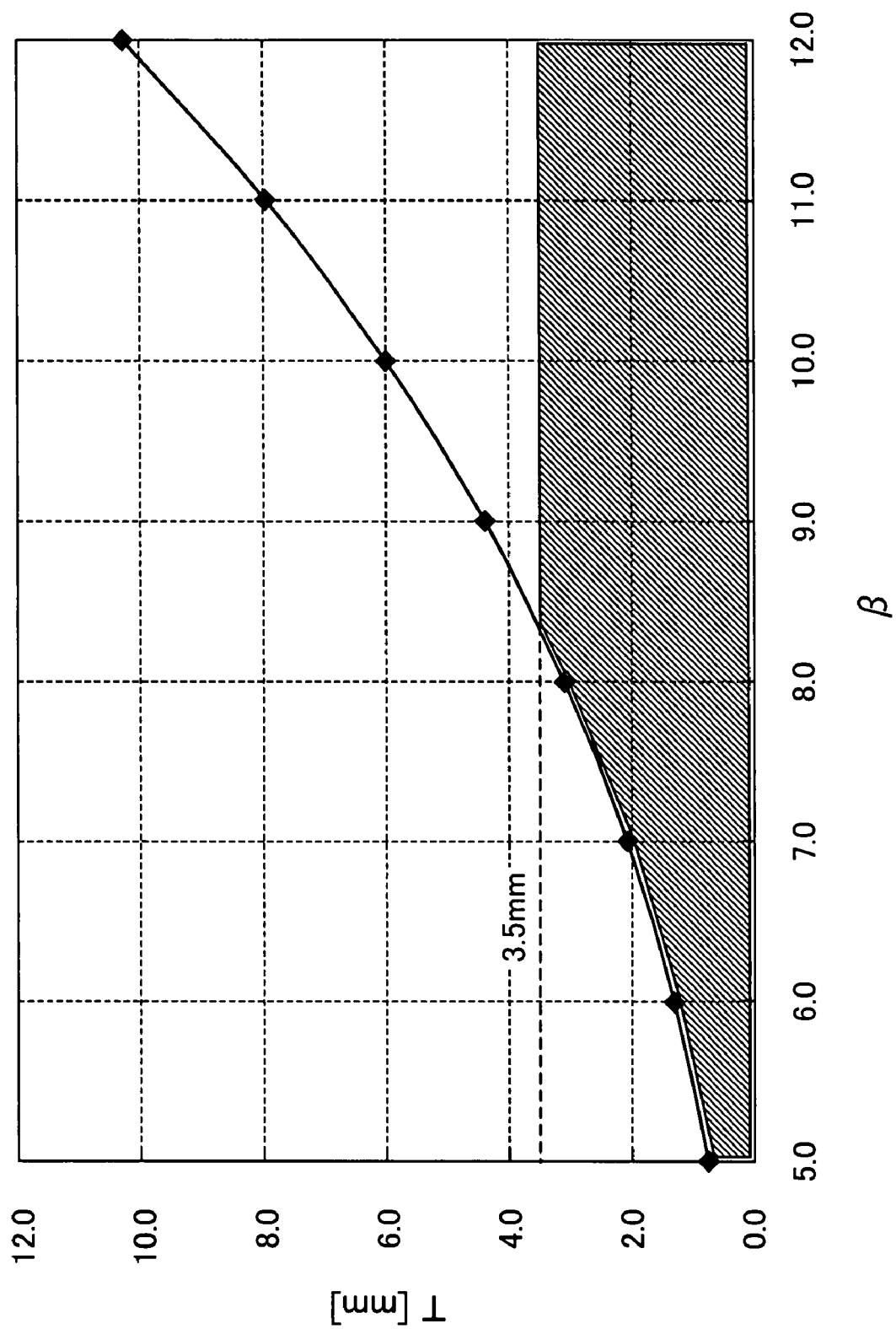
FIG. 11 is a graph showing an area to be satisfied by the thickness T of the middle part of the wedge-shaped dichroic prism and the optical magnification $\beta$ when the displacement of the light-emitting point is considered in the wedge-shaped dichroic prism according to the first embodiment of the invention.

From the above reasons, the thickness T of the middle part of the wedge-shaped dichroic prism 4 has to be 10.0 mm or shorter so that the trefoil aberration is 15 mλ or smaller at a maximum when the optical magnification β lies in the range of 5.0 to 12.0 as shown in FIG. 7. From the standpoint of the light-emitting point displacement, the thickness T is preferably 3.5 mm or shorter and preferably lies in a hatched area shown in FIG. 11 when the optical magnification β lies in the range of 5.0 to 12.0. It should be noted that as the thickness T of the middle part of the wedge-shaped dichroic prism 4 becomes smaller, the remaining trefoil aberration becomes even smaller, wherefore cost can be reduced by the miniaturization of the prism itself.

Since the rim intensity of 60% or higher can be ensured if the optical magnification β is 7.0 or larger, the thickness T of the middle part of the wedge-shaped dichroic prism 4 is more preferably 2.1 mm or shorter in this case in order to make the trefoil aberration smaller than 15 mλ.

Figure 12:
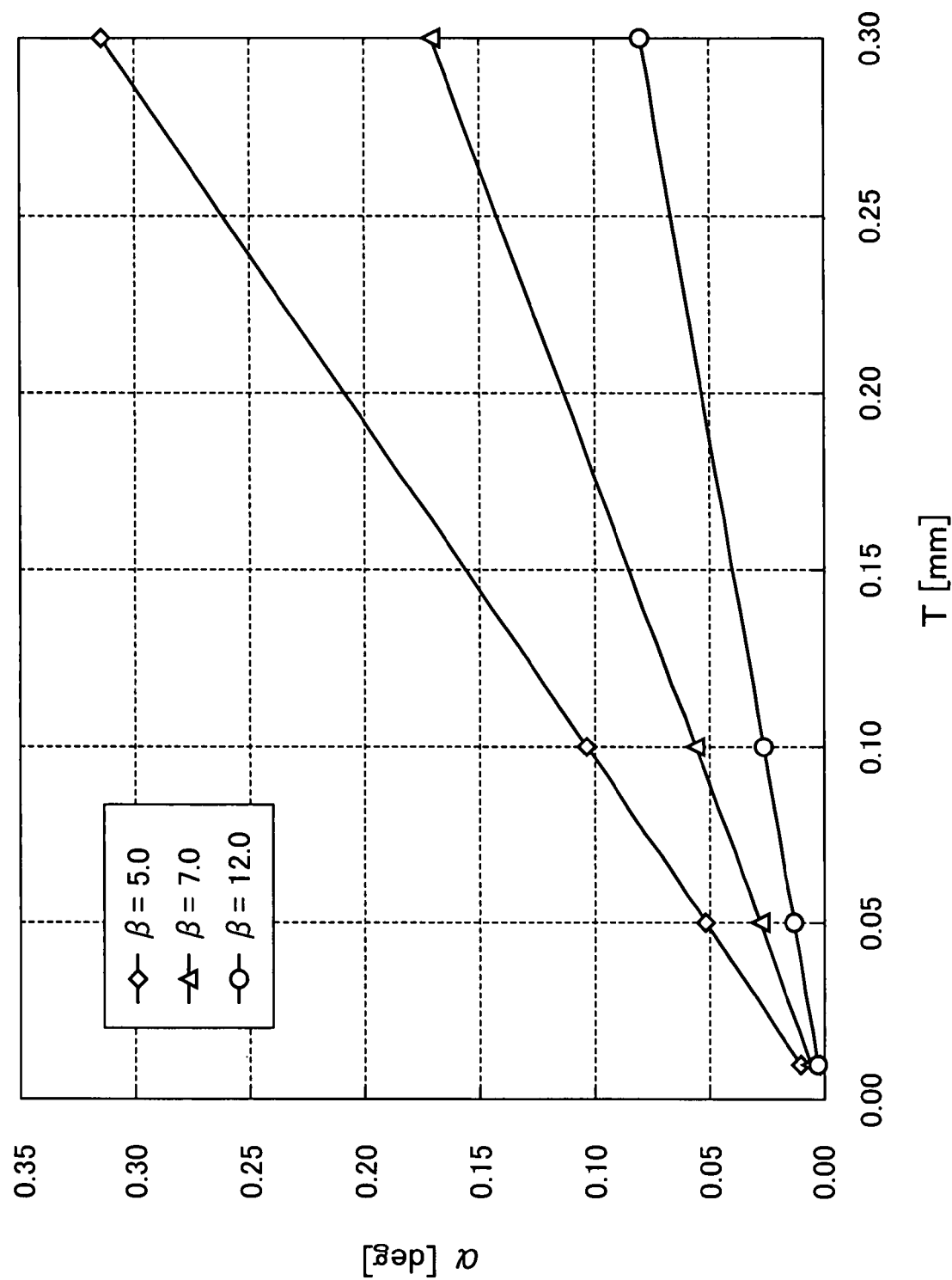
FIG. 12 is a graph plotting the apex angle $\alpha$ in the case of changing the thickness T of the middle part of the wedge-shaped dichroic prism from 0.01 mm to 0.3 mm when the optical magnification $\beta$ is 5.0, 7.0 and 12.0 in the wedge-shaped dichroic prism according to the first embodiment of the invention.

Next, the range of the apex angle α is described in detail. FIG. 12 is a graph plotting the apex angle α in the case of changing the thickness T of the prism middle part from 0.01 mm to 0.3 mm when the optical magnification β was 5.0, 7.0 and 12.0. As is clear from FIG. 12, the apex angle α approaches zero as the thickness T of the prism middle part decreases. The thickness T of the prism middle part cannot be zero in reality, but it can be understood that the lower limit of the apex angle α is zero.

Figure 13:
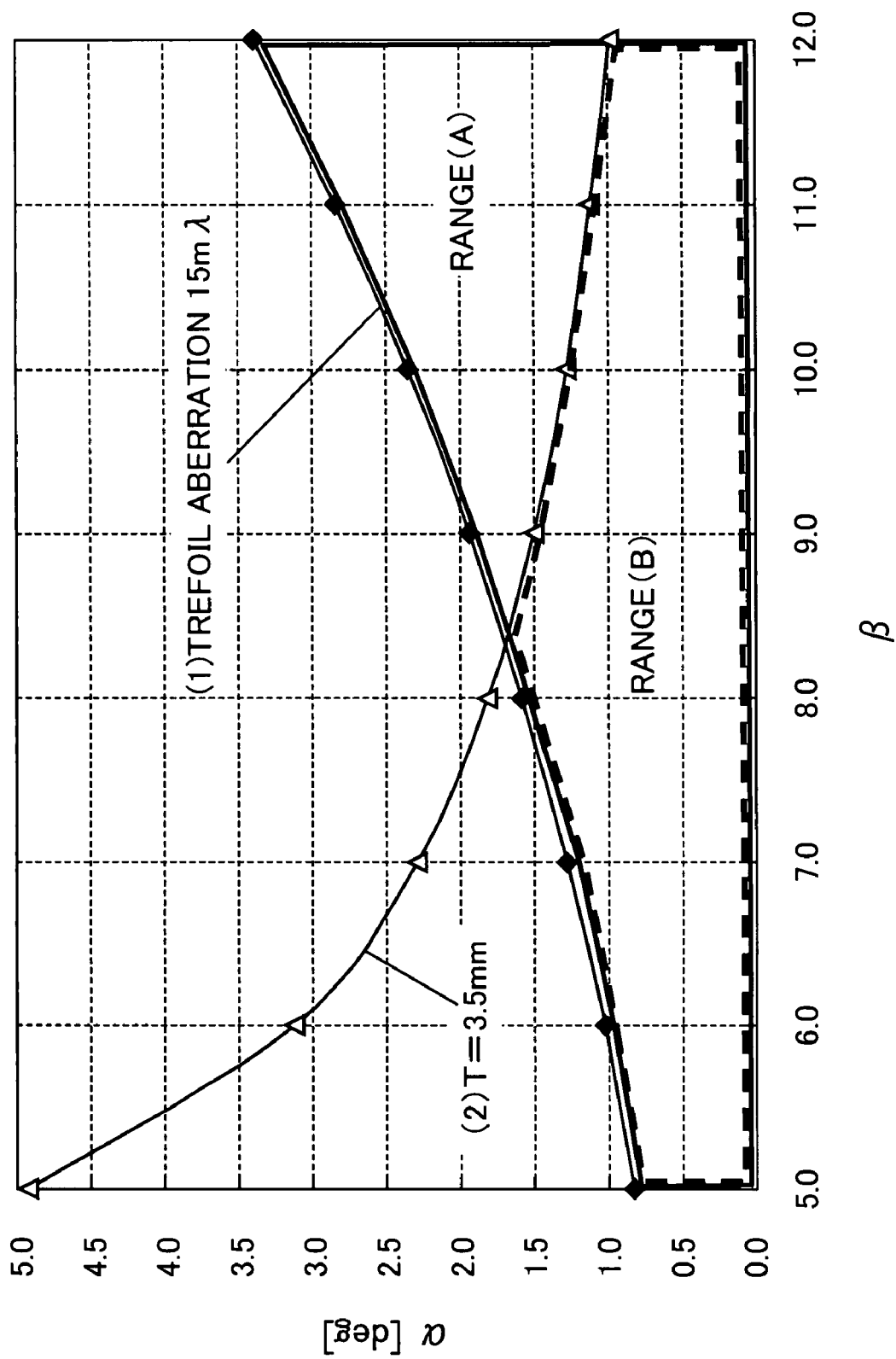
FIG. 13 is a graph showing an area to be satisfied by the apex angle $\alpha$ when the optical magnification $\beta$ lies in a range of 5.0 to 12.0 in the wedge-shaped dichroic prism according to the first embodiment of the invention.

Further, the apex angle α can be uniquely determined by determining the optical magnification β and the thickness T of the prism middle part. In FIG. 13, a horizontal axis represents the optical magnification β and a vertical axis represents the apex angle α, wherein (1) is a curve plotting the relationship between the apex angle α and the optical magnification β at the thickness T of the prism middle part with which the trefoil aberration is 15 mλ or smaller, and (2) is a curve plotting the relationship between the apex angle α and the optical magnification β when the thickness T of the prism middle part is 3.5 mm.

In order to make the trefoil aberration equal to or smaller than 15 mλ, the apex angle α has to lie in a range (A) shown in solid line in FIG. 13, but preferably lies in a range (B) shown in broken line in FIG. 13 where the thickness T of the prism middle part is 3.5 mm or shorter. In other words, the apex angle α has to lie within a range of $\alpha \leq 3.40$, more preferably within a range of $\alpha \leq 1.70$.

Figure 14:
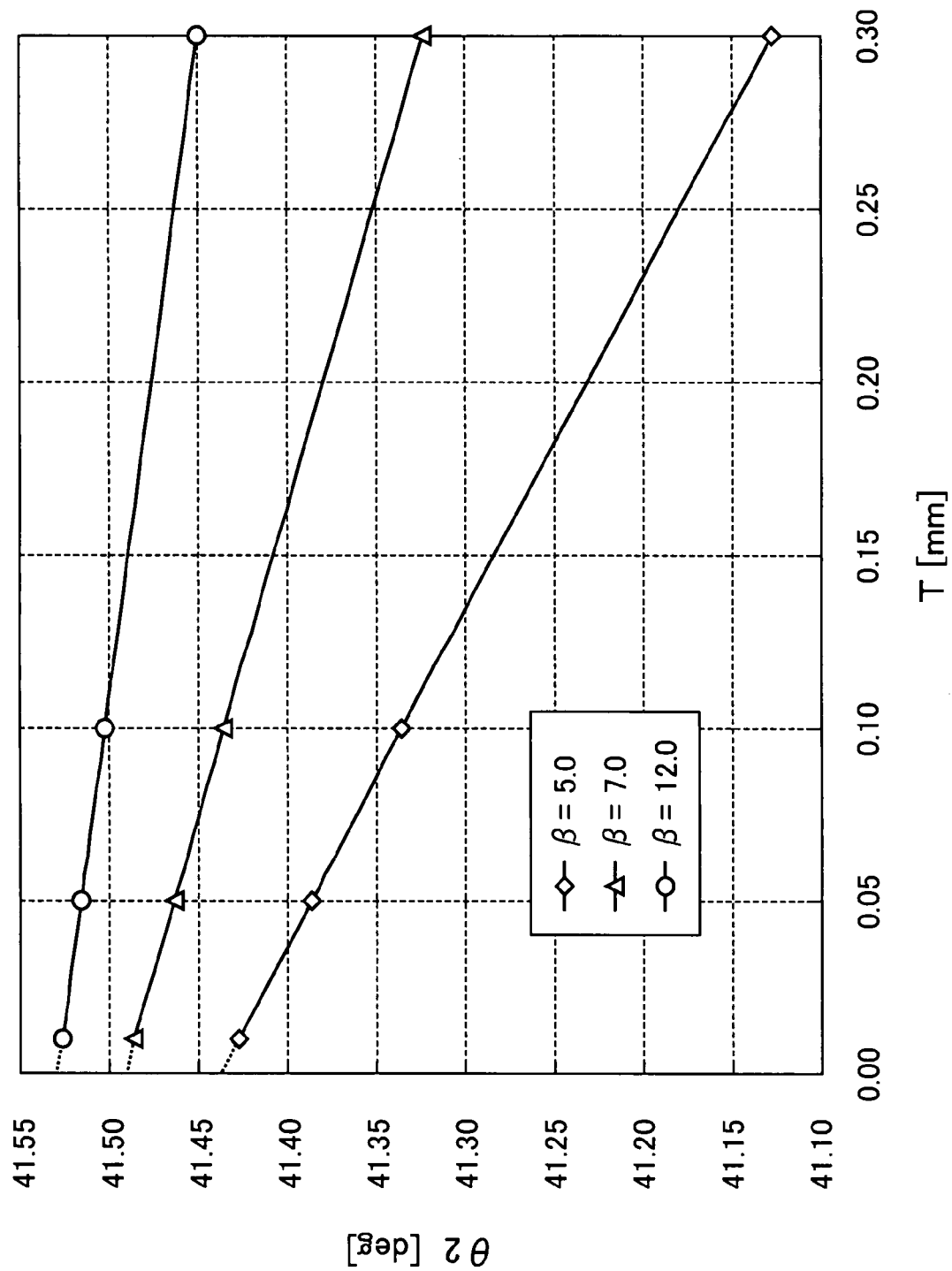
FIG. 14 is a graph plotting the incident angle $\theta 2$ in the case of changing the thickness T of the middle part of the wedge-shaped dichroic prism from 0.01 mm to 0.3 mm when the optical magnification β is 5.0, 7.0 and 12.0 in the wedge-shaped dichroic prism according to the first embodiment of the invention.

Next, the range of the incident angle θ2 is described in detail. FIG. 14 is a graph plotting the incident angle θ2 in the case of changing the thickness T of the prism middle part from 0.01 mm to 0.3 mm when the optical magnification β was 5.0, 7.0 and 12.0 in the wedge-shaped dichroic prism 4 of this embodiment. As is clear from FIG. 14, the incident angle θ2 becomes larger as the thickness T of the prism middle part decreases. The thickness T of the prism middle part cannot be zero in reality, but the incident angle θ2 reaches a maximum value of 41.53° when the optical magnification β is 12.0 and presumably cannot take any larger value.

Figure 15:
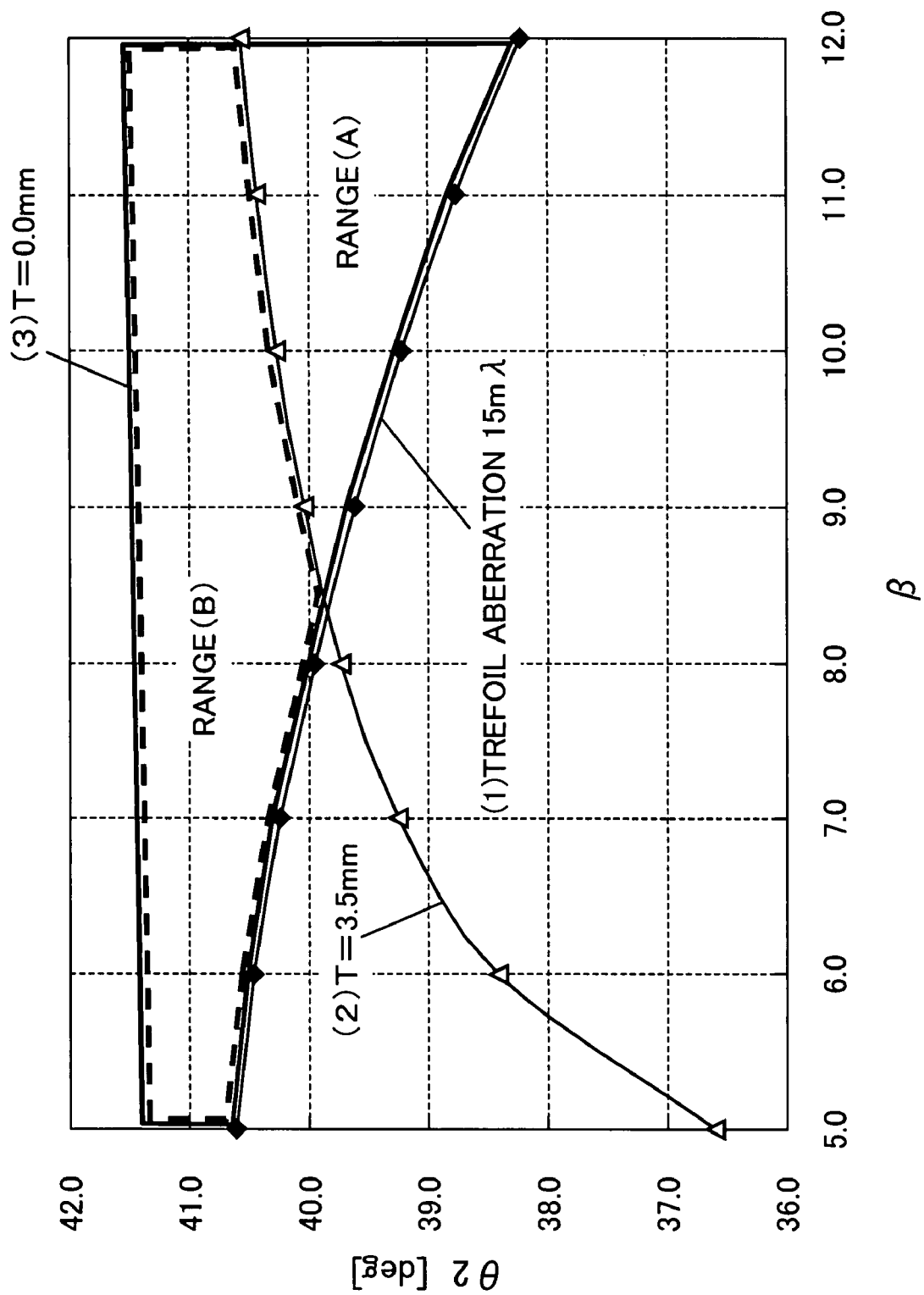
FIG. 15 is a graph showing an area to be satisfied by the incident angle θ2 when the optical magnification β lies in the range of 5.0 to 12.0 in the wedge-shaped dichroic prism according to the first embodiment of the invention.

The incident angle θ2 is uniquely determined by determining the optical magnification β and the thickness T of the prism middle part. In FIG. 15, a horizontal axis represents the optical magnification β and a vertical axis represents the incident angle θ2, wherein (1) is a curve plotting the relationship between the incident angle θ2 and the optical magnification β at the thickness T of the prism middle part with which the trefoil aberration was 15 mλ, (2) is a curve plotting the relationship between the incident angle θ2 and the optical magnification β when the thickness T of the prism middle part is 3.5 mm, and (3) is a curve plotting the relationship between the incident angle θ2 and the optical magnification β when the thickness T of the prism middle part is substantially 0 mm.

In order to make the trefoil aberration equal to or smaller than 15 mλ, the incident angle θ2 has to lie in a range (A) shown in solid line in FIG. 15, but preferably lies in a range (B) shown in broken line in FIG. 15 where the thickness T of the prism middle part is 3.5 mm or shorter. In other words, the incident angle θ2 has to lie within a range of $38.22° \leq \theta 2 \leq 41.53°$, more preferably within a range of $39.90° \leq \theta 2 \leq 41.53°$.

Figure 16:
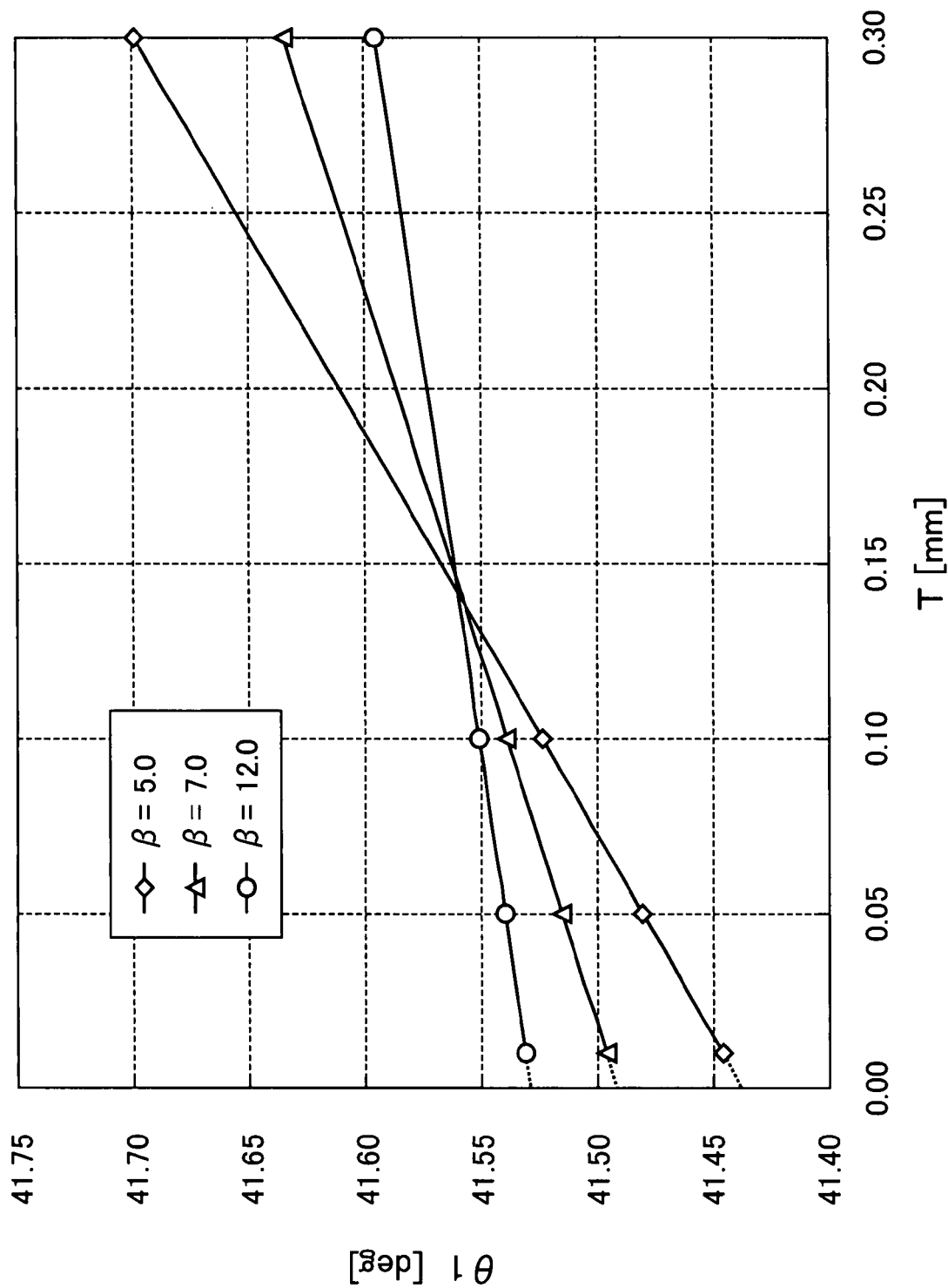
FIG. 16 is a graph plotting the incident angle θ1 in the case of changing the thickness T of the middle part of the wedge-shaped dichroic prism from 0.01 mm to 0.3 mm when the optical magnification β is 5.0, 7.0 and 12.0 in the wedge-shaped dichroic prism according to the first embodiment of the invention.

Next, the range of the incident angle θ1 is described in detail. FIG. 16 is a graph plotting the incident angle θ1 in the case of changing the thickness T of the prism middle part from 0.01 mm to 0.3 mm when the optical magnification β was 5.0, 7.0 and 12.0 in the wedge-shaped dichroic prism 4 of this embodiment. As is clear from FIG. 16, the incident angle θ1 becomes smaller as the thickness T of the prism middle part decreases. The thickness T of the prism middle part cannot be zero in reality, but the incident angle θ1 reaches a minimum value of 41.44° when the optical magnification β is 5.0 and presumably cannot take any smaller value.

Figure 17:
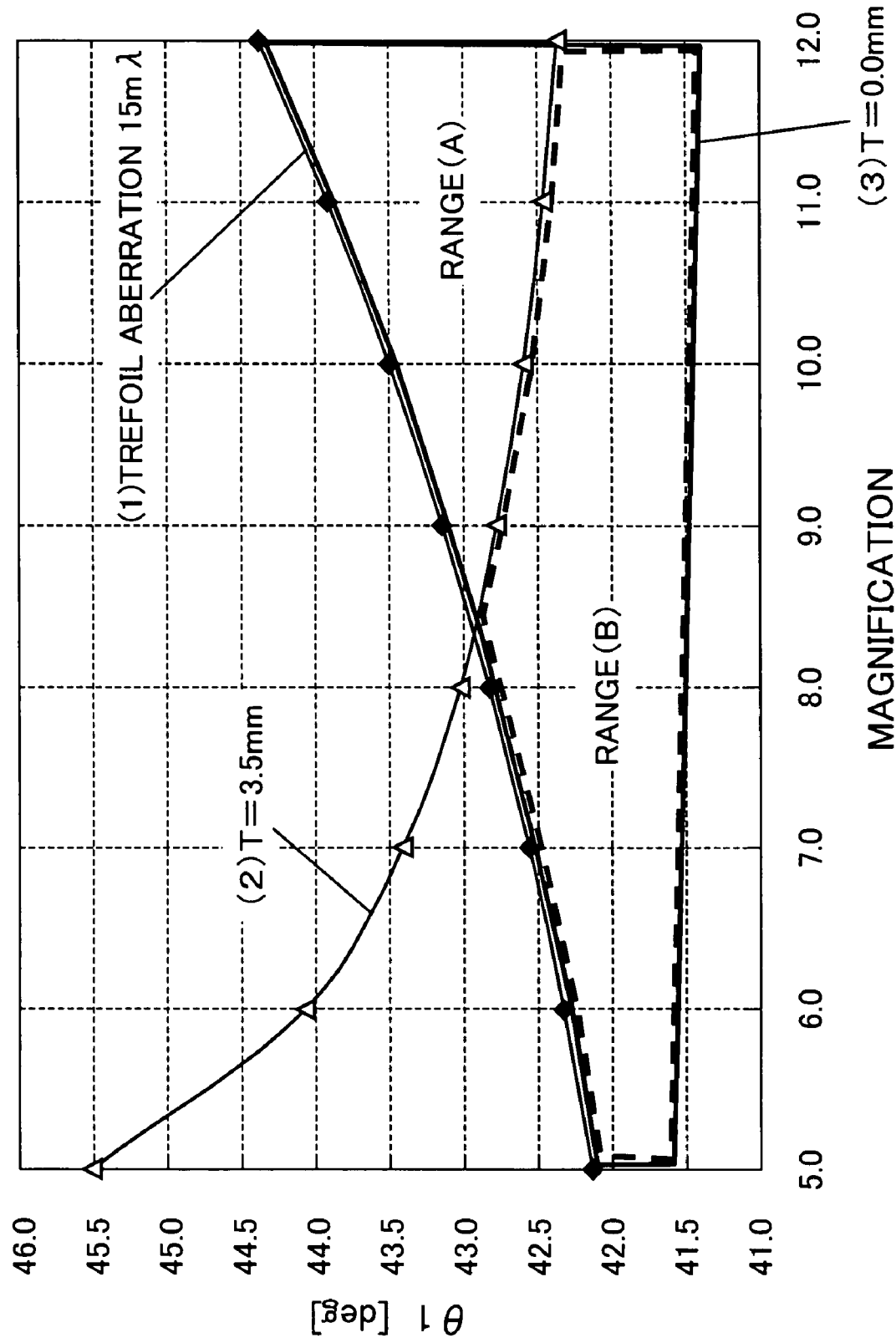
FIG. 17 is a graph showing an area to be satisfied by the incident angle θ1 when the optical magnification β lies in the range of 5.0 to 12.0 in the wedge-shaped dichroic prism according to the first embodiment of the invention.

The incident angle θ1 is uniquely determined by determining the optical magnification β and the thickness T of the prism middle part. In FIG. 17, a horizontal axis represents the optical magnification β and a vertical axis represents the incident angle θ1, wherein (1) is a curve plotting the relationship between the incident angle θ1 and the optical magnification β at the thickness T of the prism middle part where the trefoil aberration is 15 mλ or smaller, (2) is a curve plotting the relationship between the incident angle θ1 and the optical magnification β when the thickness T of the prism middle part is 3.5 mm, and (3) is a curve plotting the relationship between the incident angle θ1 and the optical magnification β when the thickness T of the prism middle part is substantially 0 mm.

In order to make the trefoil aberration equal to or smaller than 15 mλ, the incident angle θ1 has to lie in a range (A) shown in solid line in FIG. 17, but preferably lies in a range (B) shown in broken line in FIG. 17 where the thickness T of the prism middle part is 3.5 mm or shorter. In other words, the incident angle θ1 has to lie within a range of $41.44° \leq \theta 1 \leq 44.39°$, more preferably within a range of $41.44° \leq \theta 1 \leq 42.94°$.

Although the above calculations were made, assuming that a refractive index nd of the glass material of the wedge-shaped dichroic prism 4 is 1.514 (refractive index at a red wavelength of BK7), the thickness T of the prism middle part, the apex angle α, the incident angles θ1 and θ2 can lie within the substantially same ranges as above if the refractive index nd lies within a range of $1.45 \leq nd \leq 1.90$.

As described above, in this embodiment, the total wavefront aberration including the other higher-order aberrations (mainly trefoil aberration) can be suppressed while minimizing (substantially zeroing) the third-order astigmatism and the third-order coma aberration of the light spot focused by the objective lens 6 for infrared laser beams by setting the apex angle α of the wedge-shaped dichroic prism 4, the thickness T of the middle part of the wedge-shaped dichroic prism 4, and the incident angles θ1, θ2 as described above.

In this embodiment, an infrared laser beam used for recording or reproduction in or from the CD 80 is emitted from the same light-emitting point of the light emitting and receiving element 11 in addition to a red laser beam used for recording or reproduction in or from the DVD 70, and astigmatisms occurring when these laser beams pass through the wedge-shaped dichroic prism 4 are corrected. Here, there is a difference between the third-order astigmatisms to be corrected due to a wavelength difference of the red laser beam and the infrared laser beam, but it is substantially no problem because the third-order astigmatisms remaining in the spots focused by the objective lens are about 2 mλ and the total wavefront difference including the coma aberrations and higher-order aberrations (mainly trefoil aberrations) can be suppressed.

Although a blue-violet laser beam having a wavelength of 405 nm is emitted from the light source 1 and a red laser beam having a wavelength of 655 nm and an infrared laser beam having a wavelength of 785 nm are emitted from the light emitting and receiving element 11 in this embodiment, the present invention is not limited to this. For example, different light sources are arranged at different positions for red laser beams and infrared laser beams, and the optical axes of the emitted laser beams may be conformed to each other using a beam splitter or the like.

It is apparent that the present invention is also applicable to optical heads in which only red laser beams having a wavelength of 655 nm are emitted from the light emitting and receiving element 11 and only recording or reproduction in or from the DB 60 and the DVD 70 is possible.

In such a case, as shown in FIG. 2, the red laser beam reflected by the DVD 70 can be caused to pass through the wedge-shaped dichroic prism 4 and received by the light emitting and receiving element 11. Alternatively, the red laser beam reflected by the DVD 70 is reflected by the wedge-shaped dichroic prism 4 and received by the light receiving element 7 for receiving blue-violet laser beams.

Second Embodiment

Figure 18:
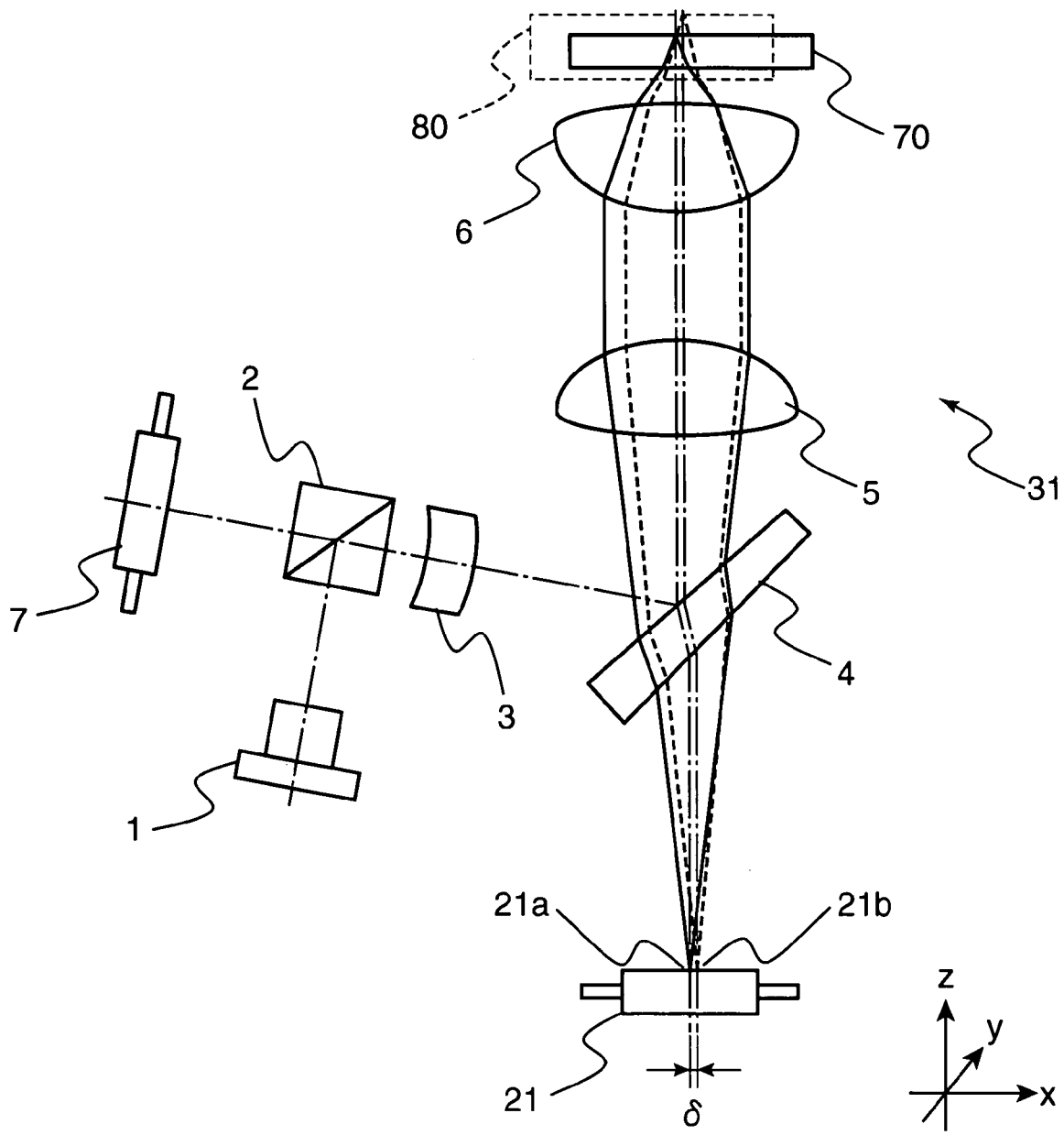
FIG. 18 is a schematic construction diagram in the case of recording or reproduction in or from a DVD or CD using an optical head according to a second embodiment of the invention.
Figure 19:
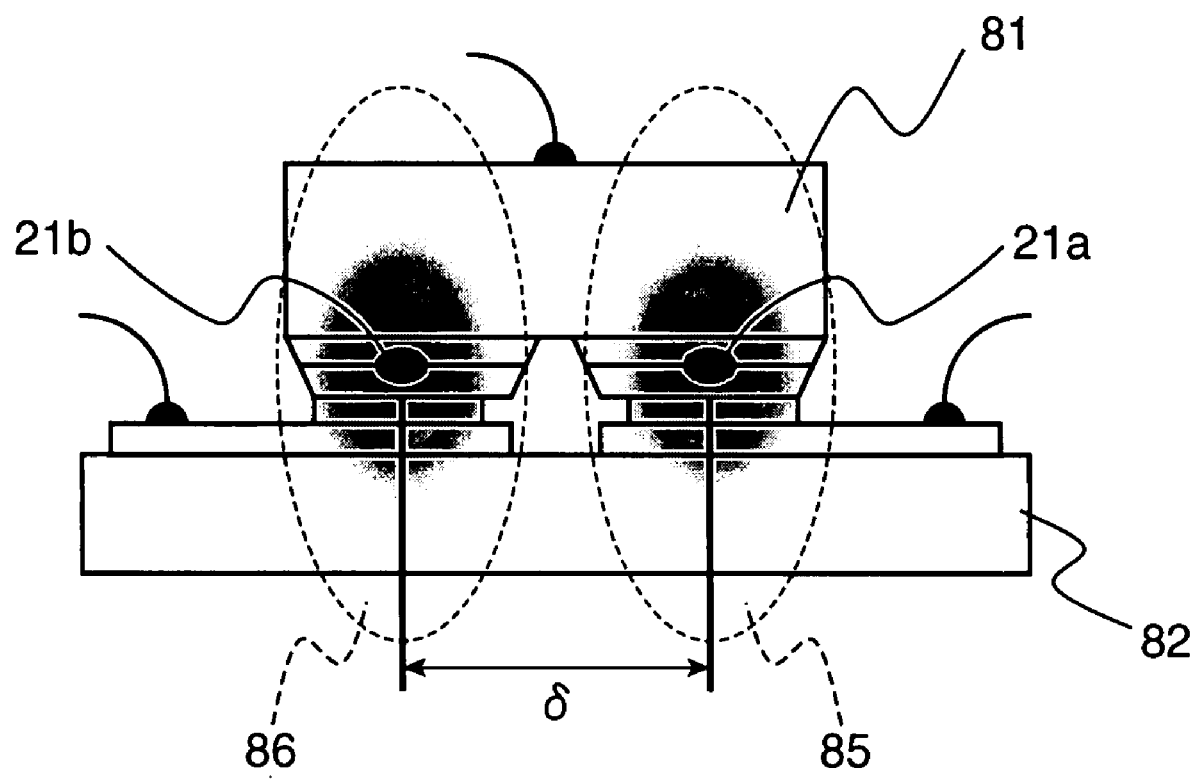
FIG. 19 is a schematic construction diagram showing a light emitting and receiving element shown in FIG. 18.

Next, a second embodiment of the present invention is described with reference to FIGS. 18 and 19. FIG. 18 is a schematic construction diagram of an optical head according to this embodiment, and FIG. 19 is a schematic construction of a light emitting and receiving element shown in FIG. 18. In FIG. 18, component parts common to FIGS. 1 to 4 are not described by being identified by the same reference numerals as in FIGS. 1 to 4.

In an optical head 31, identified by 21 is a light emitting and receiving element for emitting and receiving a red laser beam and an infrared laser beam, wherein a light-emitting point 21a for emitting a red laser beam and a light-emitting point 21b for emitting an infrared laser beam are arranged at a specified distance δ to each other.

The light emitting and receiving element 21 includes a monolithic two-wavelength laser. The monolithic two-wavelength laser is constructed such that, for example, a GaAs substrate 81 is formed on a submount 82 as shown in FIG. 19, and a red laser beam 85 and an infrared laser beam 86 are emitted from one laser chip. The two-wavelength laser may be of the hybrid type in which two laser chips are juxtaposed besides being of the monolithic type as shown in FIG. 19. Neither type can generally conform the light-emitting point 21a for the red laser beam 85 and the light-emitting point 21b for the infrared laser beam 86 to each other.

Here, it is assumed that the distance between the light-emitting point 21a for the red laser beam 85 and the light-emitting point 21b for the infrared laser beam 86 is 100 μm in the light emitting and receiving element 21 of this embodiment. In this case, if the position of the light-emitting point 21a for the red laser beam 85 is, for example, so determined in the optical head 31 of FIG. 18 as to minimize the wavefront aberration of the light spot in the case of recording or reproduction in or from the DVD 70 similar to the optical head 30 of FIG. 2, it is possible to suppress the total wavefront aberration including other higher-order aberrations (mainly trefoil aberration) while minimizing (substantially zeroing) third-order astigmatism and third-order coma aberration of the light spot focused by the objective lens 6 for the red laser beam 85.

On the other hand, since the infrared laser beam 86 is incident on the wedge-shaped dichroic prism 4 along the optical axis different from the red laser beam 85, aberrations occur which are different from those occurring in the case where the infrared laser beam 86 is incident on the wedge-shaped dichroic prism 4 along the same optical axis as the red laser beam 85 (first embodiment). However, it is possible to suppress the total wavefront aberration including other higher-order aberrations (mainly trefoil aberration) while minimizing (substantially zeroing) the third-order astigmatism and third-order coma aberration of the light spot focused by the objective lens 6 for the infrared laser beam 86 by setting the apex angle α of the wedge-shaped dichroic prism 4, the thickness T of the middle part of the wedge-shaped dichroic prism 4, the incident angles θ1, θ2 as in the first embodiment.

Further, since the two-wavelength laser as shown in FIG. 19 is arranged as shown in FIG. 18 in this embodiment, the laser beam is incident as a P-polarized beam on the wedge-shaped dichroic prism 4. By causing the laser beam to pass as a P-polarized beam through the wedge-shaped dichroic prism 4 in this way, there is also a merit of relatively facilitating the film designing of the wedge-shaped dichroic prism 4.

Third Embodiment

Figure 20:
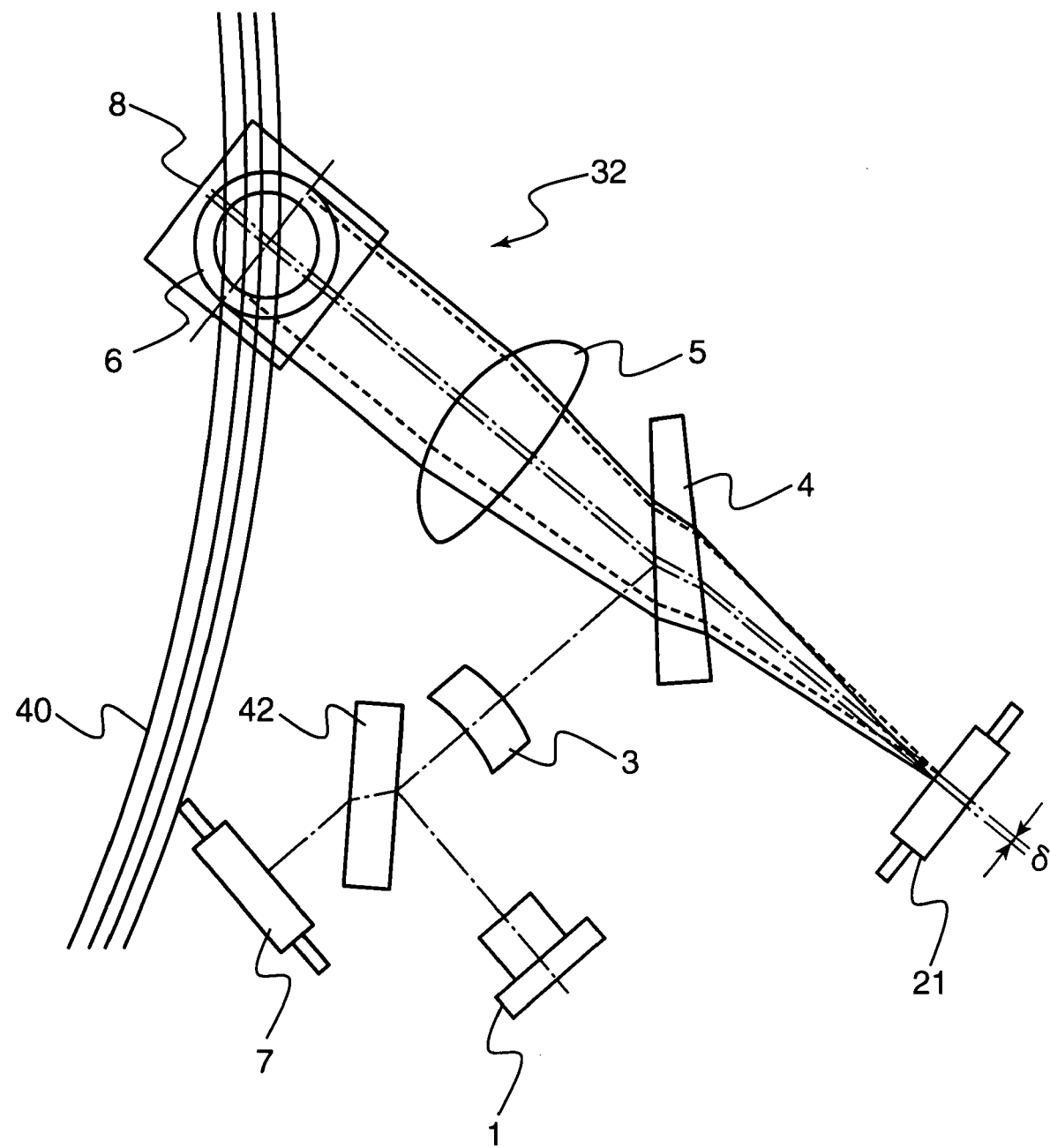
FIG. 20 is a schematic construction diagram of an optical head using a light emitting and receiving element according to a third embodiment of the invention.

Next, a third embodiment of the present invention is described with reference to FIG. 20. FIG. 20 is a schematic construction diagram of an optical head according to this embodiment. In FIG. 20, component parts common to FIGS. 1 to 4 and 18 are not described by being identified by the same reference numerals as in FIGS. 1 to 4 and 18.

An optical head 32 is such that an optical system is rotated by about 45° with respect to information tracks 40 of a BD 60, a DVD 70 or a CD 80. Specifically, each laser beam emitted from a light source 1 or a light emitting and receiving element 21 is bent by a mirror 8 in a direction normal to the corresponding BD 60, DVD 70 or CD 80, and the optical axis of the laser beam incident on the mirror 8 is at about 45° to a direction of the information tracks 40 of the BD 60, the DVD 70 or the CD 80.

By such an optical arrangement, it is possible to give an astigmatism inclined at about 45° to a diffraction pattern by the information tracks 40 to the laser beam reflected by the BD 60, the DVD 70 or the CD 80 using a flat beam splitter 42. Thus, this optical arrangement is suitable to obtain a focus-error signal by an astigmatism method. By the arrangement as shown in FIG. 20, a far-field pattern becomes a spot rotated by about 45° with respect to the information tracks 40, wherefore rim intensity can be improved in radial and tangential directions without using any means such as a beam shaping element, and the optical head 32 itself can have a compact construction.

Although the objective lens 6 is described as the one provided with a diffraction structure for focusing the blue-violet laser beam, red laser beam and infrared laser beam on the information recording surfaces of the BD 60, DVD 70 and CD80 in the first to third embodiments, the present invention is not limited to this. It is apparent that the objective lens 6 may be a refraction type objective lens utilizing wavelength dispersion characteristics of a plurality of glass materials or a combination lens including a plurality of diffraction-type/refraction-type lenses.

In the above first to third embodiments, in order to optimize a spherical aberration and increase an operating distance upon focusing a laser beam on the information recording surface of the BD 60, DVD 70 or CD 80, the collimator lens 5 may be movable in the optical axis direction to convert a light beam incident on the objective lens 6 into a beam slightly convergent or divergent with respect to a parallel beam. Although such a collimator lens is not described in detail since having substantially no relation to the content of the present invention, it is apparent that the present invention is also applicable to an optical head including such a collimator lens.

Although the light receiving element 7 is arranged at a position different from the light source 1 in the above first to third embodiments, the light source 1 and the light receiving element 7 may be formed by a light emitting and receiving element arranged at the same position. Further, although the red laser beam and the infrared laser beam are both received by the light emitting and receiving element 11 or 21, they may be received by different light receiving elements.

Figure 21:
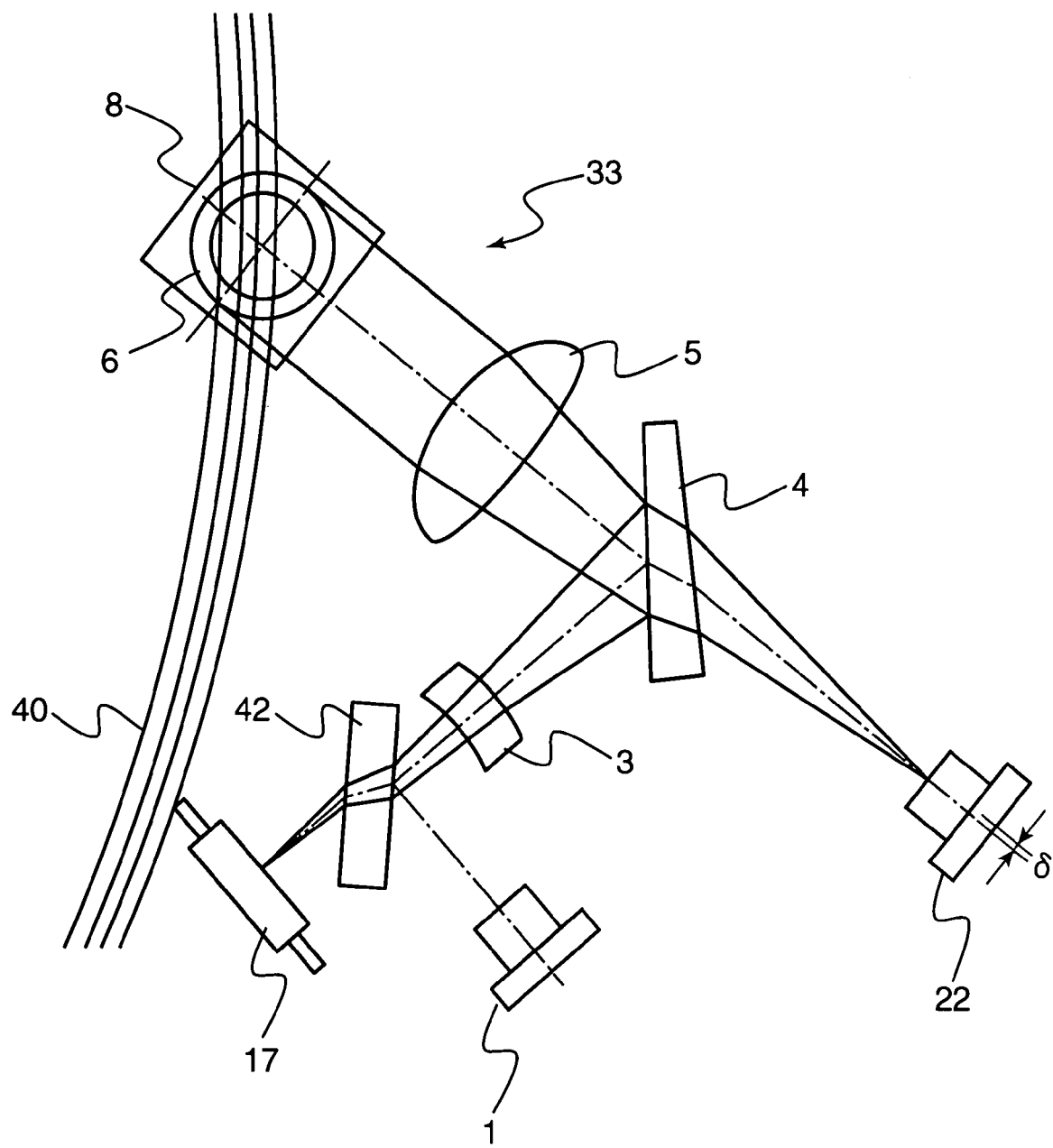
FIG. 21 is a schematic construction diagram of the optical head in the case where the light emitting and receiving element of the third embodiment of the invention is replaced by a two wavelength light source.

The present invention is also applicable to an optical head 33 in which a two-wavelength light source 22 for emitting a red laser beam and an infrared laser beam may be used instead of the light emitting and receiving element 11 or 21, and the red laser beam and the infrared laser beam reflected by an optical disc are reflected by a wedge-shaped dichroic prism 4 and received by a light receiving element 17 together with a blue-violet laser beam as shown in FIG. 21.

Although the laser beam having a wavelength of 405 nm is used upon recording or reproduction in or from the BD 60, the laser beam having a wavelength of 655 nm is used upon recording or reproduction in or from the DVD 70 and the laser beam having a wavelength of 785 nm is used upon recording or reproduction in or from the CD 80 in the above first to third embodiments, the present invention is not limited to this. It is apparent that the present invention is widely applicable to optical heads for recording or reproduction in or from three types of optical discs using three laser beams having different wavelengths, i.e. a laser beam having a wavelength of 350 to 450 nm, a laser beam having a wavelength of 600 to 700 nm and a laser beam having a wavelength of 750 to 850 nm.

The optical heads 30 to 33 according to the above respective embodiments have good optical performances for recording or reproduction with light sources of laser beams of three wavelengths, i.e. the blue-violet laser beam, the red laser beam and the infrared laser beam and the corresponding optical discs, and can satisfactorily record or reproduce information in or from, for example, three types of optical discs, e.g. BDs, DVDs and CDs.

Fourth Embodiment

Figure 22:
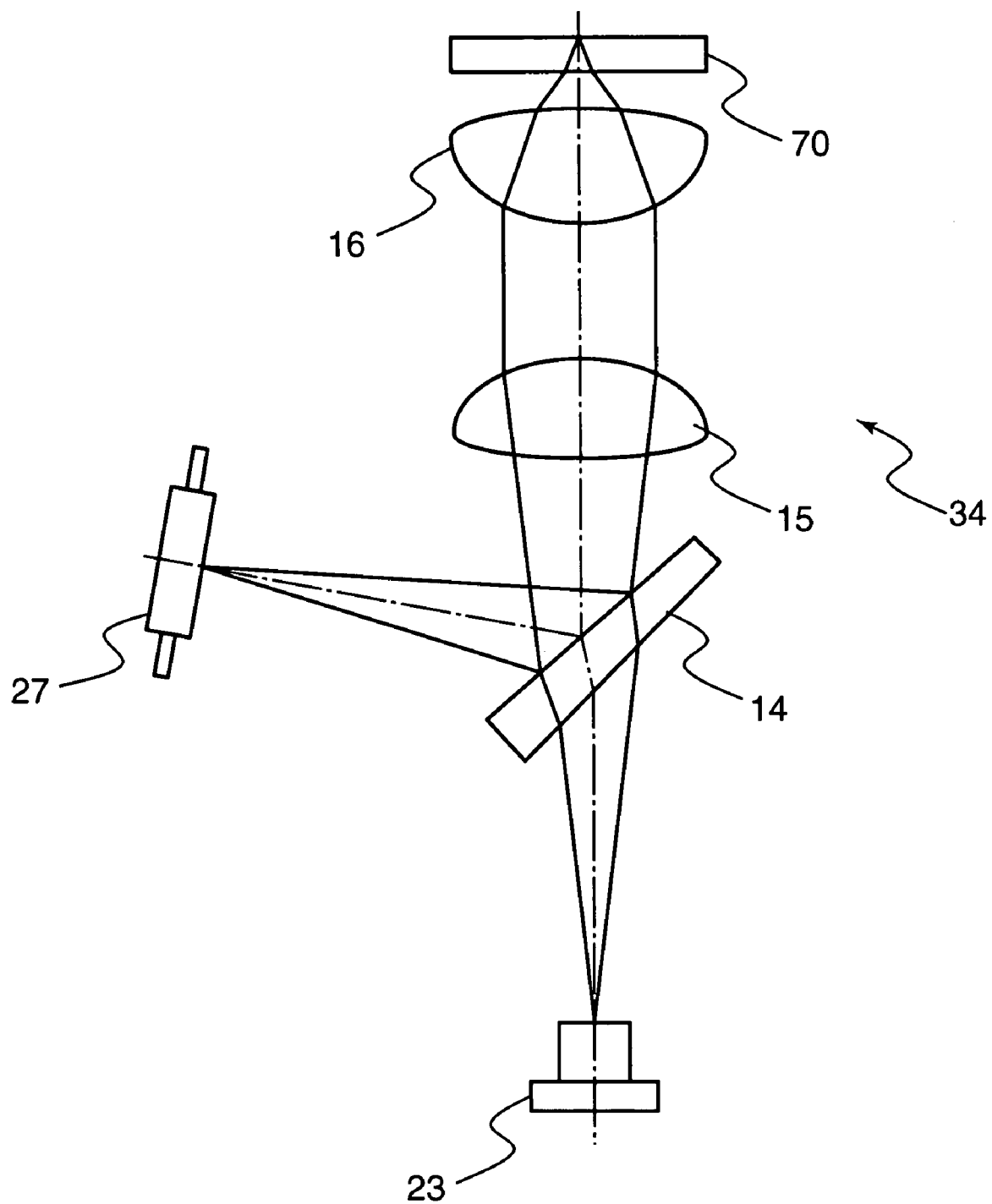
FIG. 22 is a schematic construction diagram of an optical head capable of recording or reproduction in or from a DVD according to a fourth embodiment of the invention.

Next, a fourth embodiment of the present invention is described with reference to FIG. 22. FIG. 22 is a schematic construction diagram of an optical head according to this embodiment. An optical head 34 is an optical head capable of recording or reproduction in or from a DVD 70, and a red laser beam having a wavelength of 655 nm and emitted from a light source 23 passes through a wedge-shaped dichroic prism 14, converted into a substantially parallel beam by a collimator lens 15, and is focused as a light spot on an information recording surface of the DVD 70 through a protective substrate with a numerical aperture NA$\geq$0.60 by an objective lens 16. The laser beam reflected by the information recording surface of the DVD 70 passes through the objective lens 16 and the collimator lens 15, is reflected by the wedge-shaped dichroic prism 14 and is received by a light receiving element 27 arranged at a position different from the light source 23.

Since the wedge-shaped dichroic prism 14 has the same shape as the wedge-shaped dichroic prism 4 shown in the first to third embodiment, it is possible to suppress the total wavefront aberration including other higher-order aberrations (mainly trefoil aberration) while minimizing (substantially zeroing) a third-order astigmatism and a third-order coma aberration of the light spot focused by the objective lens 16.

As described above, the present invention is not limitedly applicable to optical heads for recording or reproduction in or from three types of optical discs using three laser beams having different wavelengths, but also applicable to the optical head 34 including the objective lens 16 for focusing a laser beam having a short wavelength with a high numerical aperture NA$\geq$0.60 as shown in this embodiment.

It goes without saying that the present invention is also applicable to an optical head capable of recording or reproduction in or from the DVD 70 and a CD 80, for example, by emitting a red laser beam having a wavelength of 655 nm and an infrared laser beam having a wavelength of 785 nm from the light source 23.

Fifth Embodiment

Figure 23:
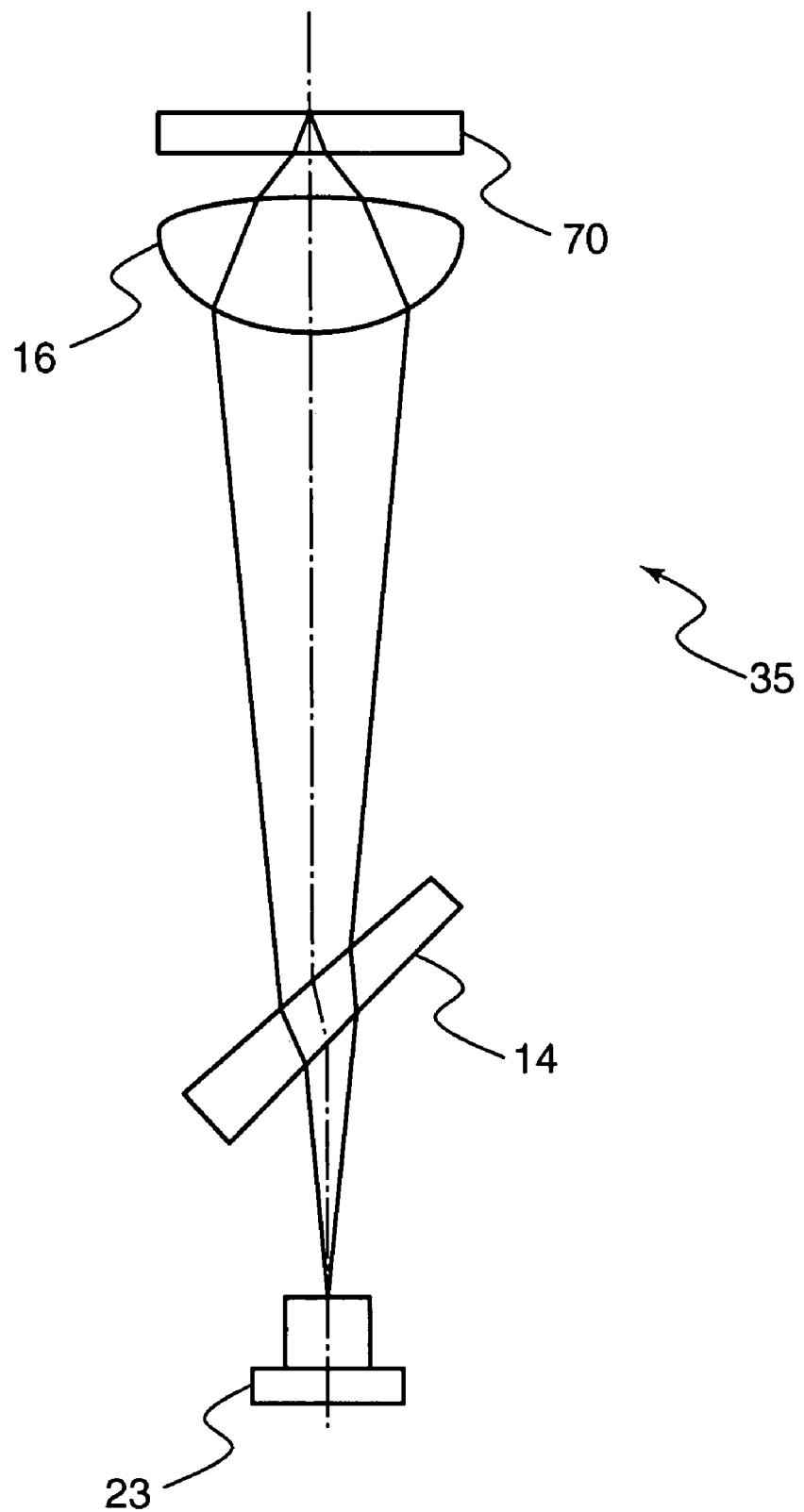
FIG. 23 is a schematic construction diagram of an optical head according to a fifth embodiment of the invention.

Next, a fifth embodiment of the present invention is described with reference to FIG. 23. FIG. 23 is a schematic construction diagram of an optical head according to this embodiment. An optical head 35 is an optical head capable of recording or reproduction in or from a DVD 70, and a red laser beam having a wavelength of 655 nm and emitted from a light source 23 passes through a wedge-shaped dichroic prism 14, and is focused as a light spot on an information recording surface of the DVD 70 through a protective substrate with a numerical aperture NA$\geq$0.60 by an objective lens 16.

Similar to the fourth embodiment, the wedge-shaped dichroic prism 14 has the same shape as the wedge-shaped dichroic prism 4 shown in the first to third embodiment, wherefore it is possible to suppress the total wavefront aberration including other higher-order aberrations (mainly trefoil aberration) while minimizing (substantially zeroing) a third-order astigmatism and a third-order coma aberration of the light spot focused by the objective lens 16.

Sixth Embodiment

Figure 24:
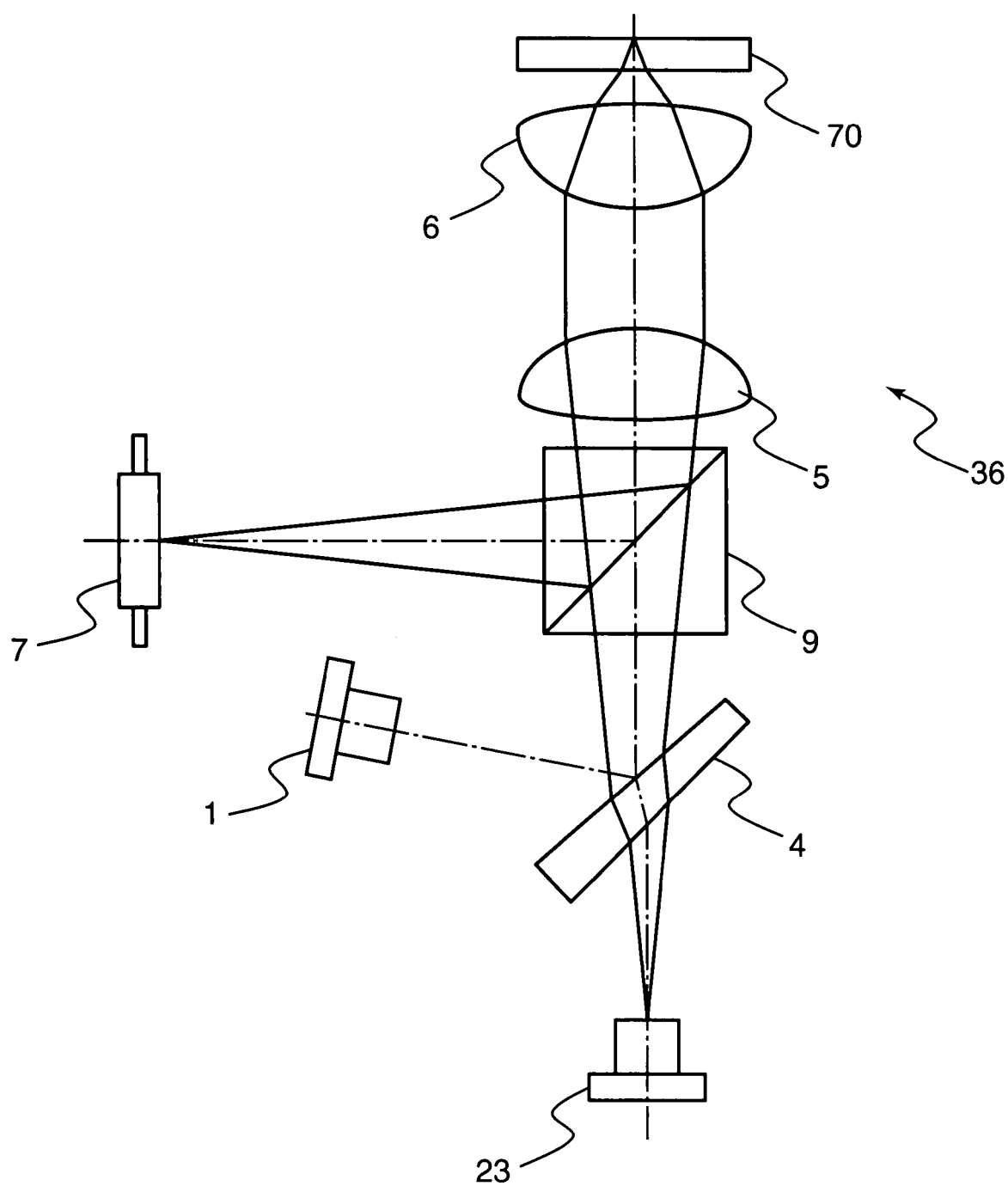
FIG. 24 is a schematic construction diagram in the case of recording or reproduction in or from a DVD using an optical head according to a sixth embodiment of the invention.
Figure 25:
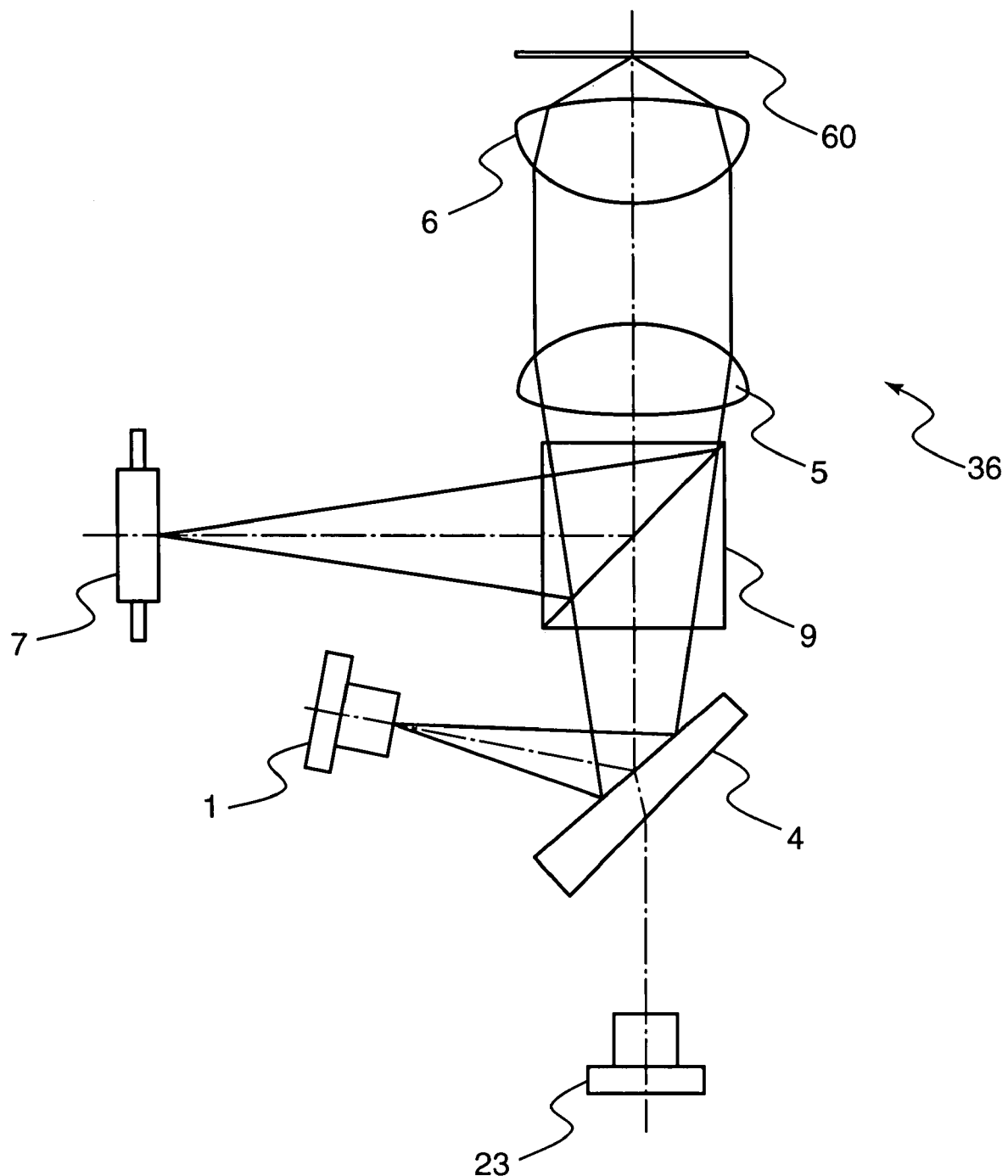
FIG. 25 is a schematic construction diagram in the case of recording or reproduction in or from a BD using the optical head shown in FIG. 24.

Next, a sixth embodiment of the present invention is described with reference to FIGS. 24 and 25. FIGS. 24 and 25 are schematic construction diagrams of an optical head according to this embodiment, wherein FIG. 24 is a schematic construction diagram in the case of recording or reproduction in or from a DVD using the optical head of this embodiment and FIG. 25 is a schematic construction diagram in the case of recording or reproduction in or from a BD using the optical head shown in FIG. 24.

In FIG. 24, identified by 23 is a light source for emitting a red laser beam, by 1 a light source for emitting a blue-violet laser beam, by 4 a wedge-shaped dichroic prism for reflecting lights having a specified wavelength or shorter, by 9 a beam splitter, by 5 a collimator lens, by 6 an objective lens, and by 7 a light receiving element for receiving the red laser beam and the blue-violet laser beam. These parts construct an optical head 36. Here, the objective lens 6 has a diffraction structure for focusing a blue-violet laser beam used for recording or reproduction in or from a BD 60 and a red laser beam used for recording or reproduction in or from a DVD 70 as minute light spots utilizing a wavelength difference.

An operation of the optical head 36 in the case of recording or reproduction in or from the DVD 70, which is an optical disc with a protective substrate having a thickness of 0.6 mm, is described. A red laser beam having a wavelength of 655 nm and emitted from the light source 23 passes through the wedge-shaped dichroic prism 4 and the beam splitter 9, is converted into a substantially parallel beam by the collimator lens 5, and is focused as a light spot on an information recording surface of the DVD 70 through the protective substrate by the objective lens 6. The laser beam reflected by the information recording surface of the DVD 70 passes through the objective lens 6 and the collimator lens 5 again and is reflected by a transmission/reflection surface of the beam splitter 9 (surface shown by a diagonal line in FIGS. 24 an 25) to be introduced to the light receiving element 7.

Next, an operation of the optical head 36 in the case of recording or reproduction in or from the BD 60, which is an optical disc with a protective substrate having a thickness of 0.075 mm to 0.1 mm, is described with reference to FIG. 25. A blue-violet laser beam having a wavelength of 405 nm and emitted from the light source 1 passes through the beam splitter 9 after being reflected by the wedge-shaped dichroic prism 4, is converted into a substantially parallel beam by the collimator lens 5, and is focused as a light spot on an information recording surface of the BD 60 through the protective substrate by the objective lens 6. The laser beam reflected by the information recording surface of the BD 60 passes through the objective lens 6 and the collimator lens 5 again and is reflected by the transmission/reflection surface of the beam splitter 9 to be introduced to the light receiving element 7.

Since the wedge-shaped dichroic prism 4 has the same shape as those shown in the first to third embodiments also in the optical head 36 including the beam splitter 9 between the wedge-shaped dichroic prism 4 and the collimator lens 5 as in this embodiment, it is possible to suppress the total wavefront aberration including other higher-order aberrations (mainly trefoil aberration) while minimizing (substantially zeroing) a third-order astigmatism and a third-order coma aberration of the light spot focused by the objective lens 6.

Seventh Embodiment

Figure 26:
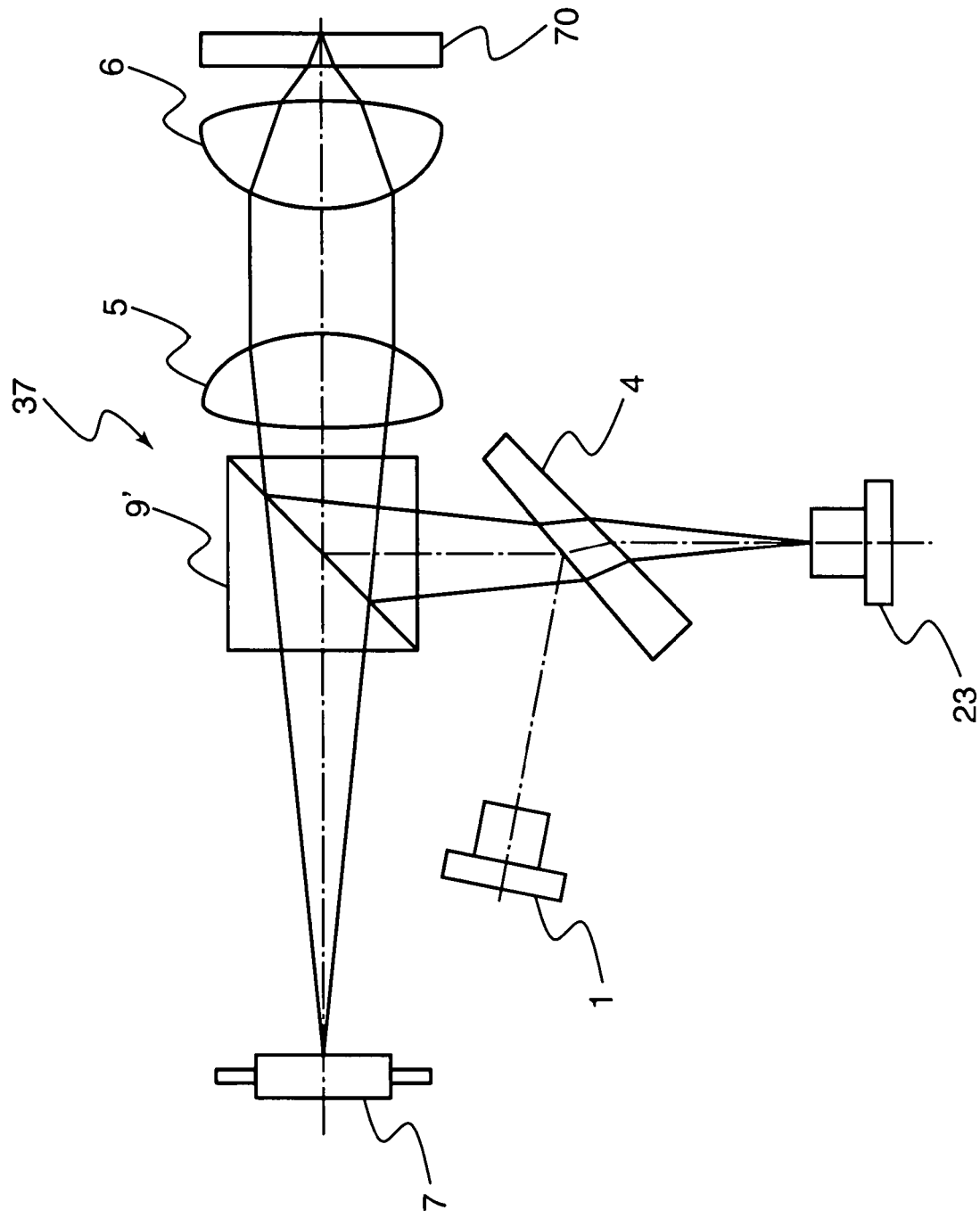
FIG. 26 is a schematic construction diagram in the case of recording or reproduction in or from a DVD using an optical head according to a seventh embodiment of the invention.
Figure 27:
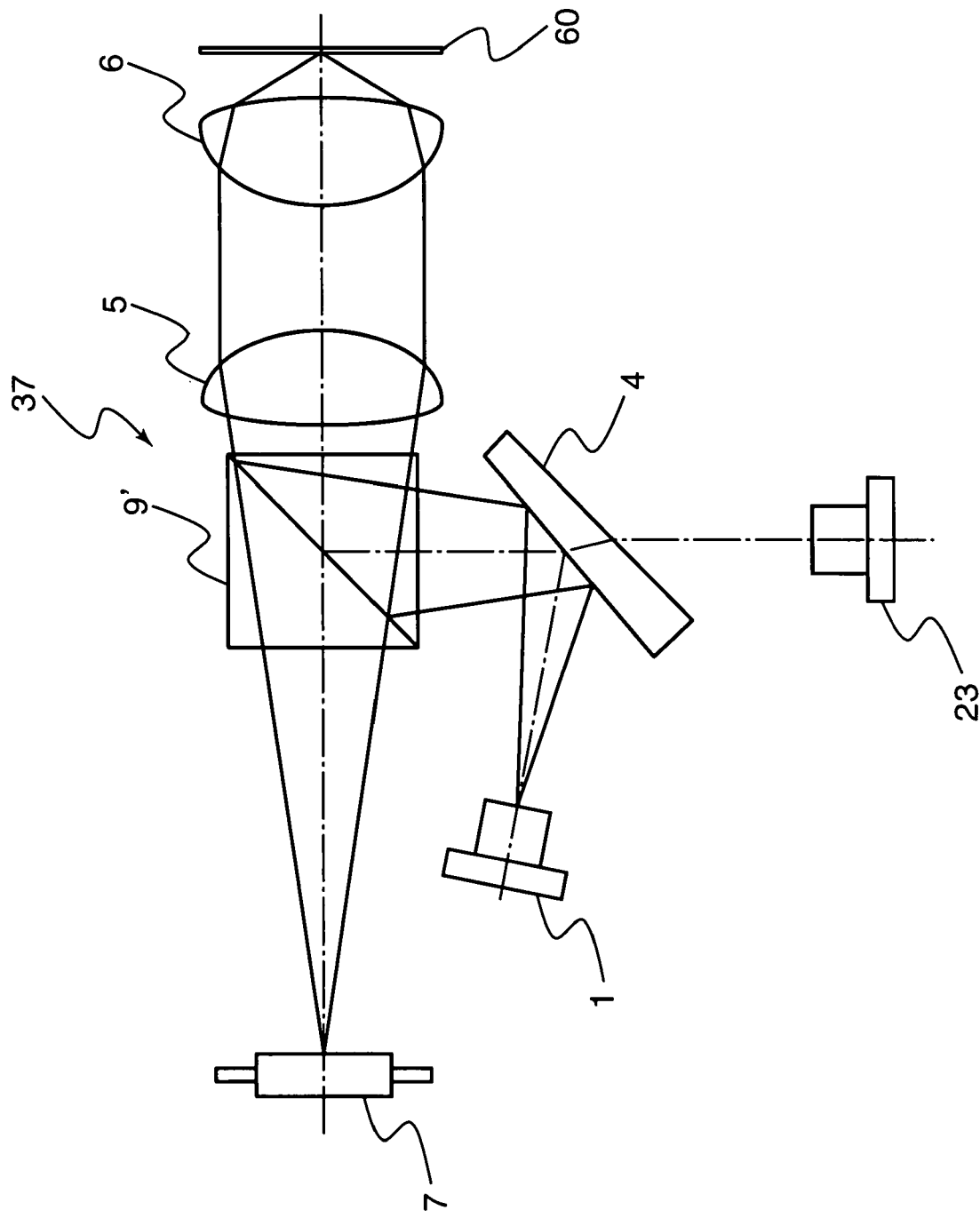
FIG. 27 is a schematic construction diagram in the case of recording or reproduction in or from a BD using the optical head shown in FIG. 26.

Next, a seventh embodiment of the present invention is described with reference to FIGS. 26 and 27. FIGS. 26 and 27 are schematic construction diagrams of an optical head according to this embodiment, wherein FIG. 26 is a schematic construction diagram in the case of recording or reproduction in or from a DVD using the optical head of this embodiment and FIG. 27 is a schematic construction diagram in the case of recording or reproduction in or from a BD using the optical head shown in FIG. 26. The optical head of this embodiment differs from the one shown in FIGS. 24 and 25 in that a beam splitter 9' for reflecting lights from light sources is used in place of the beam splitter 9 for transmitting lights from light sources. In FIGS. 26 and 27, component parts common to FIGS. 24 and 25 are not described by being identified by the same reference numerals as in FIGS. 24 and 25.

First, an operation of an optical head 37 in the case of recording or reproduction in or from the DVD 70, which is an optical disc with a protective substrate having a thickness of 0.6 mm, is described. A red laser beam having a wavelength of 655 nm and emitted from a light source 23 is reflected by the beam splitter 9' after passing through a wedge-shaped dichroic prism 4, converted into a substantially parallel beam by a collimator lens 5, and focused as a light spot on an information recording surface of the DVD 70 through the protective substrate by an objective lens 6. The laser beam reflected by the information recording surface of the DVD 70 passes through the objective lens 6, the collimator lens 5 and a transmission/reflection surface of the beam splitter 9' again to be introduced to the light receiving element 7.

Next, an operation of the optical head 37 in the case of recording or reproduction in or from the BD 60, which is an optical disc with a protective substrate having a thickness of 0.075 mm to 0.1 mm, is described with reference to FIG. 27. A blue-violet laser beam having a wavelength of 405 nm and emitted from a light source 1 is converted into a substantially parallel beam by the collimator lens 5 after being reflected by the wedge-shaped dichroic prism 4 and further by the beam splitter 9', and is focused as a light spot on an information recording surface of the BD 60 through the protective substrate by the objective lens 6. The laser beam reflected by the information recording surface of the BD 60 passes through the objective lens 6, the collimator lens 5 and the transmission/reflection surface of the beam splitter 9' again to be introduced to the light receiving element 7.

Since the wedge-shaped dichroic prism 4 has the same shape as those shown in the first to third embodiments also in the optical head 37 including the beam splitter 9' for reflecting lights from the light sources, it is possible to suppress the total wavefront aberration including other higher-order aberrations (mainly trefoil aberration) while minimizing (substantially zeroing) a third-order astigmatism and a third-order coma aberration of the light spot focused by the objective lens 6.

Eighth Embodiment

Figure 28:
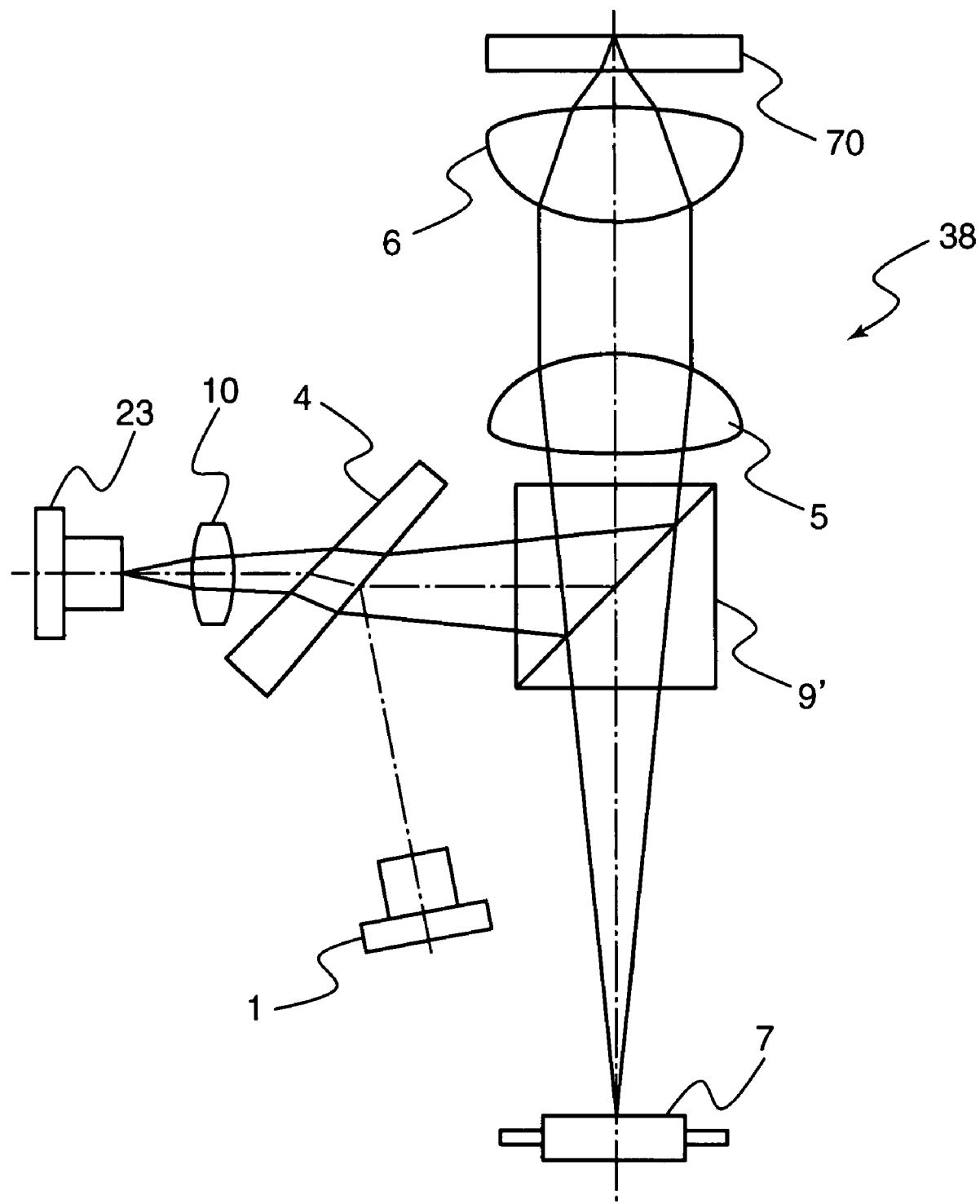
FIG. 28 is a schematic construction diagram in the case of recording or reproduction in or from a DVD using an optical head according to an eighth embodiment of the invention.
Figure 29:
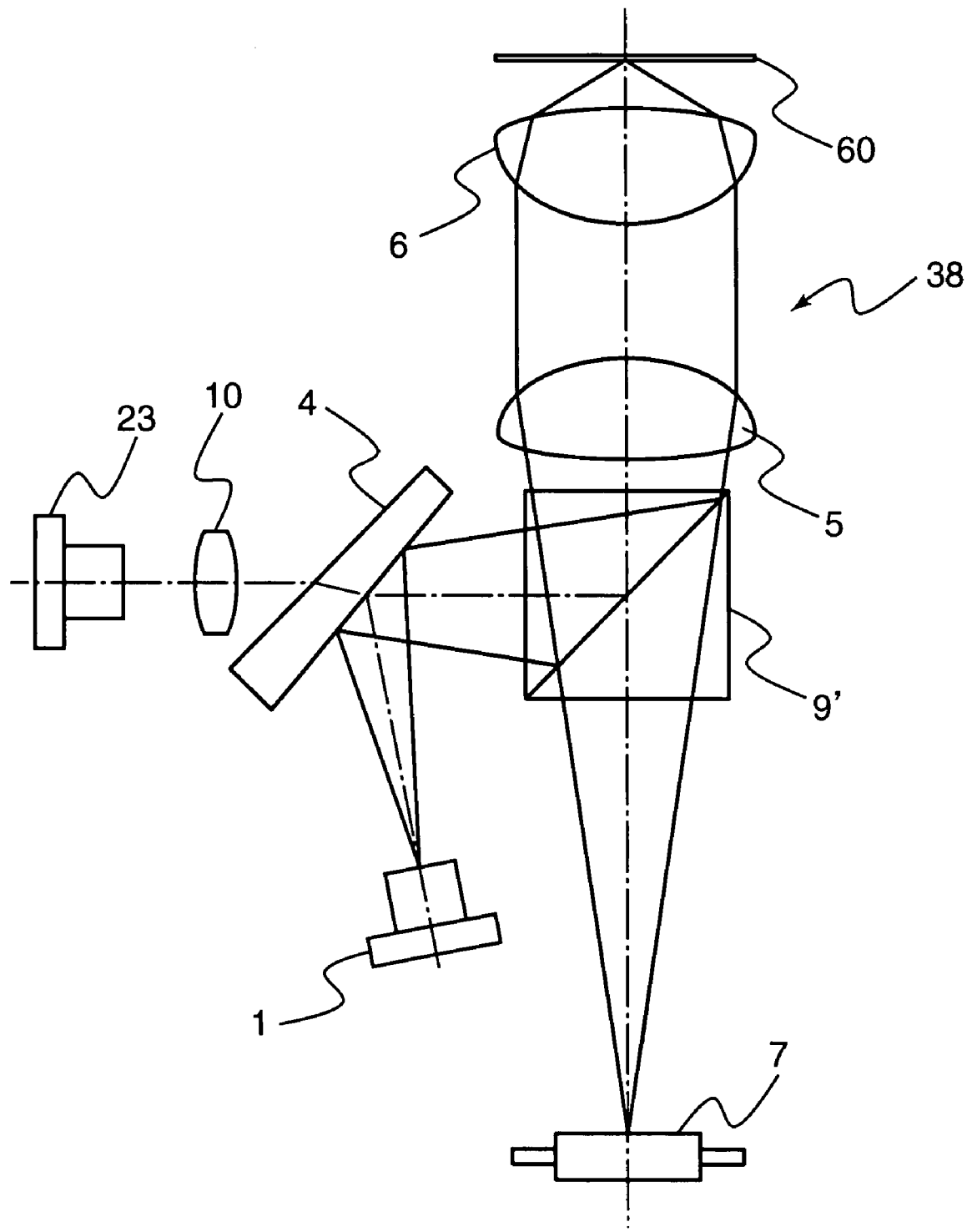
FIG. 29 is a schematic construction diagram in the case of recording or reproduction in or from a BD using the optical head shown in FIG. 28.

Next, an eighth embodiment of the present invention is described with reference to FIGS. 28 and 29. FIGS. 28 and 29 are schematic construction diagrams of an optical head according to this embodiment, wherein FIG. 28 is a schematic construction diagram in the case of recording or reproduction in or from a DVD using the optical head of this embodiment and FIG. 29 is a schematic construction diagram in the case of recording or reproduction in or from a BD using the optical head shown in FIG. 28. The optical head of this embodiment differs from the one shown in FIGS. 26 and 27 in that a relay lens 10, which is a convex lens, is added. In FIGS. 28 and 29, component parts common to FIGS. 26 and 27 are not described by being identified by the same reference numerals as in FIGS. 26 and 27.

First, an operation of an optical head 38 in the case of recording or reproduction in or from the DVD 70, which is an optical disc with a protective substrate having a thickness of 0.6 mm, is described with reference to FIG. 28. A red laser beam having a wavelength of 655 nm and emitted from a light source 23 is converted into a divergent beam having a smaller divergence angle by the relay lens 10. The converted divergent beam is converted into a substantially parallel beam by a collimator lens 5 after passing through a wedge-shaped dichroic prism 4 and being reflected by a beam splitter 9', and focused as a light spot on an information recording surface of the DVD 70 through the protective substrate by an objective lens 6. The laser beam reflected by the information recording surface of the DVD 70 passes through the objective lens 6, the collimator lens 5 and the beam splitter 9' again to be introduced to the light receiving element 7.

Next, an operation of the optical head 38 in the case of recording or reproduction in or from the BD 60, which is an optical disc with a protective substrate having a thickness of 0.075 mm to 0.1 mm, is described with reference to FIG. 29. A blue-violet laser beam having a wavelength of 405 nm and emitted from a light source 1 is converted into a substantially parallel beam by the collimator lens 5 after being reflected by the wedge-shaped dichroic prism 4 and further by the beam splitter 9', and is focused as a light spot on an information recording surface of the BD 60 through the protective substrate by the objective lens 6. The laser beam reflected by the information recording surface of the BD 60 passes through the objective lens 6, the collimator lens 5 and the beam splitter 9' again to be introduced to the light receiving element 7.

Since the wedge-shaped dichroic prism 4 has the same shape as those shown in the first to third embodiments also in the optical head 38 including the relay lens 10 between the light source 23 and the wedge-shaped dichroic prism 4, it is possible to suppress the total wavefront aberration including other higher-order aberrations (mainly trefoil aberration) while minimizing (substantially zeroing) a third-order astigmatism and a third-order coma aberration of the light spot focused by the objective lens 6.

Ninth Embodiment

Figure 30:
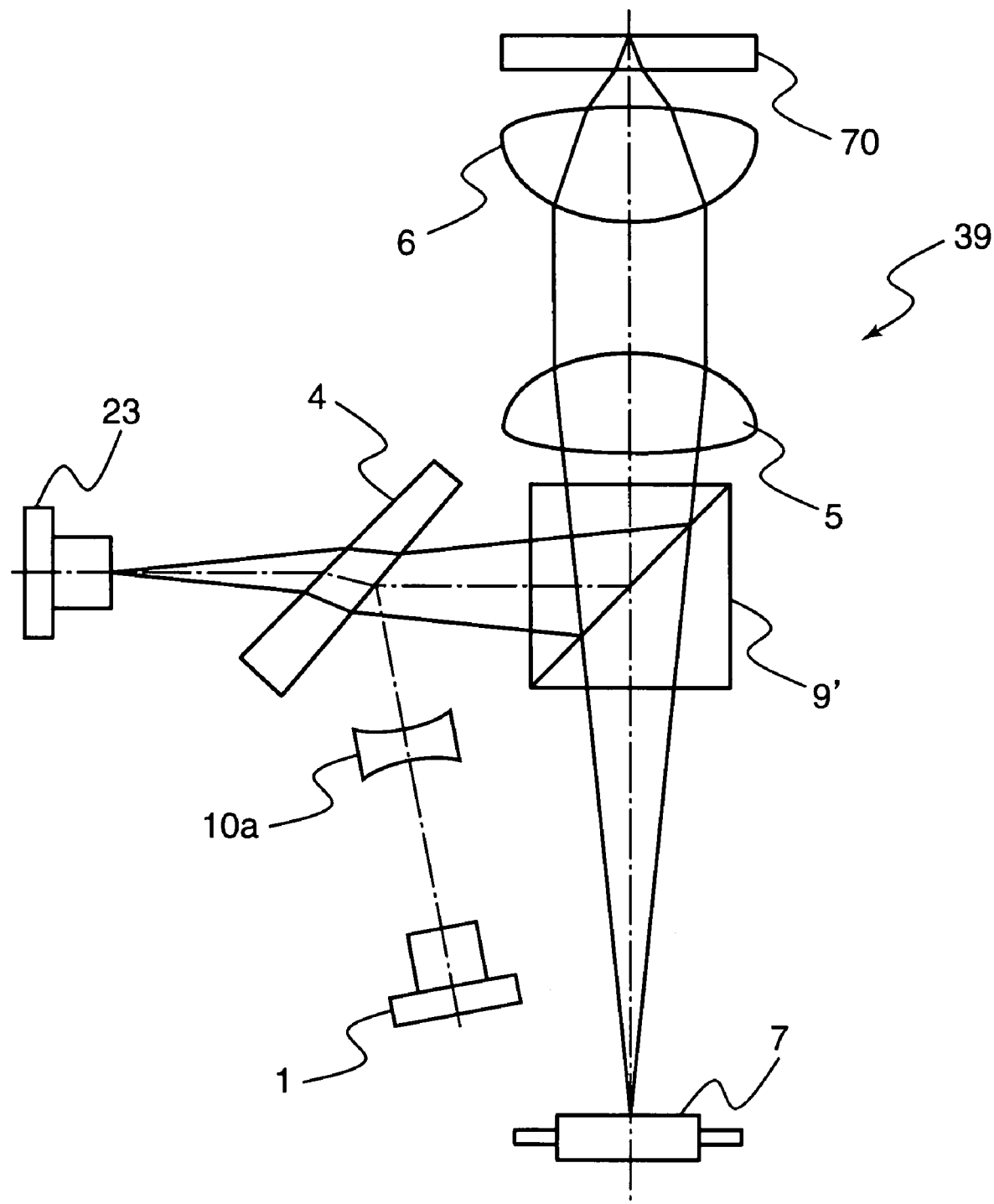
FIG. 30 is a schematic construction diagram in the case of recording or reproduction in or from a DVD using an optical head according to a ninth embodiment of the invention.
Figure 31:
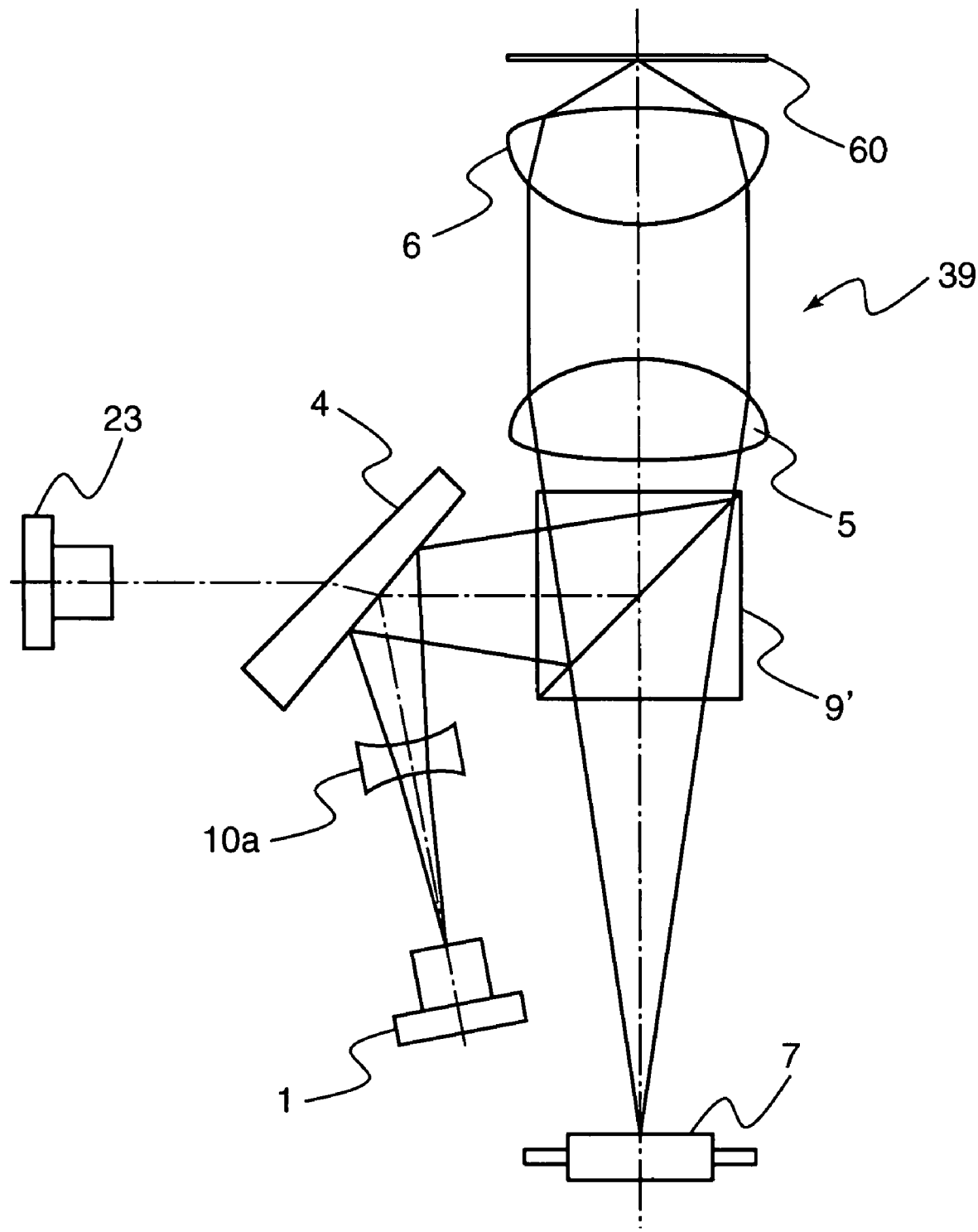
FIG. 31 is a schematic construction diagram in the case of recording or reproduction in or from a BD using the optical head shown in FIG. 30.

Next, a ninth embodiment of the present invention is described with reference to FIGS. 30 and 31. FIGS. 30 and 31 are schematic construction diagrams of an optical head according to this embodiment, wherein FIG. 30 is a schematic construction diagram in the case of recording or reproduction in or from a DVD using the optical head of this embodiment and FIG. 31 is a schematic construction diagram in the case of recording or reproduction in or from a BD using the optical head shown in FIG. 30. The optical head of this embodiment differs from the one shown in FIGS. 26 and 27 in that a relay lens 10a, which is a concave lens, is added. In FIGS. 30 and 31, component parts common to FIGS. 26 and 27 are not described by being identified by the same reference numerals as in FIGS. 26 and 27.

First, an operation of an optical head 39 in the case of recording or reproduction in or from the DVD 70, which is an optical disc with a protective substrate having a thickness of 0.6 mm, is described with reference to FIG. 30. A red laser beam having a wavelength of 655 nm and emitted from a light source 23 is converted into a substantially parallel beam by a collimator lens 5 after passing through a wedge-shaped dichroic prism 4 and being reflected by a beam splitter 9', and focused as a light spot on an information recording surface of the DVD 70 through the protective substrate by an objective lens 6. The laser beam reflected by the information recording surface of the DVD 70 passes through the objective lens 6, the collimator lens 5 and the beam splitter 9' again to be introduced to the light receiving element 7.

Next, an operation of the optical head 39 in the case of recording or reproduction in or from the BD 60, which is an optical disc with a protective substrate having a thickness of 0.075 mm to 0.1 mm, is described with reference to FIG. 31. A blue-violet laser beam having a wavelength of 405 nm and emitted from a light source 1 is converted into a divergent beam having a larger divergence angle by the relay lens 10a. The converted divergent beam is converted into a substantially parallel beam by the collimator lens 5 after being reflected by the wedge-shaped dichroic prism 4 and further by the beam splitter 9', and is focused as a light spot on an information recording surface of the BD 60 through the protective substrate by the objective lens 6. The laser beam reflected by the information recording surface of the BD 60 passes through the objective lens 6, the collimator lens 5 and the beam splitter 9' again to be introduced to the light receiving element 7.

Since the wedge-shaped dichroic prism 4 has the same shape as those shown in the first to third embodiments also in the optical head 39 including the relay lens 10a between the light source 1 and the wedge-shaped dichroic prism 4, it is possible to suppress the total wavefront aberration including other higher-order aberrations (mainly trefoil aberration) while minimizing (substantially zeroing) a third-order astigmatism and a third-order coma aberration of the light spot focused by the objective lens 6. Although the optical head 38 having the convex relay lens 10 inserted therein and the optical head 39 having the concave relay lens 10a inserted therein are described in the eighth and ninth embodiments, both of the two relay leans 10 and 10a may be used and various changes can be made.

Tenth Embodiment

Figure 32:
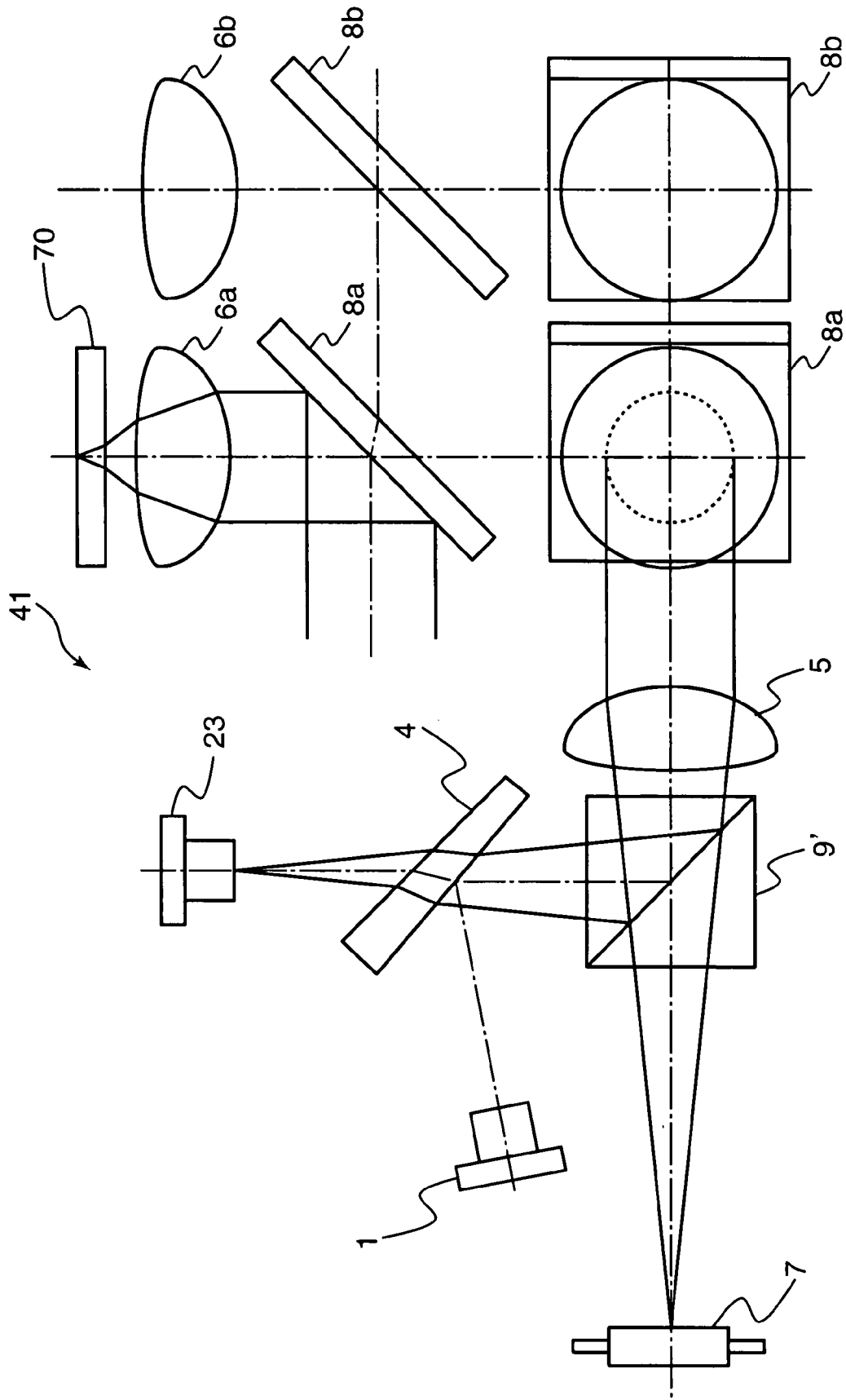
FIG. 32 is a schematic construction diagram in the case of recording or reproduction in or from a DVD using an optical head according to a tenth embodiment of the invention.
Figure 33:
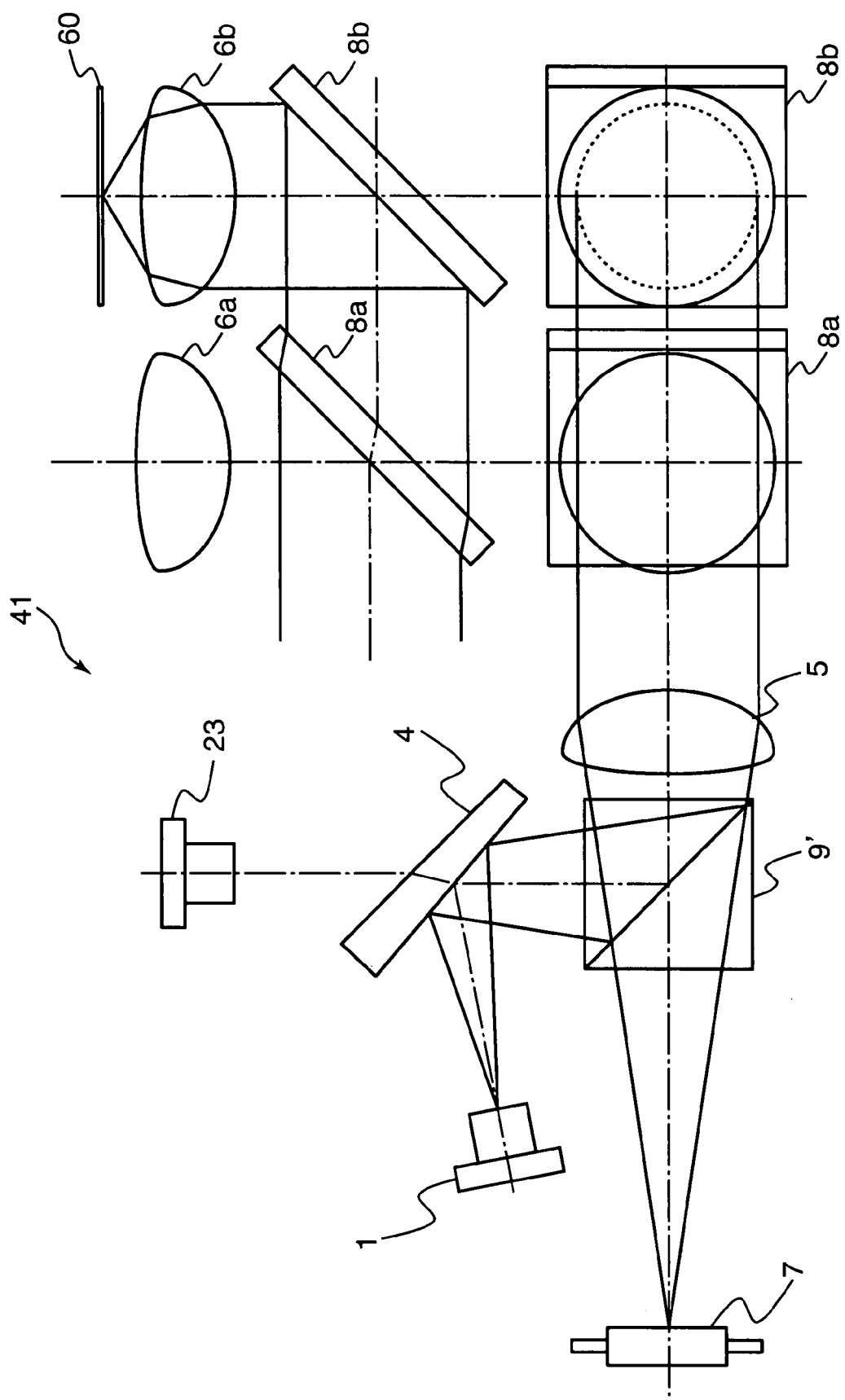
FIG. 33 is a schematic construction diagram in the case of recording or reproduction in or from a BD using the optical head shown in FIG. 32.

Next, a tenth embodiment of the present invention is described with reference to FIGS. 32 and 33. FIGS. 32 and 33 are schematic construction diagrams of an optical head according to this embodiment, wherein FIG. 32 is a schematic construction diagram in the case of recording or reproduction in or from a DVD using the optical head of this embodiment and FIG. 33 is a schematic construction diagram in the case of recording or reproduction in or from a BD using the optical head shown in FIG. 32. The optical head of this embodiment differs from the one shown in FIGS. 28 and 29 in that an objective lens 6a for a red laser beam used for recording or reproduction in or from a DVD 70 and an objective lens 6b for a blue-violet laser beam used for recording or reproduction in or from a BD 60 are provided in place of the objective lens 6 and mirrors 8a, 8b are added. In FIGS. 32 and 33, component parts common to FIGS. 28 and 29 are not described by being identified by the same reference numerals as in FIGS. 28 and 29. It should be noted right upper parts of FIGS. 32 and 33 show views of an optical head 41 seen sideways and the remaining parts show top views of the optical head 41.

First, an operation of the optical head 41 in the case of recording or reproduction in or from the DVD 70, which is an optical disc with a protective substrate having a thickness of 0.6 mm, is described with reference to FIG. 32. A red laser beam having a wavelength of 655 nm and emitted from a light source 23 is converted into a substantially parallel beam by a collimator lens 5 after passing through a wedge-shaped dichroic prism 4 and being reflected by a beam splitter 9'. This parallel beam is focused as a light spot on an information recording surface of the DVD 70 through the protective substrate with a numerical aperture NA≧0.60 by the objective lens 6a after being bent in a direction normal to the DVD 70 by the mirror 8a. The laser beam reflected by the information recording surface of the DVD 70 passes through the collimator lens 5 and the beam splitter 9' to be introduced to the light receiving element 7 after passing through the objective lens 6a and being bent by the mirror 8a again.

Next, an operation of the optical head 41 in the case of recording or reproduction in or from the BD 60, which is an optical disc with a protective substrate having a thickness of 0.075 mm to 0.1 mm, is described with reference to FIG. 33. A blue-violet laser beam having a wavelength of 405 nm and emitted from a light source 1 is converted into a substantially parallel beam by the collimator lens 5 after being reflected by the wedge-shaped dichroic prism 4 and further by the beam splitter 9'. This parallel beam is focused as a light spot on an information recording surface of the BD 60 through the protective substrate with a numerical aperture NA≧0.85 by the objective lens 6b after passing through the mirror 8a and being bent in a direction normal to the BD 60 by the mirror 8b. The laser beam reflected by the information recording surface of the BD 60 passes through the mirror 8a, the collimator lens 5 and the beam splitter 9' to be introduced to the light receiving element 7 after passing through the objective lens 6 and being bent by the mirror 8b again.

Since the wedge-shaped dichroic prism 4 has the same shape as those shown in the first to third embodiments also in the optical head 41 in which the red laser beam bent by the mirror 8a is incident on the objective lens 6a and the blue-violet laser beam bent by the mirror 8b is incident on the objective lens 6b as in this embodiment, it is possible to suppress the total wavefront aberration including other higher-order aberrations (mainly trefoil aberration) while minimizing (substantially zeroing) third-order astigmatisms and third-order coma aberrations of the light spots focused by the objective lenses 6a, 6b.

In the above sixth to tenth embodiments, an optical head also capable of recording or reproduction in or from a CD 80 can be realized if the light source 23 is a two-wavelength laser light source for emitting an infrared laser beam having a wavelength of 785 nm in addition to a red laser beam having a wavelength of 655 nm. It is apparent that this case is also embraced by the present invention.

Eleventh Embodiment

Figure 34:
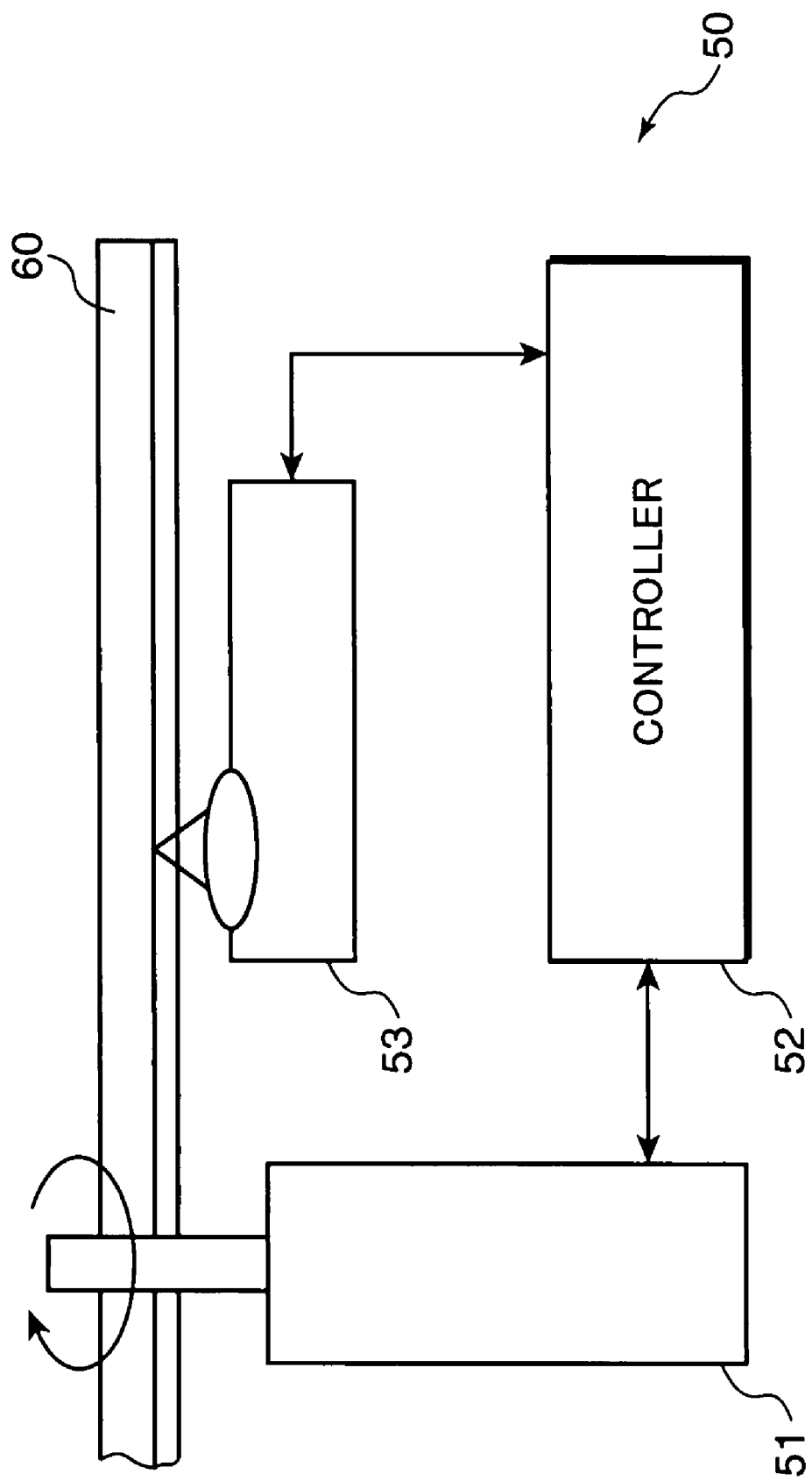
FIG. 34 is a schematic construction diagram of an optical disc device according to an eleventh embodiment of the invention.

FIG. 34 is a schematic construction diagram of an optical disc device according to one embodiment of the present invention. In FIG. 34, identified by 50 is an optical disc device, which is internally provided with an optical disc driver 51, a controller 52 and an optical head 53. Identified by 60 is a BD, which can be replaced by a CVD 70 or a CD 80.

The optical disc driver 51 has a function of rotating the BD 60 (or DVD 70, CD 80), and the optical head 53 is an optical head according to any one of the first to tenth embodiments. The controller 52 has a function of driving and controlling the optical disc driver 51 and the optical head 53, a function of processing a control signal and an information signal generated from light received by the optical head 53, and a function of interfacing the inside and outside of the optical disc device 50.

Since including the optical head according to any one of the first to tenth embodiments, the optical disc device 50 of this embodiment can satisfactorily record or reproduce information with a plurality of light sources and the corresponding optical discs.

Twelfth Embodiment

Figure 35:
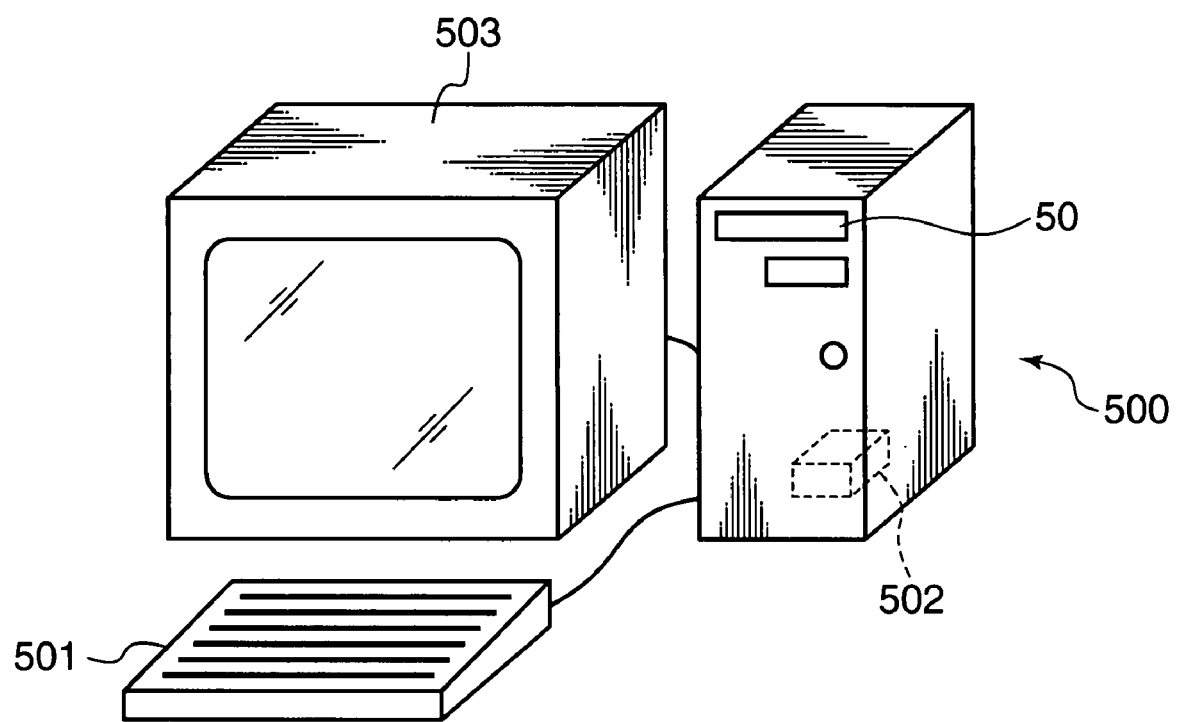
FIG. 35 is a schematic construction diagram of a computer according to a twelfth embodiment of the invention.

FIG. 35 is a schematic construction diagram of a computer according to one embodiment of the present invention. In FIG. 35, a computer 500 is provided with the optical disc device 50 of the eleventh embodiment, an input device 501 such as a keyboard, a mouse or a touch panel used to enter information, an arithmetic unit 502 such as a central processing unit (CPU) for performing calculation based on information entered by the input device 501 and information read from the optical disc device 50, and an output device 503 such as a cathode-ray tube or a liquid crystal display device (or printer) for displaying information such as the calculation result of the arithmetic unit 502.

Since including the optical disc device 50 of the eleventh embodiment, the computer 500 can satisfactorily record or reproduce information in or from different types of optical discs, therefore having an effect of being widely applicable.

Thirteenth Embodiment

Figure 36:
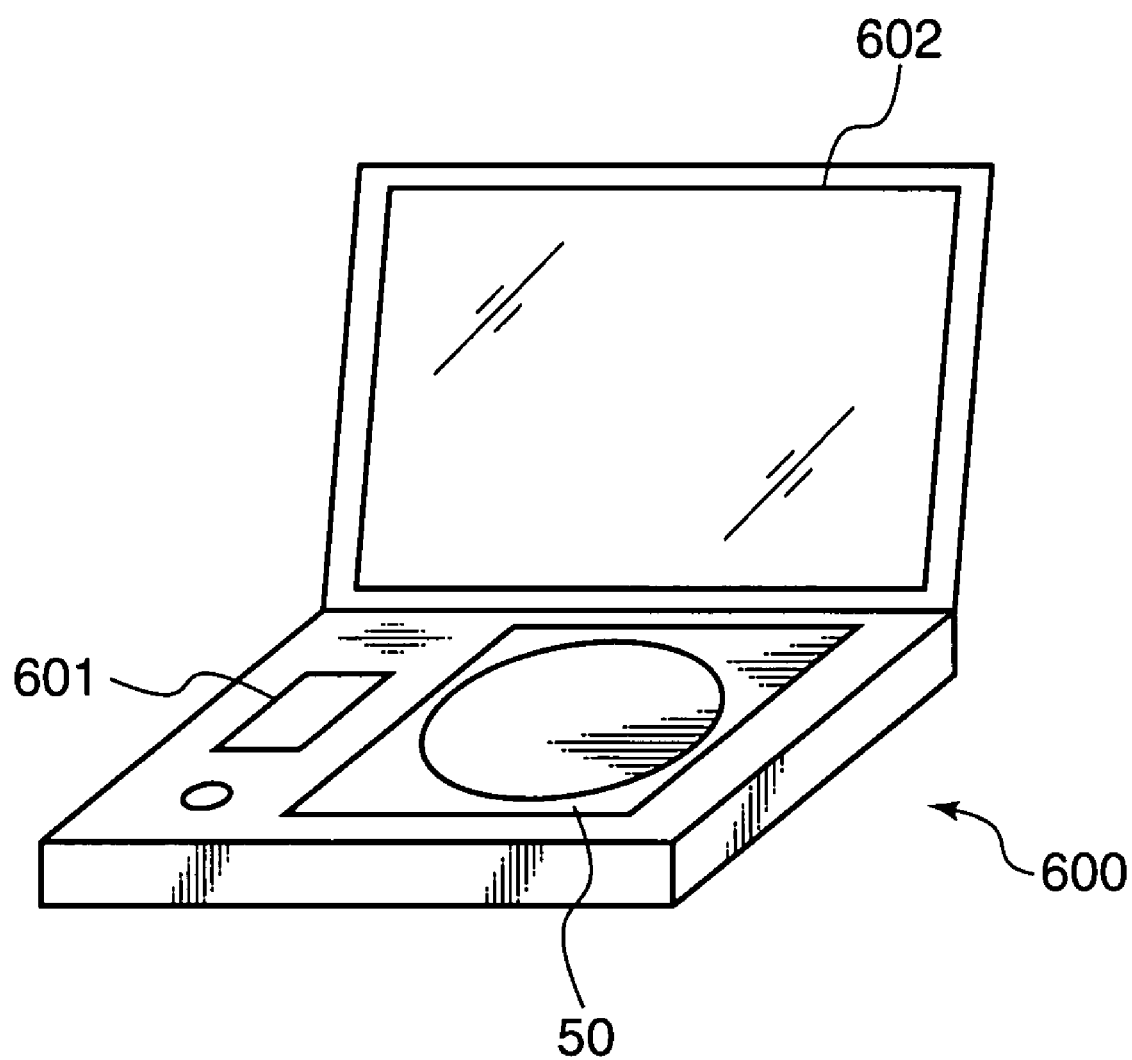
FIG. 36 is a schematic construction diagram of an optical disc player according to a thirteenth embodiment of the invention.

FIG. 36 is a schematic construction diagram of an optical disc player according to one embodiment of the present invention. In FIG. 36, an optical disc player 600 is provided with the optical disc device 50 of the eleventh embodiment, and a converter 601 (e.g. decoder) for converting an information signal obtained from the optical disc device 50 into an image signal. It should be noted that the optical disc player 600 can be used as a car navigation system or the like by additionally providing a position sensor such as a GPS and a central processing unit (CPU). A display device 602 such as a liquid crystal monitor may also be added.

Since including the optical disc device 50 of the eleventh embodiment, the optical disc player 600 can satisfactorily record or reproduce information in or from different types of optical discs, therefore having an effect of being widely applicable.

Fourteenth Embodiment

Figure 37:
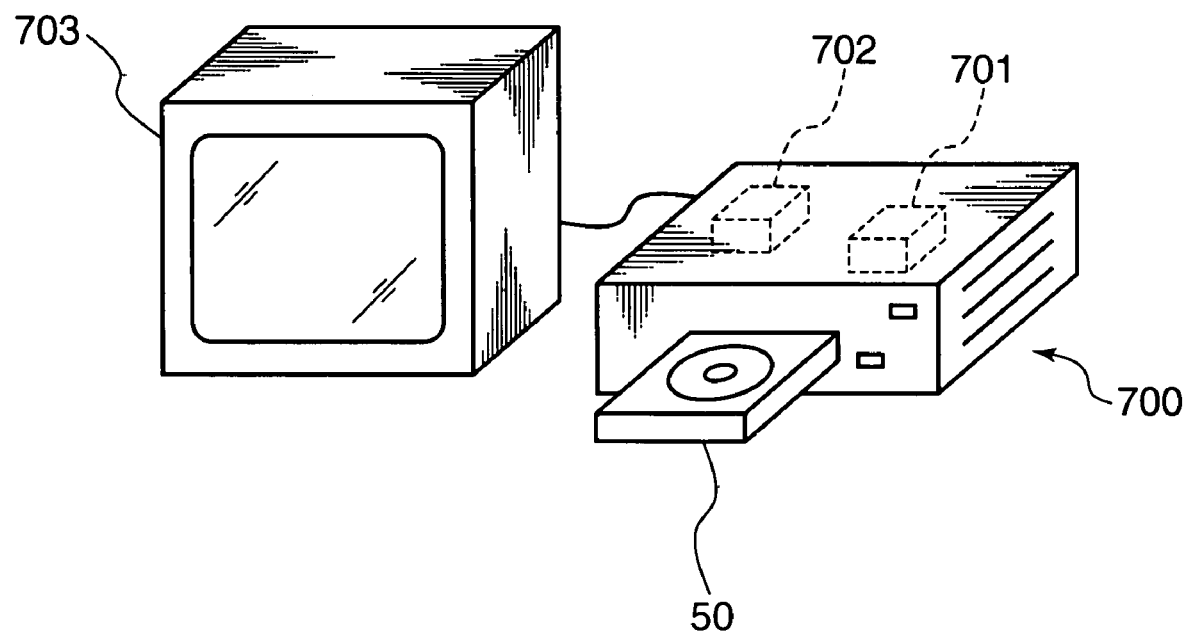
FIG. 37 is a schematic construction diagram of an optical disc recorder according to a fourteenth embodiment of the invention.
Figure 38:
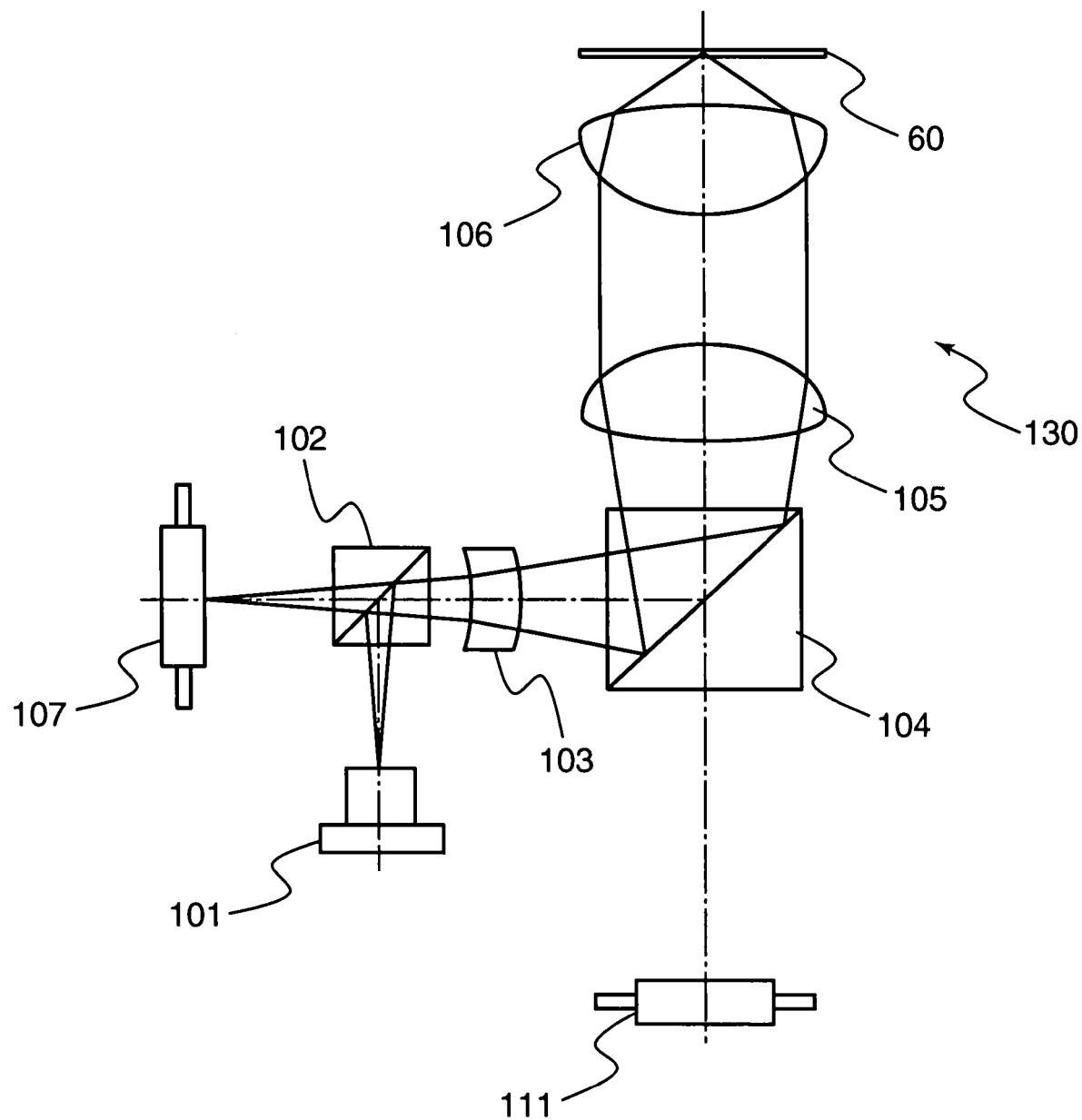
FIG. 38 is a schematic construction diagram in the case of recording or reproduction in or from a BD using a conventional optical head.
Figure 39:
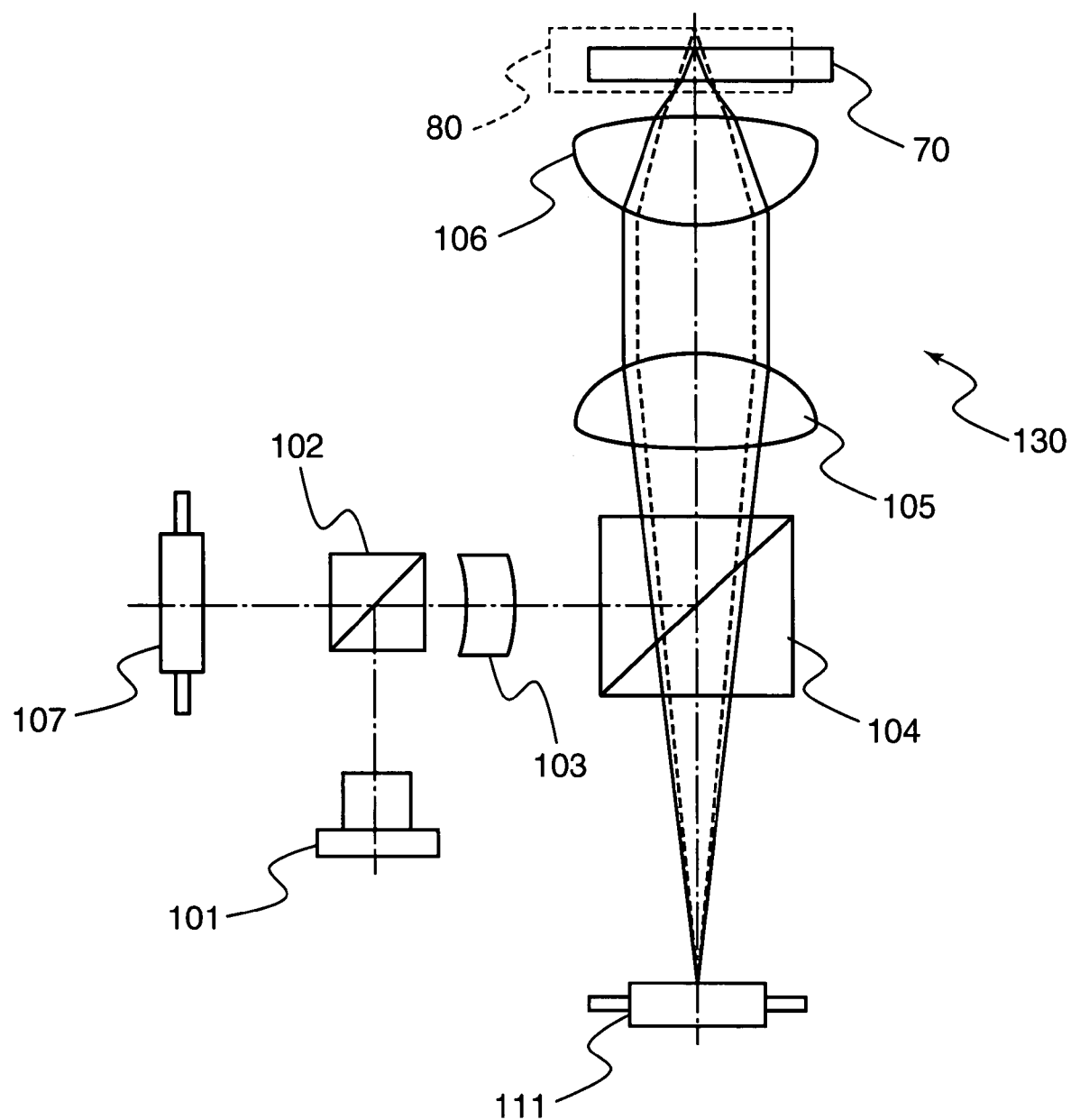
FIG. 39 is a schematic construction diagram in the case of recording or reproduction in or from a DVD or CD using the optical head shown in FIG. 38.
Figure 40:
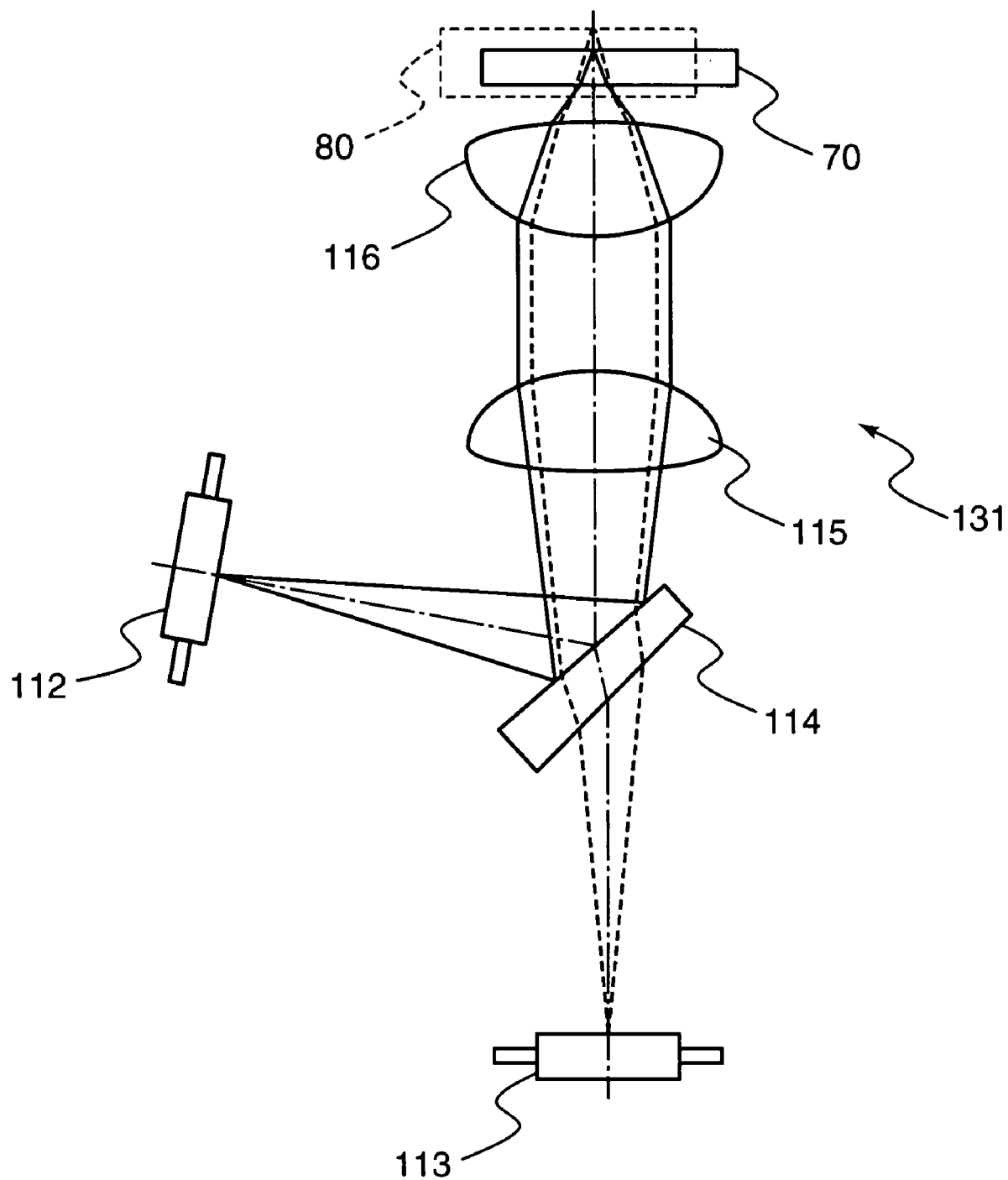
FIG. 40 is a schematic construction diagram in the case of recording or reproduction in or from a DVD or CD using another conventional optical head.
Figure 41:
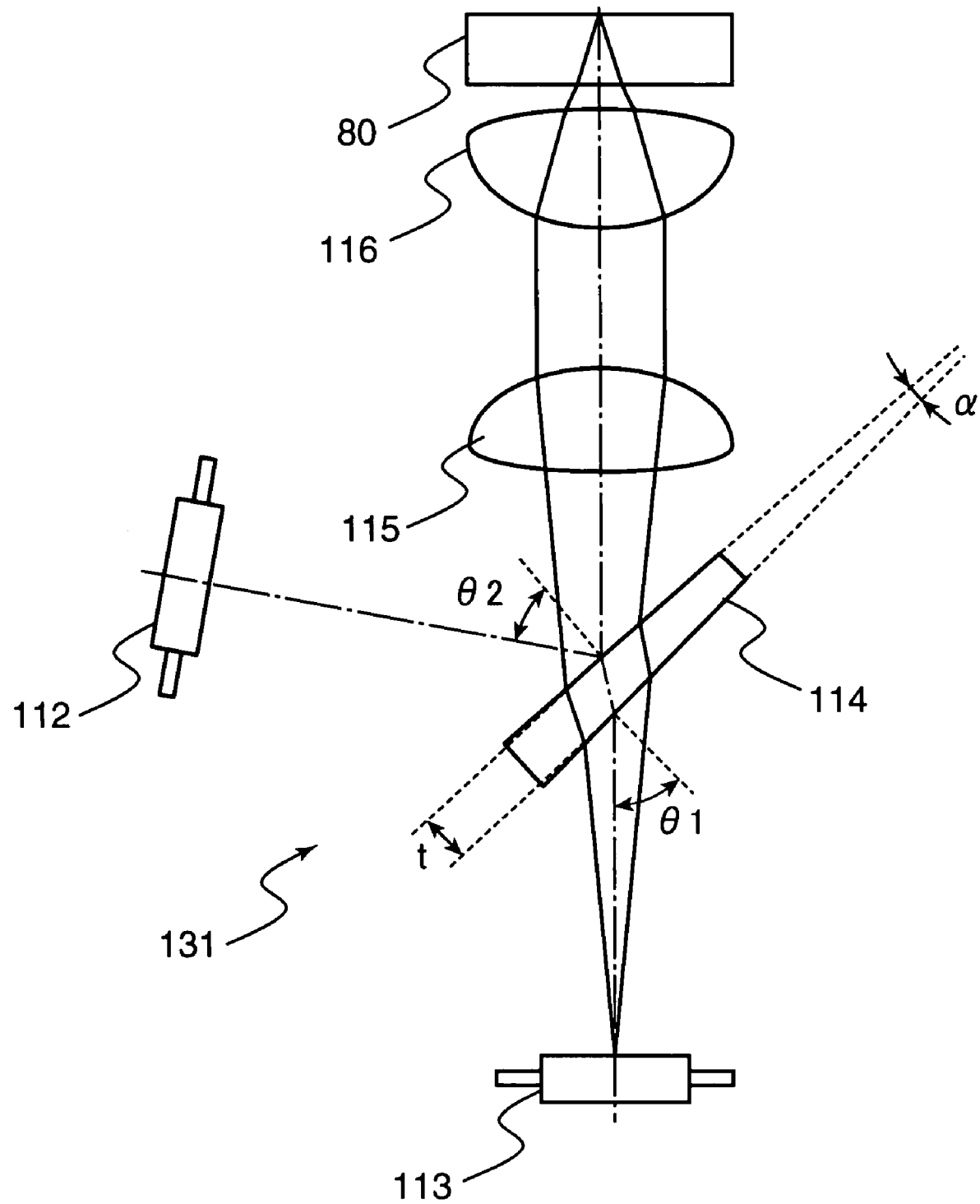
FIG. 41 is a diagram showing the construction of a wedge-shaped dichroic prism of the optical head shown in FIG. 40.

FIG. 37 is a schematic construction diagram of an optical disc recorder according to one embodiment of the present invention. In FIG. 37, an optical disc recorder 700 is connected with an output device 703 for displaying information such as a cathode-ray tube or a liquid crystal display device (or printer) and is provided with the optical disc device 50 of the eleventh embodiment, and a converter 701 (e.g. encoder) for converting an image information signal into an information signal to be recorded in an optical disc by the optical disc device 50. Preferably, the optical disc recorder 700 also includes a converter 702 (e.g. decoder) for converting an information signal obtained from the optical disc device 50 into an image signal, whereby it becomes also possible to reproduce a recorded image.

Since including the optical disc device 50 of the eleventh embodiment, the optical disc recorder 700 can satisfactorily record or reproduce information in or from different types of optical discs, therefore having an effect of being widely applicable.

The present invention is summarized as follows from the above respective embodiments. Specifically, an optical head according to the present invention comprises a first light source for emitting a laser beam having a first wavelength, a transmitting/reflecting member for transmitting the laser beam of the first wavelength emitted from the first light source, and an objective lens for focusing the laser beam of the first wavelength having passed through the transmitting/reflecting member on a first information recording medium with a numerical aperture $NA \geq 0.6°$, wherein the transmitting/reflecting member includes a first surface on which the laser beam of the first wavelength emitted from the first light source is incident and a second surface which faces the first surface and from which the laser beam of the first wavelength emerges, an angle $\alpha$ defined between the first and second surfaces satisfies a condition of $\alpha \neq 0$, a third-order astigmatism and a third-order coma aberration occurring when the laser beam of the first wavelength passes through the transmitting/reflecting member are preferably both 5 m$\lambda$ or smaller, more preferably 1 m$\lambda$ or smaller, even more preferably substantially zero.

Since not only the astigmatism, but also the coma aberration are reduced in the optical system having $NA \geq 0.60$ in this optical head, the transmitting/reflecting member can be realized which can reduce transmission wavefront aberrations, and an optical head and an optical disc device can be inexpensively realized which have good recording or reproduction performance for various optical discs such as high-density optical discs, DVDs and CDs by focusing laser beams having different wavelengths on information recording surfaces of optical discs whose protective substrates differ in thickness, for example, using one objective lens.

A trefoil aberration occurring when the laser beam of the first wavelength passes through the transmitting/reflecting member is preferably 20 m$\lambda$ or smaller, more preferably 15 m$\lambda$ or smaller.

In this case, since not only the astigmatism and the coma aberration, but also the trefoil aberration are reduced in the optical system having the large NA for DVDs and like optical discs, the transmitting/reflecting member having a smaller transmission wavefront aberration can be realized.

An angle $\theta 2$ defined between a normal to the second surface and the optical axis of the laser beam of the first wavelength emerging from the second surface preferably satisfies a condition of $38.22° \leq \theta 2 \leq 41.53°$, and more preferably satisfies a condition of $39.90° \leq \theta 2 \leq 41.53°$; the angle $\alpha$ defined between the first and second surfaces preferably satisfies a condition of $\alpha \leq 3.40°$, and more preferably satisfies a condition of a $\alpha \leq 1.70°$; and thickness T of a middle part of the transmitting/reflecting member preferably satisfies a condition of $T \leq 3.5$ mm, and more preferably satisfies a condition of $T \leq 2.1$ mm; and an angle $\theta 1$ defined between a normal to the first surface and the optical axis of the laser beam of the first wavelength incident on the first surface satisfies a condition of $41.44° \leq \theta 1 \leq 44.39°$, and more preferably satisfies a condition of $41.44° \leq \theta 1 \leq 42.94°$.

In this case, it is possible to substantially zero the third-order astigmatism and the third-order coma aberration occurring when the laser beam of the first wavelength passes through the transmitting/receiving member and also to suppress the trefoil aberration to or below 15 m$\lambda$ in the optical system having the large NA for DVDs and like optical discs.

It is preferable that the optical head further comprises a first light receiving portion; that the transmitting/receiving member reflects the laser beam of the first wavelength reflected by the first information recording medium by the second surface; and that the first light receiving portion receives the laser beam of the first wavelength reflected by the transmitting/receiving member.

In this case, since the laser beam of the first wavelength reflected by the first information recording medium is reflected by the second surface of the transmitting/receiving member and the reflected laser beam of the first wavelength is received by the first light receiving portion, an optical head and an optical disc device can be inexpensively realized which have good recording or reproduction performance for the first information recording medium such as a DVD.

It is preferable that the optical head further comprises a first light receiving portion and a beam splitter; that the beam splitter includes a transmission/reflection surface for transmitting the laser beam of the first wavelength emitted from the first light source and reflecting the laser beam of the first wavelength reflected by the first information recording medium; and that the first light receiving portion receives the laser beam of the first wavelength reflected by the transmission/reflection surface.

In this case, good recording performance and reproduction performance for the first information recording medium such as a DVD can be realized, using the optical system including the beam splitter for transmitting the laser beam of the first wavelength emitted from the first light source and reflecting the laser beam of the first wavelength reflected by the first information recording medium.

It is preferable that the optical head further comprises a first light receiving portion and a beam splitter; that the beam splitter includes a transmission/reflection surface for reflecting the laser beam of the first wavelength emitted from the first light source and transmitting the laser beam of the first wavelength reflected by the first information recording medium; and that the first light receiving portion receives the laser beam of the first wavelength having passed through the transmission/reflection surface.

In this case, good recording performance and reproduction performance for the first information recording medium such as a DVD can be realized, using the optical system including the beam splitter for reflecting the laser beam of the first wavelength emitted from the first light source and transmitting the laser beam of the first wavelength reflected by the first information recording medium.

It is preferable that the optical head further comprises a second light source for emitting a laser beam having a second wavelength different from the first wavelength; that the transmitting/reflecting member reflects the laser beam of the second wavelength emitted from the second light source by the second surface; and that the objective lens focuses the laser beam of the second wavelength reflected by the transmitting/reflecting member on a second information recording medium different from the first information recording medium.

In this case, since the laser beam of the second wavelength emitted from the second light source is reflected by the second surface of the transmitting/reflecting member and focused on the second information recording medium by the objective lens, information can be also recorded or reproduced in or from high-density optical discs such as BDs.

It is preferable that the optical head further comprises a second light source for emitting a laser beam having a second wavelength different from the first wavelength; that the objective lens includes a first objective lens for focusing the laser beam of the first wavelength having passed through the transmitting/reflecting member on the first information recording medium with a numerical aperture NA≧0.60 and a second objective lens for focusing the laser beam of the second wavelength on a second information recording medium different from the first information recording medium with a numerical aperture NA≧0.85; and that the transmitting/reflecting member reflects the laser beam of the second wavelength emitted from the second light source by the second surface.

In this case, since the laser beam of the second wavelength emitted from the second light source is reflected by the second surface of the transmitting/reflecting member and focused on the second information recording medium by the second objective lens with a numerical aperture NA≧0.85, information can be recorded or reproduced in or from not only optical discs such as DVDs, but also high-density optical discs such as BDs using two objective lenses suitable for the respective information recording media.

It is preferable that the first wavelength $\lambda 1$ satisfies a condition of 600 nm<$\lambda 1$<700 nm, and that the second wavelength $\lambda 2$ satisfies a condition of 350 nm<$\lambda 2$<450 nm.

In this case, information can be recorded or reproduced in or from not only optical discs such as DVDs, but also high-density optical discs such as BDs.

It is preferable that the optical head further comprises a first light receiving portion; that the transmitting/receiving member reflects the laser beam of the first wavelength reflected by the first information recording medium and the laser beam of the second wavelength reflected by the second information recording medium by the second surface; and that the first light receiving portion receives the laser beam of the first wavelength and the laser beam of the second wavelength reflected by the transmitting/receiving member.

In this case, since the laser beam of the first wavelength reflected by the first information recording medium and the laser beam of the second wavelength reflected by the second information recording medium are reflected by the second surface of the transmitting/reflecting member and the reflected laser beam of the first wavelength and the reflected laser beam of the second wavelength are received by the light receiving portion, an optical head and an optical disc device can be inexpensively realized which have good recording or reproduction performance not only for optical discs such as DVDs, but also for high-density optical discs such as BDs using one light receiving portion.

It is preferable that the optical head further comprises a first light receiving portion and a second light receiving portion; that the transmitting/receiving member transmits the laser beam of the first wavelength reflected by the first information recording medium and reflects the laser beam of the second wavelength reflected by the second information recording medium; and that the first light receiving portion receives the laser beam of the first wavelength having passed through the transmitting/reflecting member; and that the second light receiving portion receives the laser beam of the second wavelength having reflected by the transmitting/reflecting member.

In this case, the laser beam of the first wavelength reflected by the first information recording medium passes through the transmitting/reflecting member and the passed laser beam of the first wavelength is received by the first light receiving portion, whereas the laser beam of the second wavelength reflected by the second information recording medium is reflected by the second surface of the transmitting/reflecting member and the reflected laser beam of the second wavelength is received by the second light receiving portion. Thus, an optical head and an optical disc device can be inexpensively realized which have good recording or reproduction performance not only for optical discs such as DVDs, but also for high-density optical discs such as BDs using two light receiving portions suitable for the respective laser beams.

The first light receiving portion is preferably a light emitting and receiving element integral to the first light source.

In this case, the optical head can be miniaturized and cost can be more reduced.

It is preferable that the optical head further comprises a third light source for emitting a laser beam having a third wavelength different from either one of the first and second wavelengths; that the transmitting/reflecting member transmits the laser beam of the third wavelength emitted from the third light source; and the objective lens focuses the laser beam of the third wavelength having passed through the transmitting/reflecting member on a third information recording medium different from either one of the first and second information recording media.

In this case, since the laser beam of the third wavelength emitted from the third light source passes through the transmitting/reflecting member and is focused on the third information recording medium by the objective lens, information can be recorded or reproduced not only in or from optical discs such as DVDs and high-density optical discs such as BDs, but also in or from optical discs such as CDs.

The third wavelength $\lambda 3$ preferably satisfies a condition of 750 nm<$\lambda 3$<850 nm.

In this case, information can be recorded or reproduced not only in or from optical discs such as DVDs and high-density optical discs such as BDs, but also in or from optical discs such as CDs.

It is preferable that the optical head further comprises a first light receiving portion and a second light receiving portion; that the transmitting/receiving member transmits the laser beam of the first wavelength reflected by the first information recording medium, reflects the laser beam of the second wavelength reflected by the second information recording medium and transmits the laser beam of the third wavelength reflected by the third information recording medium; and that the first light receiving portion receives the laser beam of the first wavelength and the laser beam of the third wavelength having passed through the transmitting/reflecting member; and that the second light receiving portion receives the laser beam of the second wavelength having reflected by the transmitting/reflecting member.

In this case, the laser beam of the first wavelength reflected by the first information recording medium and the laser beam of the third wavelength reflected by the third information recording medium pass through the transmitting/reflecting member and the passed laser beams of the first and third wavelengths are received by the first light receiving portion, whereas the laser beam of the second wavelength reflected by the second information recording medium is reflected by the second surface of the transmitting/reflecting member and the reflected laser beam of the second wavelength is received by the second light receiving portion. Thus, an optical head and an optical disc device can be inexpensively realized which have good recording or reproduction performance not only for optical discs such as DVDs, but also for high-density optical discs such as BDs and optical discs such as CDs using the two light receiving portions suitable for the respective laser beams.

The first light receiving portion, the first light source and the third light source are preferably an integrated light emitting and receiving element.

In this case, the optical head can be miniaturized and cost can be more reduced.

It is preferable that the optical head further comprises a first light receiving portion; that the transmitting/receiving member reflects the laser beam of the first wavelength reflected by the first information recording medium, the laser beam of the second wavelength reflected by the second information recording medium and the laser beam of the third wavelength reflected by the third information recording medium by the second surface; and that the first light receiving portion receives the laser beam of the first wavelength, the laser beam of the second wavelength, and the laser beam of the third wavelength reflected by the transmitting/receiving member.

In this case, the laser beam of the first wavelength reflected by the first information recording medium, the laser beam of the second wavelength reflected by the second information recording medium and the laser beam of the third wavelength reflected by the third information recording medium are reflected by the second surface of the transmitting/receiving member, and the reflected laser beam of the first wavelength, laser beam of the second wavelength and laser beam of the third wavelength are received by the first light receiving portion. Thus, an optical head and an optical disc device can be inexpensively realized which have good recording or reproduction performance only for first optical discs such as DVDs, high-density optical discs such as BDs and optical discs such as CDs using one light receiving portion.

The first light source and the third light source are preferably an integrated light source.

In this case, the optical head can be miniaturized and cost can be more reduced.

The third light source is preferably arranged relative to the first light source in a plane including the optical axis of the laser beam of the first wavelength emitted from the first light source and that of the laser beam of the second wavelength emitted from the second light source and at a specified distance in vertical direction to the optical axis of the laser beam of the first wavelength.

In this case, the first and third light sources can be easily integrated.

It is preferable that the optical head further comprises a mirror for bending the laser beam of the first wavelength in a direction normal to the information recording surface of the first information recording medium; and that the optical axis of the laser beam of the first wavelength incident on the mirror is at an angle of about 45° to a direction of information tracks of the first information recording medium.

In this case, since an astigmatism inclined by about 45° with respect to a diffraction pattern by the information tracks of the first information recording medium can be given to the laser beam reflected by the first information recording medium, a focus error signal can be easily obtained by an astigmatism method and a far-field pattern becomes a spot rotated by about 45° with respect to the information tracks. Therefore, rim intensity can be improved in radial and tangential directions without using a beam shaping element or the like, and the optical head itself can have a compact construction.

An optical disc device according to the present invention comprises the above optical head, a motor for drivingly rotating an information recording medium, and a controller for controlling the optical head and the motor.

A computer according to the present invention comprises the above optical disc device, an input device for entering information, an arithmetic unit for performing a specified calculation based on information reproduced from the optical disc device and/or information entered from the input device, and an output device for outputting the information reproduced from the optical disc device and/or the information entered by the input device and/or a calculation result by the arithmetic unit.

An optical disc player according to the present invention comprises the above optical disc device, and a decoder for converting an information signal obtained from the optical disc device into image information.

An optical disc recorder according to the present invention comprises the above optical disc device, and an encoder for converting image information into an information signal to be recorded by the optical disc device.

By the above respective constructions, an optical disc device, a computer, an optical disc player or an optical disc recorder can be inexpensively realized which has good recording performance or reproduction performance for various optical discs such as high-density optical discs, DVDs and CDs.

Since an optical head according to the present invention is capable of recording or reproduction in or from high-density optical discs, DVDS and CDs, the construction of the optical head can be simplified to accomplish an improvement in productivity and an inexpensive optical disc device can be provided. Further, a computer, an optical disc player and an optical disc recorded including the optical disc device of the present invention have an effect of being widely applicable since being capable of satisfactorily recording or reproducing information in or from different types of optical discs.

This application is entitled to the benefit of Provisional Patent Application No. 60/877,614, filed in United States Patent and Trademark Office on Dec. 29, 2006.

In addition, this application is based on Japanese patent application serial No. 2006-273818, filed in Japan Patent Office on Oct. 5, 2006, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An optical head, comprising:
a first light source for emitting a laser beam having a first wavelength;
a transmitting/reflecting member for transmitting the laser beam of the first wavelength emitted from the first light source; and
an objective lens for focusing the laser beam of the first wavelength having passed through the transmitting/reflecting member on a first information recording medium with a numerical aperture NA $\geqq 0.60$,
wherein:
the transmitting/reflecting member includes a first surface on which the laser beam of the first wavelength emitted from the first light source is incident and a second surface which faces the first surface and from which the laser beam of the first wavelength emerges;
an angle $\alpha$ defined between the first and second surfaces satisfies a condition of $\alpha \neq 0$;
a third-order astigmatism and a third-order coma aberration occurring when the laser beam of the first wavelength passes through the transmitting/reflecting member are both 5 m$\lambda$ or smaller; and
a trefoil aberration occurring when the laser beam of the first wavelength passes through the transmitting/reflecting member is 20 m$\lambda$ or smaller.

2. An optical head according to claim 1, wherein;
an angle $\theta 2$ defined between a normal to the second surface and the optical axis of the laser beam of the first wavelength emerging from the second surface satisfies a condition of $38.22° \leqq \theta 2 \leqq 41.53°$;

the angle α defined between the first and second surfaces satisfies a condition of $\alpha \leqq 3.40°$; and thickness T of a middle part of the transmitting/reflecting member satisfies a condition of $T \leqq 3.5$ mm.

3. An optical head according to claim 2, wherein an angle θ1 defined between a normal to the first surface and the optical axis of the laser beam of the first wavelength incident on the first surface satisfies a condition of $41.44° \leqq \theta 1 \leqq 44.39°$.

4. An optical head according to claim 1, further comprising a first light receiving portion, wherein:

the transmitting/receiving member reflects the laser beam of the first wavelength reflected by the first information recording medium by the second surface; and the first light receiving portion receives the laser beam of the first wavelength reflected by the transmitting/receiving member.

5. An optical head according to claim 1, further comprising a first light receiving portion and a beam splitter, wherein:

the beam splitter includes a transmission/reflection surface for transmitting the laser beam of the first wavelength emitted from the first light source and reflecting the laser beam of the first wavelength reflected by the first information recording medium; and the first light receiving portion receives the laser beam of the first wavelength reflected by the transmission/reflection surface.

6. An optical head according to claim 1, further comprising a first light receiving portion and a beam splitter, wherein:

the beam splitter includes a transmission/reflection surface for reflecting the laser beam of the first wavelength emitted from the first light source and transmitting the laser beam of the first wavelength reflected by the first information recording medium; and the first light receiving portion receives the laser beam of the first wavelength having passed through the transmission/reflection surface.

7. An optical head according to claim 1, further comprising a second light source for emitting a laser beam having a second wavelength different from the first wavelength, wherein:

the transmitting/reflecting member reflects the laser beam of the second wavelength emitted from the second light source by the second surface; and the objective lens focuses the laser beam of the second wavelength reflected by the transmitting/reflecting member on a second information recording medium different from the first information recording medium.

8. An optical head according to claim 1, further comprising a second light source for emitting a laser beam having a second wavelength different from the first wavelength, wherein:

the objective lens includes a first objective lens for focusing the laser beam of the first wavelength having passed through the transmitting/reflecting member on the first information recording medium with a numerical aperture $NA \geqq 0.60$ and a second objective lens for focusing the laser beam of the second wavelength on a second information recording medium different from the first information recording medium with a numerical aperture $NA \geqq 0.85$; and the transmitting/reflecting member reflects the laser beam of the second wavelength emitted from the second light source by the second surface.

9. An optical head according to claim 7, wherein:

the first wavelength λ1 satisfies a condition of $600$ nm$<\lambda 1<700$ nm; and the second wavelength λ2 satisfies a condition of $350$ nm$<\lambda 2<450$ nm.

10. An optical head according to claim 7, further comprising a first light receiving portion, wherein:

the transmitting/receiving member reflects the laser beam of the first wavelength reflected by the first information recording medium and the laser beam of the second wavelength reflected by the second information recording medium by the second surface; and the first light receiving portion receives the laser beam of the first wavelength and the laser beam of the second wavelength reflected by the transmitting/receiving member.

11. An optical head according to claim 7, further comprising a first light receiving portion and a second light receiving portion, wherein:

the transmitting/receiving member transmits the laser beam of the first wavelength reflected by the first information recording medium and reflects the laser beam of the second wavelength reflected by the second information recording medium; and the first light receiving portion receives the laser beam of the first wavelength having passed through the transmitting/reflecting member; and the second light receiving portion receives the laser beam of the second wavelength having reflected by the transmitting/reflecting member.

12. An optical head according to claim 7, further comprising a third light source for emitting a laser beam having a third wavelength different from either one of the first and second wavelengths, wherein:

the transmitting/reflecting member transmits the laser beam of the third wavelength emitted from the third light source; and the objective lens focuses the laser beam of the third wavelength having passed through the transmitting/reflecting member on a third information recording medium different from either one of the first and second information recording media.

13. An optical head according to claim 12, wherein the third wavelength λ3 satisfies a condition of $750$ nm$<\lambda 3<850$ nm.

14. An optical head according to claim 12, further comprising a first light receiving portion and a second light receiving portion, wherein:

the transmitting/receiving member transmits the laser beam of the first wavelength reflected by the first information recording medium, reflects the laser beam of the second wavelength reflected by the second information recording medium and transmits the laser beam of the third wavelength reflected by the third information recording medium; and the first light receiving portion receives the laser beam of the first wavelength and the laser beam of the third wavelength having passed through the transmitting/reflecting member; and the second light receiving portion receives the laser beam of the second wavelength having reflected by the transmitting/reflecting member.

15. An optical head according to claim 12, further comprising a first light receiving portion, wherein:

the transmitting/receiving member reflects the laser beam of the first wavelength reflected by the first information recording medium, the laser beam of the second wavelength reflected by the second information recording medium and the laser beam of the third wavelength reflected by the third information recording medium by the second surface; and the first light receiving portion receives the laser beam of the first wavelength, the laser beam of the second wavelength, and the laser beam of the third wavelength reflected by the transmitting/receiving member.

16. An optical head according to claim 15, wherein the first light source and the third light source are an integrated light source.

17. An optical head according to claim 16, wherein the third light source is arranged relative to the first light source in a plane including the optical axis of the laser beam of the first wavelength emitted from the first light source and that of the laser beam of the second wavelength emitted from the second light source and at a specified distance in vertical direction to the optical axis of the laser beam of the first wavelength.

18. An optical head according to claim 1, further comprising a mirror for bending the laser beam of the first wavelength in a direction normal to an information recording surface of the first information recording medium, wherein the optical axis of the laser beam of the first wavelength incident on the mirror is at an angle of about 45° to a direction of information tracks of the first information recording medium.

19. An optical disc device, comprising:
an optical head according to claim 1,
a motor for drivingly rotating an information recording medium, and
a controller for controlling the optical head and the motor.

* * * * *